(12) United States Patent
Ishii et al.

(10) Patent No.: US 11,558,673 B2
(45) Date of Patent: Jan. 17, 2023

(54) TRANSMISSION DEVICE, RECEPTION DEVICE, TRANSMISSION SYSTEM, AND TRANSMISSION METHOD

(71) Applicant: Sony Corporation, Tokyo (JP)

(72) Inventors: Mikio Ishii, Tokyo (JP); Tomoyuki Endo, Tokyo (JP); Hideaki Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/277,940

(22) PCT Filed: Oct. 3, 2019

(86) PCT No.: PCT/JP2019/039057
§ 371 (c)(1),
(2) Date: Mar. 19, 2021

(87) PCT Pub. No.: WO2020/080118
PCT Pub. Date: Apr. 23, 2020

(65) Prior Publication Data
US 2022/0116687 A1    Apr. 14, 2022

(30) Foreign Application Priority Data

Oct. 17, 2018  (JP) .............................. JP2018-196061

(51) Int. Cl.
*H04N 7/173* (2011.01)
*H04N 21/647* (2011.01)
(Continued)

(52) U.S. Cl.
CPC ..... *H04N 21/64784* (2013.01); *H04L 1/1628* (2013.01); *H04N 21/234* (2013.01); *H04N 21/2389* (2013.01)

(58) Field of Classification Search
CPC .......... H04N 21/64784; H04N 21/234; H04N 21/2389; H04L 1/1628
See application file for complete search history.

(56) References Cited

U.S. PATENT DOCUMENTS

2009/0044230 A1* 2/2009 Oh ....................... H04N 21/235
725/62
2012/0069892 A1* 3/2012 Kim .................. H03M 13/2933
375/232

(Continued)

FOREIGN PATENT DOCUMENTS

JP    2014-527348 A    10/2014
JP    2017-46325 A    3/2017

(Continued)

OTHER PUBLICATIONS

International Search Report dated Dec. 17, 2019 in PCT/JP2019/039057 filed on Oct. 3, 2019, 2 pages.

*Primary Examiner* — Mulugeta Mengesha
(74) *Attorney, Agent, or Firm* — Oblon, McClelland, Maier & Neustadt, L.L.P.

(57) ABSTRACT

The present technology relates to a transmission device, a reception device, a transmission system, and a transmission method capable of improving transmission efficiency of subdata added to main data.

A transmission device includes a frame sequence number setting unit that, on the basis of a frame number indicating an order of a subframe in a main frame, assigns to the subframe a frame sequence number indicating an order of the subframe in a frame sequence including a plurality of the subframes, and a multiplexing unit that arranges a data packet at a predetermined position in the subframe on the basis of the frame sequence number. The present technology can be applied to a CCU, for example.

18 Claims, 41 Drawing Sheets

(51) Int. Cl.
*H04L 1/16* (2006.01)
*H04N 21/234* (2011.01)
*H04N 21/2389* (2011.01)

(56) References Cited

U.S. PATENT DOCUMENTS

| | | | |
|---|---|---|---|
| 2012/0144266 A1* | 6/2012 | Choi | H04L 1/0041 |
| | | | 714/E11.032 |
| 2012/0198502 A1* | 8/2012 | Qin | H04N 21/6143 |
| | | | 725/70 |
| 2014/0146775 A1 | 5/2014 | Guan et al. | |
| 2016/0080828 A1* | 3/2016 | Roul | H04N 21/6143 |
| | | | 725/67 |
| 2017/0064046 A1 | 3/2017 | Yamaguchi | |
| 2017/0367084 A1 | 12/2017 | Cheng et al. | |

FOREIGN PATENT DOCUMENTS

| | | |
|---|---|---|
| JP | 2018-6796 A | 1/2018 |
| JP | 2018-512776 A | 5/2018 |
| JP | 2018-121341 A | 8/2018 |

* cited by examiner

*FIG. 6*

| | ADDITIONAL DATA HEADER | |
| --- | --- | --- |
| | FIRST BYTE | SECOND BYTE |
| 7 | VALIDITY FLAG | USER DATA |
| 6 | DATA TYPE | |
| 5 | | |
| 4 | | |
| 3 | | |
| 2 | | |
| 1 | | |
| 0 | | |

FIG. 16

| BB FRAME NUMBER | BB FRAME SEQUENCE NUMBER | ITEM | LENGTH (BYTE) | | START ADDRESS | END ADDRESS |
|---|---|---|---|---|---|---|
| 5n | 0 | BB HEADER | 10 | 12 | 0 | 9 |
| | | PAYLOAD HEADER | 2 | | 10 | 11 |
| | | ADDITIONAL DATA HEADER 0 | 2 | 532 | 303 | 304 |
| | | ADDITIONAL DATA PACKET 0 | 188 | | 305 | 492 |
| | | ADDITIONAL DATA HEADER 1 | 2 | | 493 | 494 |
| | | ADDITIONAL DATA PACKET 1 | 188 | | 495 | 682 |
| | | ADDITIONAL DATA HEADER 2 | 2 | | 683 | 684 |
| | | ADDITIONAL DATA PACKET 2 | 150 | | 685 | 834 |
| 5n+1 | 1 | BB HEADER | 10 | 12 | 0 | 9 |
| | | PAYLOAD HEADER | 2 | | 10 | 11 |
| | | ADDITIONAL DATA PACKET 2 | 38 | 532 | 303 | 340 |
| | | ADDITIONAL DATA HEADER 3 | 2 | | 341 | 342 |
| | | ADDITIONAL DATA PACKET 3 | 188 | | 343 | 530 |
| | | ADDITIONAL DATA HEADER 4 | 2 | | 531 | 532 |
| | | ADDITIONAL DATA PACKET 4 | 188 | | 533 | 720 |
| | | ADDITIONAL DATA HEADER 5 | 2 | | 721 | 722 |
| | | ADDITIONAL DATA PACKET 5 | 112 | | 723 | 834 |
| 5n+2 | 2 | BB HEADER | 10 | 12 | 0 | 9 |
| | | PAYLOAD HEADER | 2 | | 10 | 11 |
| | | ADDITIONAL DATA PACKET 5 | 76 | 532 | 303 | 378 |
| | | ADDITIONAL DATA HEADER 6 | 2 | | 379 | 380 |
| | | ADDITIONAL DATA PACKET 6 | 188 | | 381 | 568 |
| | | ADDITIONAL DATA HEADER 7 | 2 | | 569 | 570 |
| | | ADDITIONAL DATA PACKET 7 | 188 | | 571 | 758 |
| | | ADDITIONAL DATA HEADER 8 | 2 | | 759 | 760 |
| | | ADDITIONAL DATA PACKET 8 | 74 | | 761 | 834 |
| 5n+3 | 3 | BB HEADER | 10 | 12 | 0 | 9 |
| | | PAYLOAD HEADER | 2 | | 10 | 11 |
| | | ADDITIONAL DATA PACKET 8 | 114 | 532 | 303 | 416 |
| | | ADDITIONAL DATA HEADER 9 | 2 | | 417 | 418 |
| | | ADDITIONAL DATA PACKET 9 | 188 | | 419 | 606 |
| | | ADDITIONAL DATA HEADER 10 | 2 | | 607 | 608 |
| | | ADDITIONAL DATA PACKET 10 | 188 | | 609 | 796 |
| | | ADDITIONAL DATA HEADER 11 | 2 | | 797 | 798 |
| | | ADDITIONAL DATA PACKET 11 | 36 | | 799 | 834 |
| 5n+4 | 4 | BB HEADER | 10 | 12 | 0 | 9 |
| | | PAYLOAD HEADER | 2 | | 10 | 11 |
| | | ADDITIONAL DATA PACKET 11 | 152 | 532 | 303 | 454 |
| | | ADDITIONAL DATA HEADER 12 | 2 | | 455 | 456 |
| | | ADDITIONAL DATA PACKET 12 | 188 | | 457 | 644 |
| | | ADDITIONAL DATA HEADER 13 | 2 | | 645 | 646 |
| | | ADDITIONAL DATA PACKET 13 | 188 | | 647 | 834 |

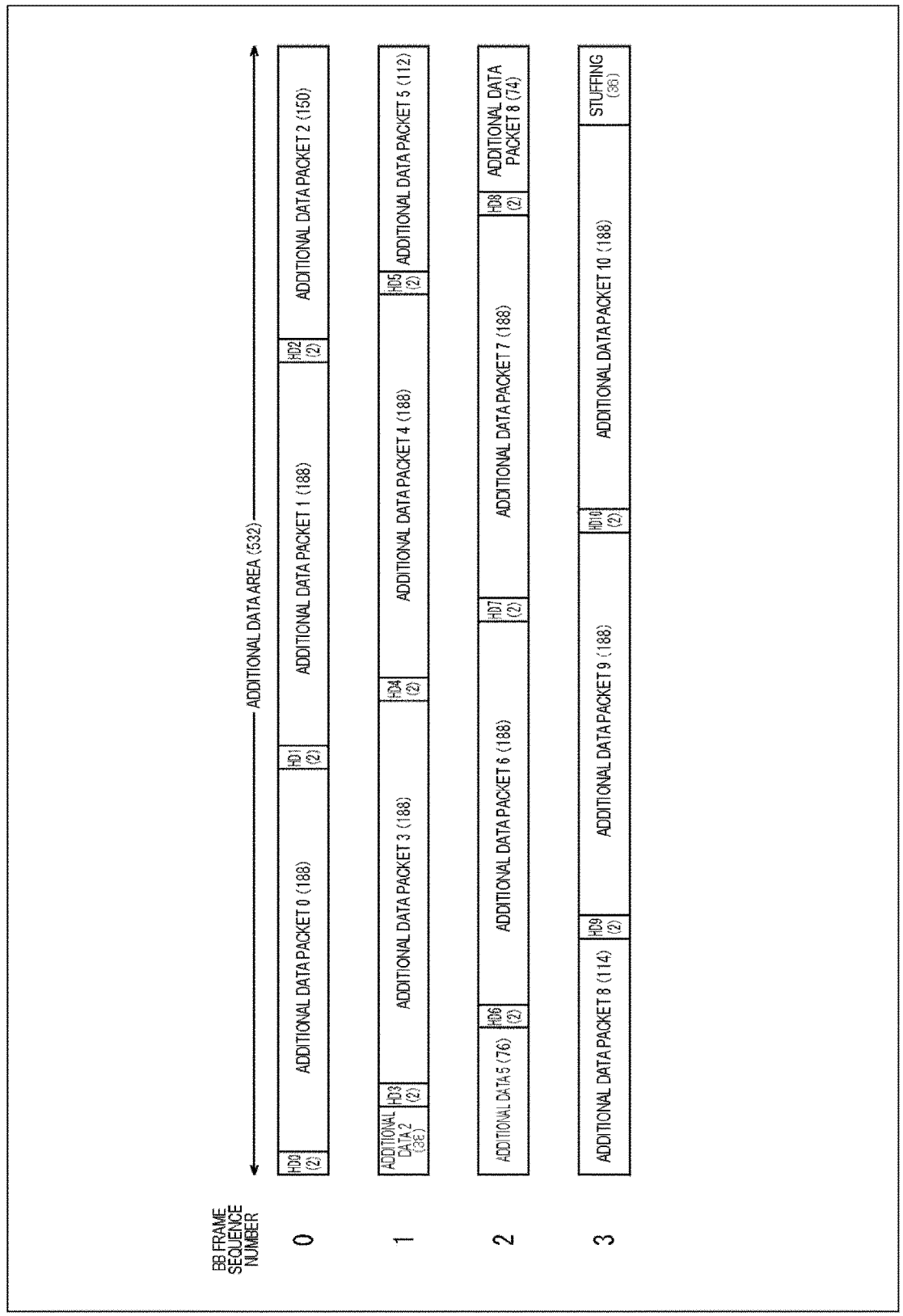

FIG. 18

| BB FRAME NUMBER | BB FRAME SEQUENCE NUMBER | ITEM | LENGTH (BYTE) | | START ADDRESS | END ADDRESS |
|---|---|---|---|---|---|---|
| 920 | 0 | BB HEADER | 10 | 12 | 0 | 9 |
| | | PAYLOAD HEADER | 2 | | 10 | 11 |
| | | ADDITIONAL DATA HEADER 0 | 2 | 532 | 303 | 304 |
| | | ADDITIONAL DATA PACKET 0 | 188 | | 305 | 492 |
| | | ADDITIONAL DATA HEADER 1 | 2 | | 493 | 494 |
| | | ADDITIONAL DATA PACKET 1 | 188 | | 495 | 682 |
| | | ADDITIONAL DATA HEADER 2 | 2 | | 683 | 684 |
| | | ADDITIONAL DATA PACKET 2 | 150 | | 685 | 834 |
| 921 | 1 | BB HEADER | 10 | 12 | 0 | 9 |
| | | PAYLOAD HEADER | 2 | | 10 | 11 |
| | | ADDITIONAL DATA PACKET 2 | 38 | 532 | 303 | 340 |
| | | ADDITIONAL DATA HEADER 3 | 2 | | 341 | 342 |
| | | ADDITIONAL DATA PACKET 3 | 188 | | 343 | 530 |
| | | ADDITIONAL DATA HEADER 4 | 2 | | 531 | 532 |
| | | ADDITIONAL DATA PACKET 4 | 188 | | 533 | 720 |
| | | ADDITIONAL DATA HEADER 5 | 2 | | 721 | 722 |
| | | ADDITIONAL DATA PACKET 5 | 112 | | 723 | 834 |
| 922 | 2 | BB HEADER | 10 | 12 | 0 | 9 |
| | | PAYLOAD HEADER | 2 | | 10 | 11 |
| | | ADDITIONAL DATA PACKET 5 | 76 | 532 | 303 | 378 |
| | | ADDITIONAL DATA HEADER 6 | 2 | | 379 | 380 |
| | | ADDITIONAL DATA PACKET 6 | 188 | | 381 | 568 |
| | | ADDITIONAL DATA HEADER 7 | 2 | | 569 | 570 |
| | | ADDITIONAL DATA PACKET 7 | 188 | | 571 | 758 |
| | | ADDITIONAL DATA HEADER 8 | 2 | | 759 | 760 |
| | | ADDITIONAL DATA PACKET 8 | 74 | | 761 | 834 |
| 923 | 3 | BB HEADER | 10 | 12 | 0 | 9 |
| | | PAYLOAD HEADER | 2 | | 10 | 11 |
| | | ADDITIONAL DATA PACKET 8 | 114 | 532 | 303 | 416 |
| | | ADDITIONAL DATA HEADER 9 | 2 | | 417 | 418 |
| | | ADDITIONAL DATA PACKET 9 | 188 | | 419 | 606 |
| | | ADDITIONAL DATA HEADER 10 | 2 | | 607 | 608 |
| | | ADDITIONAL DATA PACKET 10 | 188 | | 609 | 796 |
| | | STUFFING | 38 | | 797 | 834 |

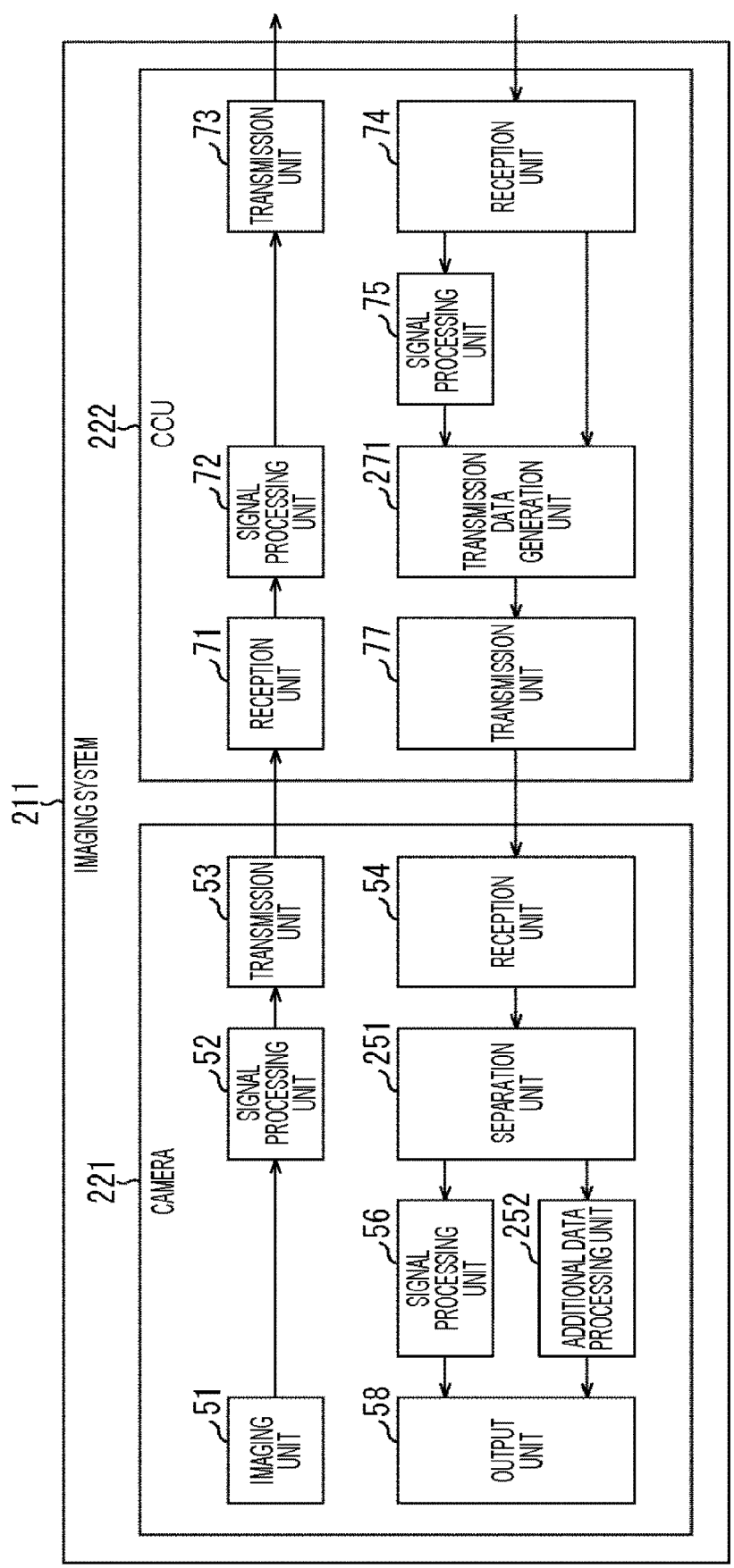

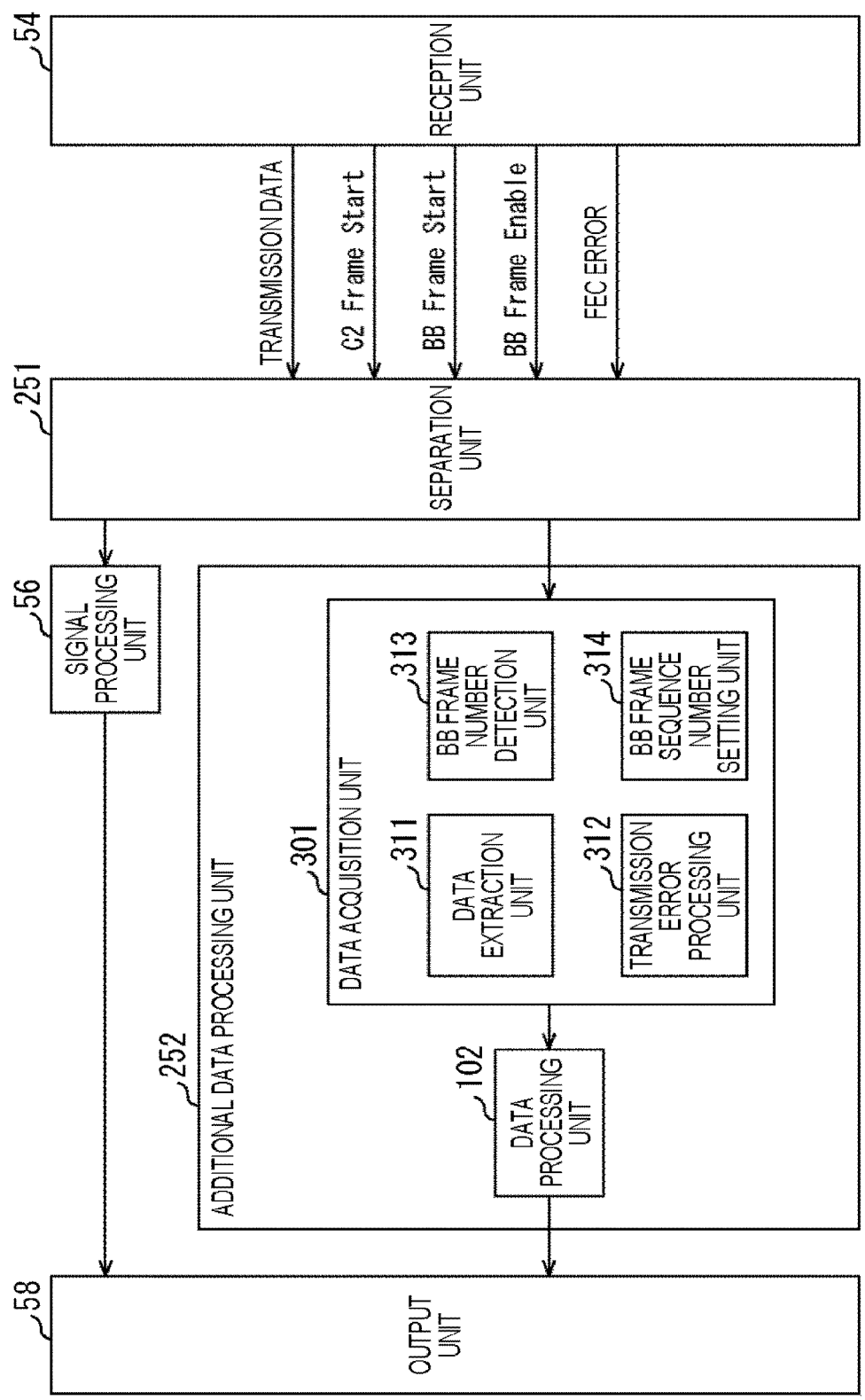

FIG. 23

| BB FRAME NUMBER | BB FRAME SEQUENCE NUMBER | |
|---|---|---|
| | NUMBER OF BB FRAMES =925 | NUMBER OF BB FRAMES =924 |
| 0 | 0 | 0 |
| 1 | 1 | 1 |
| 2 | 2 | 2 |
| 3 | 3 | 3 |
| 4 | 4 | 4 |
| 5 | 0 | 0 |
| 6 | 1 | 1 |
| 7 | 2 | 2 |
| 8 | 3 | 3 |
| 9 | 4 | 4 |
| ... | ... | ... |
| 915 | 0 | 0 |
| 916 | 1 | 1 |
| 917 | 2 | 2 |
| 918 | 3 | 3 |
| 919 | 4 | 4 |
| 920 | 0 | 0 |
| 921 | 1 | 1 |
| 922 | 2 | 2 |
| 923 | 3 | 3 |
| 924 | 4 | — |

FIG. 26

| NUMBER OF SEQUENCES | NUMBER OF ADDITIONAL DATA PACKETS IN BB FRAME SEQUENCE | AMOUNT OF STUFFING | AMOUNT OF STUFFING PER BB FRAME |
|---|---|---|---|
| 1 | 2 | 152 | 152.0 |
| 2 | 5 | 114 | 57.0 |
| 3 | 8 | 76 | 25.3 |
| 4 | 11 | 38 | 9.5 |
| 5 | 14 | 0 | 0.0 |
| 6 | 16 | 152 | 25.3 |
| 7 | 19 | 114 | 16.3 |
| 8 | 22 | 76 | 9.5 |
| 9 | 25 | 38 | 4.2 |
| 10 | 28 | 0 | 0.0 |

FIG. 27

| NUMBER OF SEQUENCES | NUMBER OF ADDITIONAL DATA PACKETS IN BB FRAME SEQUENCE | AMOUNT OF STUFFING | AMOUNT OF STUFFING PER BB FRAME |
|---|---|---|---|
| 1 | 3 | 114 | 114.0 |
| 2 | 7 | 98 | 49.0 |
| 3 | 11 | 82 | 27.3 |
| 4 | 15 | 66 | 16.5 |
| 5 | 19 | 50 | 10.0 |
| 6 | 23 | 34 | 5.7 |
| 7 | 27 | 18 | 2.6 |
| 8 | 31 | 2 | 0.3 |
| 9 | 34 | 116 | 12.9 |
| 10 | 38 | 100 | 10.0 |
| 11 | 42 | 84 | 7.6 |
| 12 | 46 | 68 | 5.7 |
| 13 | 50 | 52 | 4.0 |
| 14 | 54 | 36 | 2.6 |
| 15 | 58 | 20 | 1.3 |
| 16 | 62 | 4 | 0.3 |

FIG. 28

| BB FRAME NUMBER | BB FRAME SEQUENCE NUMBER | ITEM | LENGTH (BYTE) | START ADDRESS | END ADDRESS |
|---|---|---|---|---|---|
| 8n | 0 | BB HEADER | 10 | 0 | 9 |
| | | PAYLOAD HEADER | 2 | 10 | 11 |
| | | | 12 | | |
| | | ADDITIONAL DATA HEADER 0 | 2 | 303 | 304 |
| | | ADDITIONAL DATA PACKET 0 | 128 | 305 | 432 |
| | | ADDITIONAL DATA HEADER 1 | 2 | 433 | 434 |
| | | ADDITIONAL DATA PACKET 1 | 128 | 435 | 562 |
| | | ADDITIONAL DATA HEADER 2 | 2 | 504 | 563 | 564 |
| | | ADDITIONAL DATA PACKET 2 | 128 | 565 | 692 |
| | | ADDITIONAL DATA HEADER 3 | 2 | 693 | 694 |
| | | ADDITIONAL DATA PACKET 3 | 112 | 695 | 806 |
| 8n+1 | 1 | BB HEADER | 10 | 0 | 9 |
| | | PAYLOAD HEADER | 2 | 10 | 11 |
| | | | 12 | | |
| | | ADDITIONAL DATA PACKET 3 | 16 | 303 | 318 |
| | | ADDITIONAL DATA HEADER 4 | 2 | 319 | 320 |
| | | ADDITIONAL DATA PACKET 4 | 128 | 321 | 448 |
| | | ADDITIONAL DATA HEADER 5 | 2 | 449 | 450 |
| | | ADDITIONAL DATA PACKET 5 | 128 | 504 | 451 | 578 |
| | | ADDITIONAL DATA HEADER 6 | 2 | 579 | 580 |
| | | ADDITIONAL DATA PACKET 6 | 128 | 581 | 708 |
| | | ADDITIONAL DATA HEADER 7 | 2 | 709 | 710 |
| | | ADDITIONAL DATA PACKET 7 | 96 | 711 | 806 |
| 8n+2 | 2 | BB HEADER | 10 | 0 | 9 |
| | | PAYLOAD HEADER | 2 | 10 | 11 |
| | | | 12 | | |
| | | ADDITIONAL DATA PACKET 7 | 32 | 303 | 334 |
| | | ADDITIONAL DATA HEADER 8 | 2 | 335 | 336 |
| | | ADDITIONAL DATA PACKET 8 | 128 | 337 | 464 |
| | | ADDITIONAL DATA HEADER 9 | 2 | 465 | 466 |
| | | ADDITIONAL DATA PACKET 9 | 128 | 504 | 467 | 594 |
| | | ADDITIONAL DATA HEADER 10 | 2 | 595 | 596 |
| | | ADDITIONAL DATA PACKET 10 | 128 | 597 | 724 |
| | | ADDITIONAL DATA HEADER 11 | 2 | 725 | 726 |
| | | ADDITIONAL DATA PACKET 11 | 80 | 727 | 806 |
| 8n+3 | 3 | BB HEADER | 10 | 0 | 9 |
| | | PAYLOAD HEADER | 2 | 10 | 11 |
| | | | 12 | | |
| | | ADDITIONAL DATA PACKET 11 | 48 | 303 | 350 |
| | | ADDITIONAL DATA HEADER 12 | 2 | 351 | 352 |
| | | ADDITIONAL DATA PACKET 12 | 128 | 353 | 480 |
| | | ADDITIONAL DATA HEADER 13 | 2 | 481 | 482 |
| | | ADDITIONAL DATA PACKET 13 | 128 | 504 | 483 | 610 |
| | | ADDITIONAL DATA HEADER 14 | 2 | 611 | 612 |
| | | ADDITIONAL DATA PACKET 14 | 128 | 613 | 740 |
| | | ADDITIONAL DATA HEADER 15 | 2 | 741 | 742 |
| | | ADDITIONAL DATA PACKET 15 | 64 | 743 | 806 |
| 8n+4 | 4 | BB HEADER | 10 | 0 | 9 |
| | | PAYLOAD HEADER | 2 | 10 | 11 |
| | | | 12 | | |
| | | ADDITIONAL DATA PACKET 15 | 64 | 303 | 366 |
| | | ADDITIONAL DATA HEADER 16 | 2 | 367 | 368 |
| | | ADDITIONAL DATA PACKET 16 | 128 | 369 | 496 |
| | | ADDITIONAL DATA HEADER 17 | 2 | 497 | 498 |
| | | ADDITIONAL DATA PACKET 17 | 128 | 504 | 499 | 626 |
| | | ADDITIONAL DATA HEADER 18 | 2 | 627 | 628 |
| | | ADDITIONAL DATA PACKET 18 | 128 | 629 | 756 |
| | | ADDITIONAL DATA HEADER 19 | 2 | 757 | 758 |
| | | ADDITIONAL DATA PACKET 19 | 48 | 759 | 806 |

FIG. 29

| BB FRAME NUMBER | BB FRAME SEQUENCE NUMBER | ITEM | LENGTH (BYTE) | | START ADDRESS | END ADDRESS |
|---|---|---|---|---|---|---|
| 8n+5 | 5 | BB HEADER | 10 | 12 | 0 | 9 |
| | | PAYLOAD HEADER | 2 | | 10 | 11 |
| | | ADDITIONAL DATA PACKET 19 | 80 | 504 | 303 | 382 |
| | | ADDITIONAL DATA HEADER 20 | 2 | | 383 | 384 |
| | | ADDITIONAL DATA PACKET 20 | 128 | | 385 | 512 |
| | | ADDITIONAL DATA HEADER 21 | 2 | | 513 | 514 |
| | | ADDITIONAL DATA PACKET 21 | 128 | | 515 | 642 |
| | | ADDITIONAL DATA HEADER 22 | 2 | | 643 | 644 |
| | | ADDITIONAL DATA PACKET 22 | 128 | | 645 | 772 |
| | | ADDITIONAL DATA HEADER 23 | 2 | | 773 | 774 |
| | | ADDITIONAL DATA PACKET 23 | 32 | | 775 | 806 |
| 8n+6 | 6 | BB HEADER | 10 | 12 | 0 | 9 |
| | | PAYLOAD HEADER | 2 | | 10 | 11 |
| | | ADDITIONAL DATA PACKET 23 | 96 | 504 | 303 | 398 |
| | | ADDITIONAL DATA HEADER 24 | 2 | | 399 | 400 |
| | | ADDITIONAL DATA PACKET 24 | 128 | | 401 | 528 |
| | | ADDITIONAL DATA HEADER 25 | 2 | | 529 | 530 |
| | | ADDITIONAL DATA PACKET 25 | 128 | | 531 | 658 |
| | | ADDITIONAL DATA HEADER 26 | 2 | | 659 | 660 |
| | | ADDITIONAL DATA PACKET 26 | 128 | | 661 | 788 |
| | | ADDITIONAL DATA HEADER 27 | 2 | | 789 | 790 |
| | | ADDITIONAL DATA PACKET 27 | 16 | | 791 | 806 |
| 8n+7 | 7 | BB HEADER | 10 | 12 | 0 | 9 |
| | | PAYLOAD HEADER | 2 | | 10 | 11 |
| | | ADDITIONAL DATA PACKET 27 | 112 | 504 | 303 | 414 |
| | | ADDITIONAL DATA HEADER 28 | 2 | | 415 | 416 |
| | | ADDITIONAL DATA PACKET 28 | 128 | | 417 | 544 |
| | | ADDITIONAL DATA HEADER 29 | 2 | | 545 | 546 |
| | | ADDITIONAL DATA PACKET 29 | 128 | | 547 | 674 |
| | | ADDITIONAL DATA HEADER 30 | 2 | | 675 | 676 |
| | | ADDITIONAL DATA PACKET 30 | 128 | | 677 | 804 |
| | | STUFFING | 2 | | 805 | 806 |

FIG. 30

| BB FRAME NUMBER | BB FRAME SEQUENCE NUMBER | ITEM | LENGTH (BYTE) | | START ADDRESS | END ADDRESS |
|---|---|---|---|---|---|---|
| 920 | 0 | BB HEADER | 10 | 12 | 0 | 9 |
| | | PAYLOAD HEADER | 2 | | 10 | 11 |
| | | ADDITIONAL DATA HEADER 0 | 2 | 504 | 303 | 304 |
| | | ADDITIONAL DATA PACKET 0 | 128 | | 305 | 432 |
| | | ADDITIONAL DATA HEADER 1 | 2 | | 433 | 434 |
| | | ADDITIONAL DATA PACKET 1 | 128 | | 435 | 562 |
| | | ADDITIONAL DATA HEADER 2 | 2 | | 563 | 564 |
| | | ADDITIONAL DATA PACKET 2 | 128 | | 565 | 692 |
| | | ADDITIONAL DATA HEADER 3 | 2 | | 693 | 694 |
| | | ADDITIONAL DATA PACKET 3 | 112 | | 695 | 806 |
| 921 | 1 | BB HEADER | 10 | 12 | 0 | 9 |
| | | PAYLOAD HEADER | 2 | | 10 | 11 |
| | | ADDITIONAL DATA PACKET 3 | 16 | 504 | 303 | 318 |
| | | ADDITIONAL DATA HEADER 4 | 2 | | 319 | 320 |
| | | ADDITIONAL DATA PACKET 4 | 128 | | 321 | 448 |
| | | ADDITIONAL DATA HEADER 5 | 2 | | 449 | 450 |
| | | ADDITIONAL DATA PACKET 5 | 128 | | 451 | 578 |
| | | ADDITIONAL DATA HEADER 6 | 2 | | 579 | 580 |
| | | ADDITIONAL DATA PACKET 6 | 128 | | 581 | 708 |
| | | ADDITIONAL DATA HEADER 7 | 2 | | 709 | 710 |
| | | ADDITIONAL DATA PACKET 7 | 96 | | 711 | 806 |
| 922 | 2 | BB HEADER | 10 | 12 | 0 | 9 |
| | | PAYLOAD HEADER | 2 | | 10 | 11 |
| | | ADDITIONAL DATA PACKET 7 | 32 | 504 | 303 | 334 |
| | | ADDITIONAL DATA HEADER 8 | 2 | | 335 | 336 |
| | | ADDITIONAL DATA PACKET 8 | 128 | | 337 | 464 |
| | | ADDITIONAL DATA HEADER 9 | 2 | | 465 | 466 |
| | | ADDITIONAL DATA PACKET 9 | 128 | | 467 | 594 |
| | | ADDITIONAL DATA HEADER 10 | 2 | | 595 | 596 |
| | | ADDITIONAL DATA PACKET 10 | 128 | | 597 | 724 |
| | | ADDITIONAL DATA HEADER 11 | 2 | | 725 | 726 |
| | | ADDITIONAL DATA PACKET 11 | 80 | | 727 | 806 |
| 923 | 3 | BB HEADER | 10 | 12 | 0 | 9 |
| | | PAYLOAD HEADER | 2 | | 10 | 11 |
| | | ADDITIONAL DATA PACKET 11 | 48 | 504 | 303 | 350 |
| | | ADDITIONAL DATA HEADER 12 | 2 | | 351 | 352 |
| | | ADDITIONAL DATA PACKET 12 | 128 | | 353 | 480 |
| | | ADDITIONAL DATA HEADER 13 | 2 | | 481 | 482 |
| | | ADDITIONAL DATA PACKET 13 | 128 | | 483 | 610 |
| | | ADDITIONAL DATA HEADER 14 | 2 | | 611 | 612 |
| | | ADDITIONAL DATA PACKET 14 | 128 | | 613 | 740 |
| | | ADDITIONAL DATA HEADER 15 | 2 | | 741 | 742 |
| | | ADDITIONAL DATA PACKET 15 | 64 | | 743 | 806 |
| 924 | 4 | BB HEADER | 10 | 12 | 0 | 9 |
| | | PAYLOAD HEADER | 2 | | 10 | 11 |
| | | ADDITIONAL DATA PACKET 15 | 64 | 504 | 303 | 366 |
| | | ADDITIONAL DATA HEADER 16 | 2 | | 367 | 368 |
| | | ADDITIONAL DATA PACKET 16 | 128 | | 369 | 496 |
| | | ADDITIONAL DATA HEADER 17 | 2 | | 497 | 498 |
| | | ADDITIONAL DATA PACKET 17 | 128 | | 499 | 626 |
| | | ADDITIONAL DATA HEADER 18 | 2 | | 627 | 628 |
| | | ADDITIONAL DATA PACKET 18 | 128 | | 629 | 756 |
| | | STUFFING | 50 | | 757 | 806 |

FIG. 31

| BB FRAME NUMBER | BB FRAME SEQUENCE NUMBER | ITEM | LENGTH (BYTE) | | START ADDRESS | END ADDRESS |
|---|---|---|---|---|---|---|
| 920 | 0 | BB HEADER | 10 | 12 | 0 | 9 |
| | | PAYLOAD HEADER | 2 | | 10 | 11 |
| | | ADDITIONAL DATA HEADER 0 | 2 | 504 | 303 | 304 |
| | | ADDITIONAL DATA PACKET 0 | 128 | | 305 | 432 |
| | | ADDITIONAL DATA HEADER 1 | 2 | | 433 | 434 |
| | | ADDITIONAL DATA PACKET 1 | 128 | | 435 | 562 |
| | | ADDITIONAL DATA HEADER 2 | 2 | | 563 | 564 |
| | | ADDITIONAL DATA PACKET 2 | 128 | | 565 | 692 |
| | | ADDITIONAL DATA HEADER 3 | 2 | | 693 | 694 |
| | | ADDITIONAL DATA PACKET 3 | 112 | | 695 | 806 |
| 921 | 1 | BB HEADER | 10 | 12 | 0 | 9 |
| | | PAYLOAD HEADER | 2 | | 10 | 11 |
| | | ADDITIONAL DATA PACKET 3 | 16 | 504 | 303 | 318 |
| | | ADDITIONAL DATA HEADER 4 | 2 | | 319 | 320 |
| | | ADDITIONAL DATA PACKET 4 | 128 | | 321 | 448 |
| | | ADDITIONAL DATA HEADER 5 | 2 | | 449 | 450 |
| | | ADDITIONAL DATA PACKET 5 | 128 | | 451 | 578 |
| | | ADDITIONAL DATA HEADER 6 | 2 | | 579 | 580 |
| | | ADDITIONAL DATA PACKET 6 | 128 | | 581 | 708 |
| | | ADDITIONAL DATA HEADER 7 | 2 | | 709 | 710 |
| | | ADDITIONAL DATA PACKET 7 | 96 | | 711 | 806 |
| 922 | 2 | BB HEADER | 10 | 12 | 0 | 9 |
| | | PAYLOAD HEADER | 2 | | 10 | 11 |
| | | ADDITIONAL DATA PACKET 7 | 32 | 504 | 303 | 334 |
| | | ADDITIONAL DATA HEADER 8 | 2 | | 335 | 336 |
| | | ADDITIONAL DATA PACKET 8 | 128 | | 337 | 464 |
| | | ADDITIONAL DATA HEADER 9 | 2 | | 465 | 466 |
| | | ADDITIONAL DATA PACKET 9 | 128 | | 467 | 594 |
| | | ADDITIONAL DATA HEADER 10 | 2 | | 595 | 596 |
| | | ADDITIONAL DATA PACKET 10 | 128 | | 597 | 724 |
| | | ADDITIONAL DATA HEADER 11 | 2 | | 725 | 726 |
| | | ADDITIONAL DATA PACKET 11 | 80 | | 727 | 806 |
| 923 | 3 | BB HEADER | 10 | 12 | 0 | 9 |
| | | PAYLOAD HEADER | 2 | | 10 | 11 |
| | | ADDITIONAL DATA PACKET 11 | 48 | 504 | 303 | 350 |
| | | ADDITIONAL DATA HEADER 12 | 2 | | 351 | 352 |
| | | ADDITIONAL DATA PACKET 12 | 128 | | 353 | 480 |
| | | ADDITIONAL DATA HEADER 13 | 2 | | 481 | 482 |
| | | ADDITIONAL DATA PACKET 13 | 128 | | 483 | 610 |
| | | ADDITIONAL DATA HEADER 14 | 2 | | 611 | 612 |
| | | ADDITIONAL DATA PACKET 14 | 128 | | 613 | 740 |
| | | STUFFING | 66 | | 741 | 806 |

FIG. 33

| | Symbol 0 | Symbol 1 | Symbol 2 | Symbol 3 |
|---|---|---|---|---|
| | 0 | 0 | 0 | 0 |
| | 1 | 1 | 1 | 1 |
| | 2 | 2 | 2 | 2 |
| | 3 | 3 | 3 | 3 |
| | 4 | 4 | 4 | 4 |
| | 5 | 5 | 5 | 5 |
| | 6 | 6 | 6 | 6 |
| | 7 | 7 | 7 | 7 |
| | 8 | 8 | 8 | 8 |
| | 9 | 9 | 9 | 9 |
| | 10 | 10 | 10 | 10 |
| | 11 | 11 | 11 | 11 |
| | 12 | 12 | 12 | 12 |
| | ... | ... | ... | ... |
| | 3343 | 3343 | 3343 | 3343 |
| | 3344 | 3344 | | |

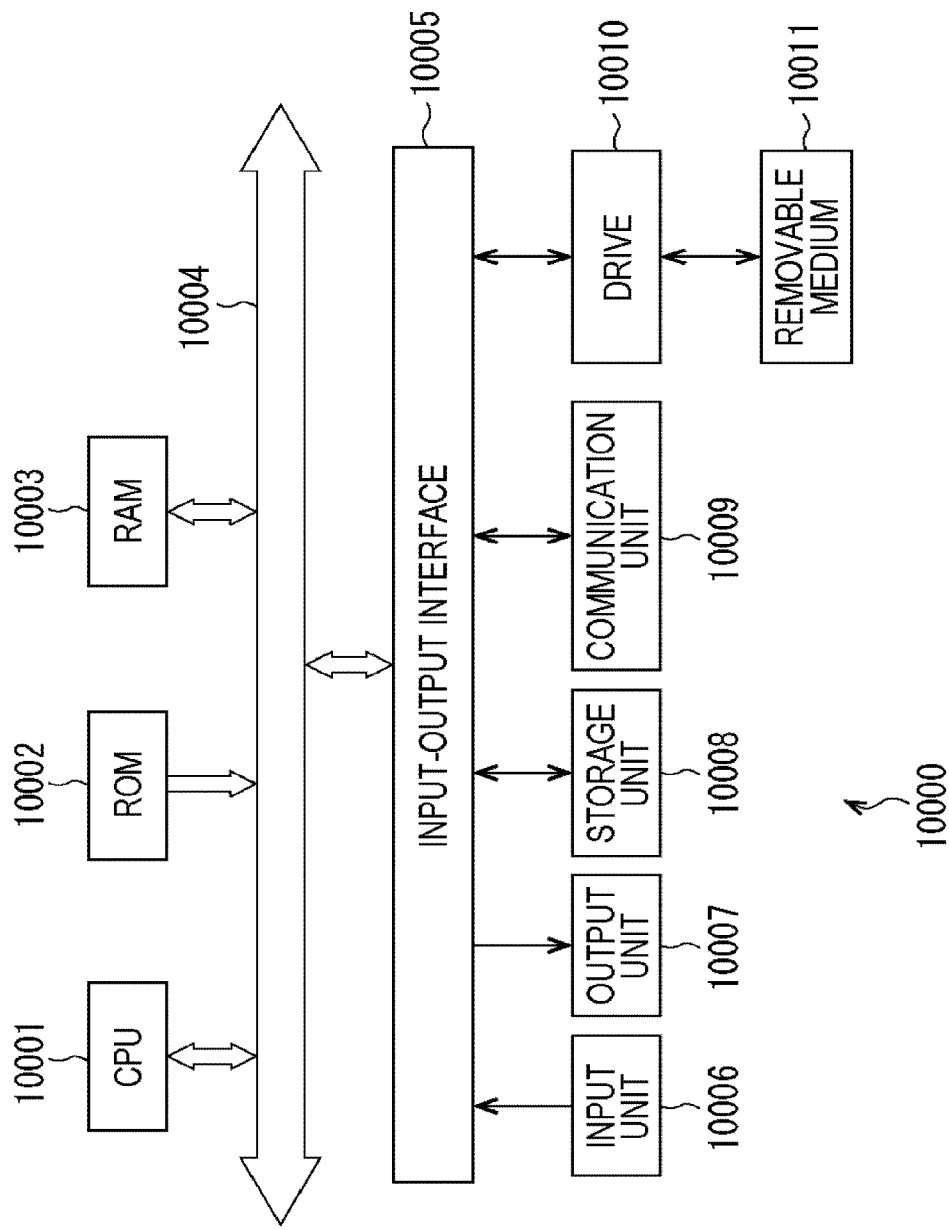

TRANSMISSION DEVICE, RECEPTION DEVICE, TRANSMISSION SYSTEM, AND TRANSMISSION METHOD

TECHNICAL FIELD

The present technology relates to a transmission device, a reception device, a transmission system, and a transmission method, and particularly relates to a transmission device, a reception device, a transmission system, and a transmission method preferable for use in a case where subdata is added to main data for transmission.

BACKGROUND ART

Conventionally, a technique for adding and transmitting a variable-length packet other than a transport stream (TS) packet in a digital broadcasting system has been disclosed. Specifically, it has been disclosed that a TS packet, third packets obtained by dividing a variable-length packet by the same length as the TS packet, and header information including types of respective packets and flags indicating whether or not the respective packets include a head position of the variable-length packet are multiplexed and transmitted. Furthermore, it has been disclosed that information indicating the head position of the variable-length packet is inserted into the third packets (see, for example, Patent Document 1).

CITATION LIST

Patent Document

Patent Document 1: Japanese Patent Application Laid-Open No. 2018-121341

SUMMARY OF THE INVENTION

Problems to be Solved by the Invention

However, in the technique described in Patent Document 1, an effective data length is shortened and transmission efficiency is reduced by the amount of the flags indicating whether or not the head position of the variable-length packet is included, which are included in the header information, and the information indicating the head position of the variable-length packet included in each third packet.

The present technology has been made in view of such a situation, and is intended to improve transmission efficiency of subdata added to main data such as video data.

Solutions to Problems

A transmission device of a first aspect of the present technology includes a frame sequence number setting unit that, on the basis of a frame number indicating an order of a subframe in a main frame, assigns to the subframe a frame sequence number indicating an order of the subframe in a frame sequence including a plurality of the subframes, and a multiplexing unit that arranges a data packet at a predetermined position in the subframe on the basis of the frame sequence number.

A reception device of a second aspect of the present technology includes a frame number detection unit that detects a frame number indicating an order of a subframe in a main frame, a frame sequence number setting unit that, on the basis of the frame number, assigns to the subframe a frame sequence number indicating an order of the subframe in a frame sequence including a plurality of the subframes, and a data extraction unit that extracts a data packet from the subframe on the basis of the frame sequence number.

A transmission system of a third aspect of the present technology includes a transmission device, and a reception device, in which the transmission device includes a first frame sequence number setting unit that, on the basis of a frame number indicating an order of a subframe in a main frame, assigns to the subframe a frame sequence number indicating an order of the subframe in a frame sequence including a plurality of the subframes, a multiplexing unit that arranges a data packet at a predetermined position in the subframe on the basis of the frame sequence number, and a transmission unit that transmits transmission data including the main frame, and the reception device includes a reception unit that receives the transmission data, a frame number detection unit that detects the frame number of the subframe in the main frame, a second frame sequence number setting unit that, on the basis of the frame number, assigns to the subframe the frame sequence number, and a data extraction unit that extracts the data packet from the subframe on the basis of the frame sequence number.

A transmission method of the third aspect of the present technology includes causing a transmission device to, on the basis of a frame number indicating an order of a subframe in a main frame, assign to the subframe a frame sequence number indicating an order of the subframe in a frame sequence including a plurality of the subframes, arrange a data packet at a predetermined position in the subframe on the basis of the frame sequence number, and transmit transmission data including the main frame, and causing a reception device to receive the transmission data, detect the frame number of the subframe in the main frame, assign to the subframe the frame sequence number on the basis of the frame number, and extract the data packet from the subframe on the basis of the frame sequence number.

In the first aspect of the present technology, on the basis of a frame number indicating an order of a subframe in a main frame, a frame sequence number indicating an order of the subframe in a frame sequence including a plurality of the subframes is assigned to the subframe, and a data packet is arranged at a predetermined position in the subframe on the basis of the frame sequence number.

In the second aspect of the present technology, a frame number indicating an order of a subframe in a main frame is detected, a frame sequence number indicating an order of the subframe in a frame sequence including a plurality of the subframes is assigned to the subframe on the basis of the frame number, and a data packet is extracted from the subframe on the basis of the frame sequence number.

In the third aspect of the present technology, on the basis of a frame number indicating an order of a subframe in a main frame, a frame sequence number indicating an order of the subframe in a frame sequence including a plurality of the subframes is assigned to the subframe, a data packet is arranged at a predetermined position in the subframe on the basis of the frame sequence number, transmission data including the main frame is transmitted, the transmission data is received, the frame number of the subframe in the main frame is detected, the frame sequence number is assigned to the subframe on the basis of the frame number, and the data packet is extracted from the subframe on the basis of the frame sequence number.

BRIEF DESCRIPTION OF DRAWINGS

FIG. 6 is a diagram illustrating a format example of an additional data header.

FIG. 16 is a diagram illustrating an example of a normal sequence table.

FIG. 17 is a diagram illustrating exceptions to the format of the sequence additional data area.

FIG. 18 is a diagram illustrating exceptions to the sequence table.

FIG. 19 is a block diagram illustrating a configuration example of functions of an imaging system of FIG. 13.

FIG. 20 is a block diagram illustrating a configuration example of functions of an additional data processing unit of FIG. 19.

FIG. 23 is a table illustrating correspondence between a BB frame number and a BB frame sequence number.

FIG. 26 is a diagram for explaining a first example of a method of setting the number of sequences.

FIG. 27 is a diagram for explaining a second example of a method of setting the number of sequences.

FIG. 28 is a diagram illustrating a second example of a sequence table.

FIG. 29 is a diagram illustrating a second example of the sequence table.

FIG. 30 is a diagram illustrating a second example of the sequence table.

FIG. 31 is a diagram illustrating a second example of the sequence table.

FIG. 33 is a diagram for explaining the shuffling process.

FIG. 41 is a diagram illustrating a configuration example of a computer.

MODE FOR CARRYING OUT THE INVENTION

Hereinafter, a mode for carrying out the present technology will be described. The description will be made in the following order.
1. First embodiment
2. Second embodiment
3. Method of setting number of sequences of BB frame sequence
4. Modification example
5. Application example
6. Others 1. First Embodiment First, a first embodiment of the present technology will be described with reference to FIGS. 1 to 12.

<Configuration Example of Bbroadcasting System 1>

Figure 1:
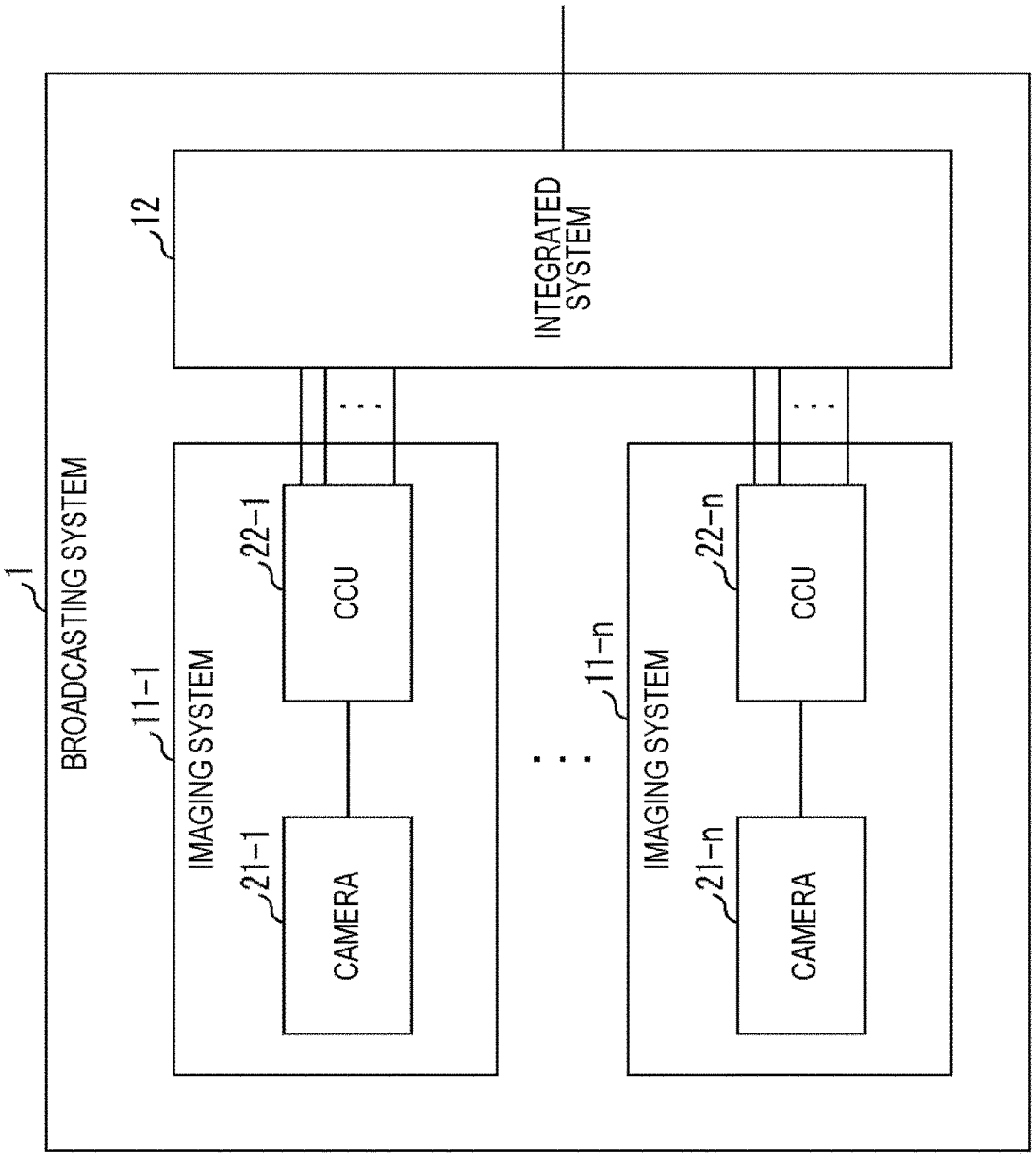
FIG. 1 is a block diagram illustrating a first embodiment of a broadcasting system to which the present technology is applied.

FIG. 1 is a block diagram illustrating a configuration example of a broadcasting system 1 to which the present technology is applied.

The broadcasting system 1 is a system that performs imaging, editing, recording, outputting, and the like of video for broadcasting. The broadcasting system 1 includes an imaging system 11-1 to an imaging system 11-n, and an integrated system 12.

The imaging system 11-1 to the imaging system 11-n are systems that image video individually. The imaging system 11-i (i=1 to n) includes a camera 21-i and a camera control unit (CCU) 22-i.

The camera 21-i performs imaging, converts obtained video data into transmission data of a predetermined method, and transmits the transmission data to the CCU 22-i. Note that the video data may or may not include audio data acquired together with the video.

Furthermore, the camera 21-i receives the transmission data from the CCU 22-i. For example, the camera 21-i outputs various data (for example, return video data, prompt data, sub-audio data, and the like) included in the transmission data.

Note that the return video is, for example, video being broadcast by the broadcasting system 1 and is used for applications such as confirmation by a camera operator. Furthermore, the return video data may or may not include audio data corresponding to return video. The prompt is used, for example, for applications such as conveying a manuscript, a script, an instruction, or the like to a performer by text or the like. Therefore, the prompt can be said to be data related to text, for example.

The CCU 22-*i* performs controlling of the camera 21-*i*, signal processing on video data acquired from the camera 21-*i*, and relaying of various data between the camera 21-*i* and the integrated system 12, and the like. For example, the CCU 22-*i* restores video data from the transmission data received from the camera 21-*i*, performs various signal processing on the video data, and transmits the video data to the integrated system 12. For example, the CCU 22-*i* receives the return video data, additional data (for example, prompt data, sub-audio data, and so on) and various control signals from the integrated system 12, generates transmission data including the return video data and the additional data, and transmits the transmission data to the camera 21-*i*.

Note that hereinafter, in a case where it is not necessary to individually distinguish the imaging system 11-1 to the imaging system 11-*n*, the camera 21-1 to the camera 21-*n*, and the CCU 22-1 to the CCU 22-*n*, they will be simply referred to as an imaging system 11, a camera 21, and a CCU 22, respectively.

The integrated system 12 performs recording and outputting of video data acquired from each CCU 22, displaying of video based on the video data, switching of the video, and editing of the video, and the like. Furthermore, the integrated system 12 controls each camera 21 via each CCU 22.

<Example of Transmission Method Between Camera 21 and CCU 22>

Next, an example of a transmission method between the camera 21 and the CCU 22 will be described with reference to FIGS. 2 to 7.

Data transmission between the camera 21 and the CCU 22 is performed according to, for example, the standards specified in Digital Video Broadcasting (DVB)-C2. DVB-C2 is specified in ETSI EN 302 769 (Digital Video Broadcasting (DVB); Frame Structure channel coding and modulation for a second generation digital transmission system for cable system (DVB-C2)).

<Format Example of C2 Frame>

Figure 2:
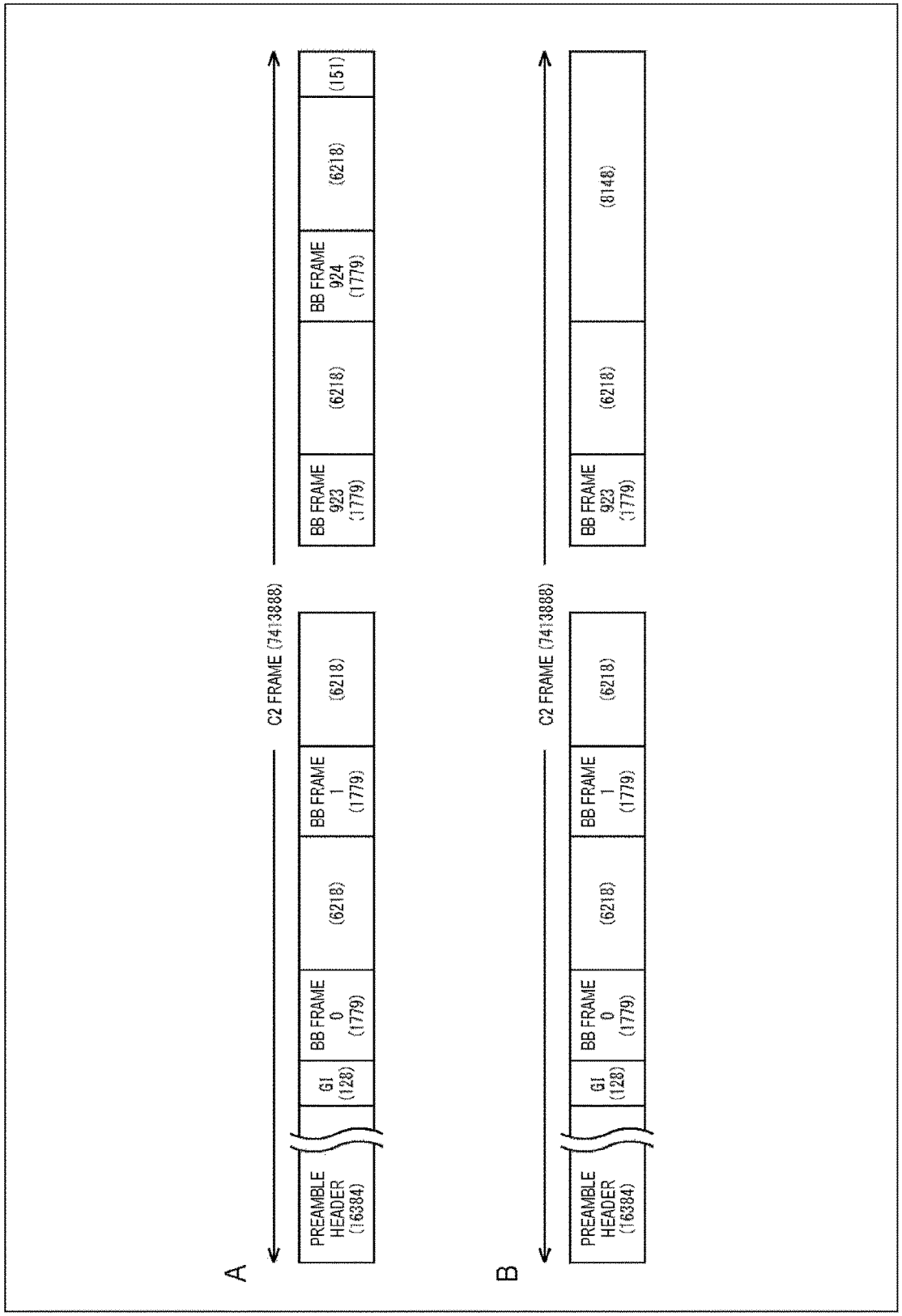
FIG. 2 is a diagram illustrating a format example of a C2 frame.

FIG. 2 illustrates a format example of a C2 frame, which is a main frame for data transmission between the camera 21 and the CCU 22, and is a unit of transmitting and receiving transmission data between the camera 21 and the CCU 22. That is, transmission data including the C2 frame is transmitted and received between the camera 21 and the CCU 22. Note that the numbers in parentheses in the diagram indicate the number of bytes.

The length of the C2 frame is 7,413,888 clocks (clock frequency is 36.571 MHz=$(1/(448\times10^{-6}))\times4096\times4$). A 16,384-byte preamble header and a 128-byte guard interval (GI) area are arranged at the head of the C2 frame. Thereafter, a BB frame, which is a 1,779-byte subframe, is arranged every 7,997 bytes. 925 or 924 BB frames are arranged in the C2 frame. In a case where 925 BB frames are arranged, the last 151 bytes of the C2 frame becomes free space. In a case where 924 BB frames are arranged, the last 8,148 bytes of the C2 frame becomes free space.

<Format Example of BB Frame>

Figure 3:
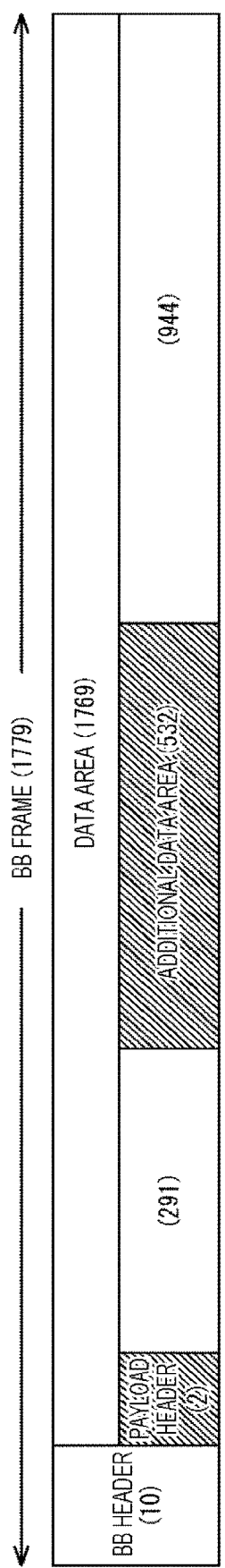
FIG. 3 is a diagram illustrating a format example of a BB frame.

FIG. 3 illustrates a format example of the BB frame arranged within the C2 frame. Note that the numbers in parentheses in the diagram indicate the number of bytes.

In the BB frame, a 10-byte BB header is arranged at the head, and then a 1,769-byte data area is arranged. The data area is an area in which various data transmitted using the C2 frame are stored, and a two-byte payload header is arranged at the head.

An additional data area of 532 bytes is arranged from the 294th to 825th bytes of the data area (304th to 835th bytes of the BB frame). The additional data area is an area in which additional data added as subdata is arranged in addition to the main data (for example, video data or the like). For example, the additional data is data related to the main data, and prompt data, sub-audio data, and the like are assumed. Note that the main data is arranged in an area other than the additional data area of a user data area.

<Format Example of Payload Header>

Figure 4:
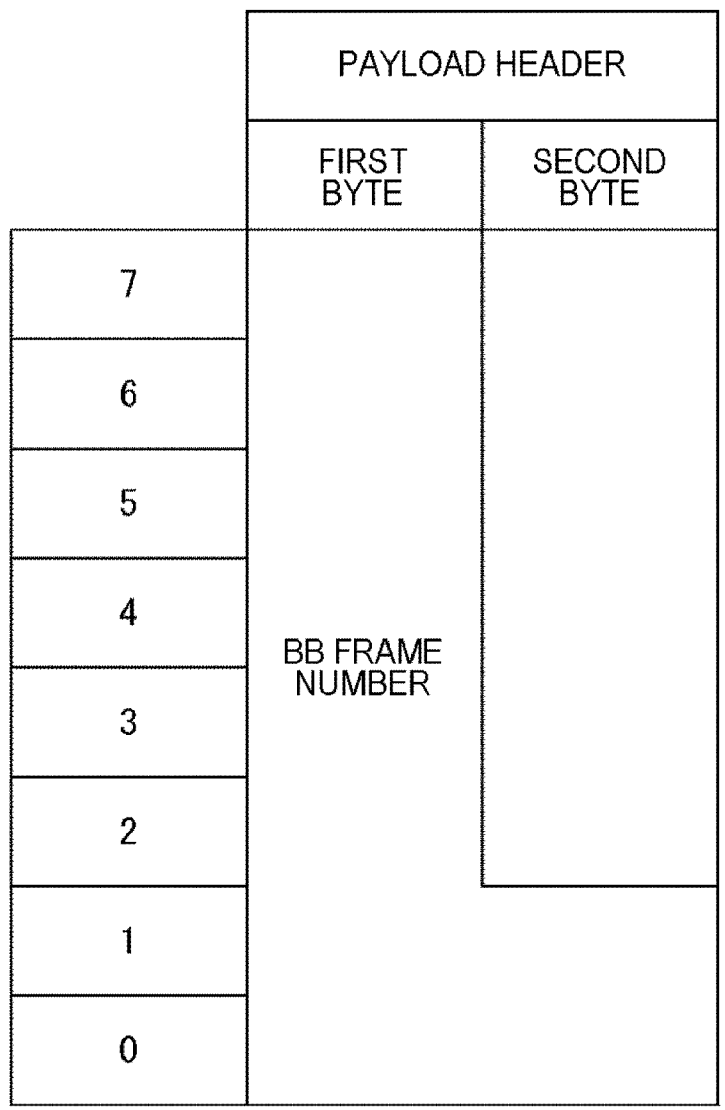
FIG. 4 is a diagram illustrating a first format example of a payload header.

FIG. 4 illustrates a format example of the payload header of the BB frame. Note that hereinafter, the least significant bit of each byte of the payload header is the zeroth bit, and the most significant bit is the seventh bit.

A 10-bit BB frame number is arranged from the zeroth bit of the first byte to the second bit of the second byte of the payload header. Note that the lowest bit of the 10-bit BB frame number is the zeroth bit of the first byte of the payload header, and the most significant bit is the first bit of the second byte of the payload header. The BB frame number indicates the order of each BB frame in the C2 frame and is used for identifying the BB frame, or the like. For example, the BB frame number of the BB frame at the head of the C2 frame is 0. Furthermore, the BB frame number of the BB frame at the end of the C2 frame is 924 in a case where the number of BB frames in the C2 frame is 925, and 923 in a case where the number of BB frames in the C2 frame is 924.

The remaining area of the payload header is a free area.

<Format Example of Additional Data Area>

Figure 5:
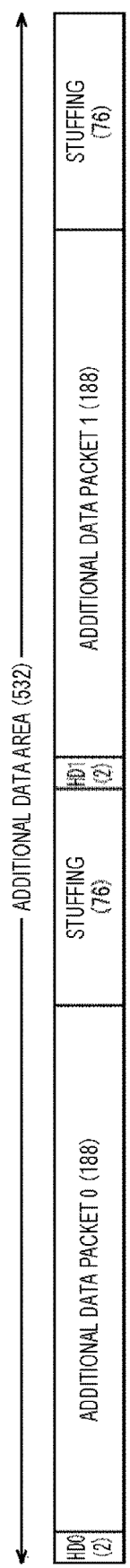
FIG. 5 is a diagram illustrating a format example of an additional data area.

FIG. 5 illustrates a format example of the additional data area of the BB frame. Note that the numbers in parentheses in the diagram indicate the number of bytes.

A two-byte additional data header 0 is arranged from the first to second bytes of the additional data area. The additional data header 0 is a header corresponding to an additional data packet 0 arranged immediately subsequently.

The 188-byte additional data packet 0 is arranged from the third to 190th bytes of the additional data area.

The 191st to 266th bytes of the additional data area are a 76-byte stuffing area.

A two-byte additional data header 1 is arranged from the 267th to 268th bytes of the additional data area. The additional data header 1 is a header corresponding to an additional data packet 1 arranged immediately subsequently.

The 188-byte additional data packet 1 is arranged from the 269th to 456th bytes of the additional data area.

The 457th to 532nd bytes of the additional data area are a 76-byte stuffing area.

Note that the additional data packet 0 and the additional data packet 1 are, for example, packets having the same format as the transport packet of Moving Picture Experts Group (MPEG) 2-Transport Stream (TS).

Thus, two additional data packets obtained by packetizing the additional data to a predetermined length are arranged in the additional data area of each BB frame.

<Format Example of Additional Data Header>

FIG. 6 illustrates a format example of the additional data header. Note that, hereinafter, the least significant bit of each byte of the additional data header is the zeroth bit, and the most significant bit is the seventh bit.

A seven-bit data type is arranged from the zeroth to sixth bits of the first byte of the additional data header. As the data type, an identification value for identifying the type of data included in an additional data packet is set. Since the data type has seven bits, 128 types of additional data can be identified.

For example, in a case where two types of prompt data are added as additional data, different identification values are assigned to the respective prompt data. For example, in a case where audio data of four channels is added as additional data, different identification values are assigned to the audio data of the respective channels. For example, in a case where two types of prompt data and audio data of four channels are added as additional data, different identification values are assigned to the respective prompt data and the audio data of the respective channels.

A validity flag is arranged at the seventh bit of the additional data header. The validity flag indicates validity of the additional data packet, that is, whether or not the additional data packet includes valid data. For example, in a case where the additional data packet is valid, the value of the validity flag is set to 1, and in a case where the additional data packet is invalid, the value of the validity flag is set to 0.

The second byte of the additional data header is a user data area, which can be used for any purpose. Note that in a case where the user data area is not used, the additional data header can be set to the first one byte only.

<Control Signal Example of C2 Frame>

Figure 7:
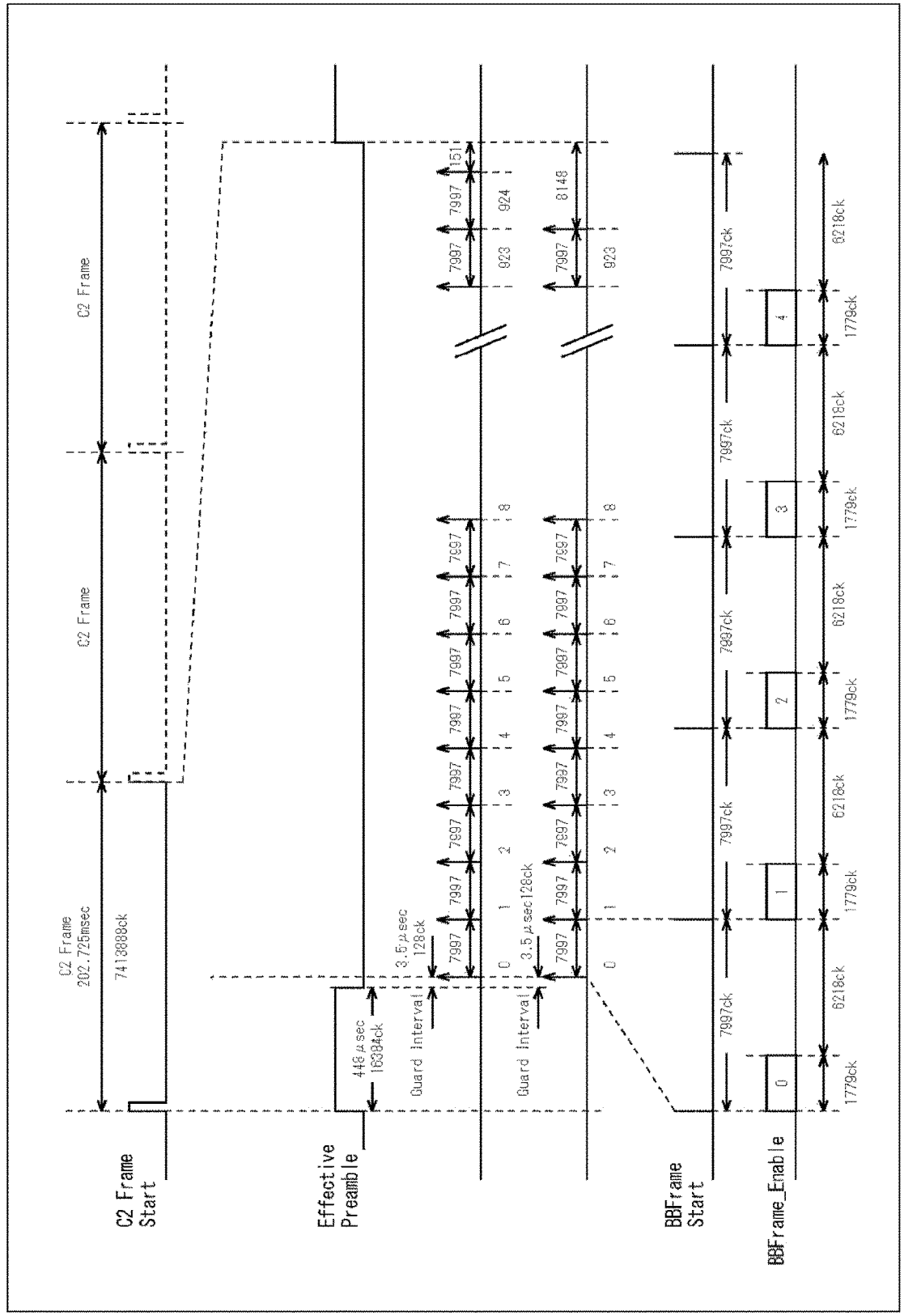
FIG. 7 is a diagram illustrating an example of a control signal of a C2 frame.

FIG. 7 illustrates an example of a control signal used for data transmission using the C2 frame. This control signal is used in, for example, a case where data is multiplexed on the transmission side, a case where data is separated on the reception side, or the like. Note that in this example, an example of a case where data transmission using a clock of approximately 36.571 MHz is illustrated.

A C2 frame start signal is a signal indicating a head position of the C2 frame. The C2 frame start signal is output every 7,413,888 clocks (approximately 202.725 milliseconds).

An effective preamble signal is a signal indicating a section of the preamble header in the C2 frame. The effective preamble signal starts to be output in synchronization with the C2 frame start signal, and is continuously output for 16,384 clocks (approximately 448 microseconds).

A BB frame start signal is a signal indicating the head position of each BB frame in the C2 frame. The BB frame signal is output every 7,997 clocks (approximately 222.1 microseconds) repeatedly for 925 or 924 times after a guard interval of 128 clocks (approximately 3.5 microseconds) provided after the effective preamble signal.

A BB frame enable signal is a signal indicating a section of the BB frame. The BB frame enable signal starts to be output in synchronization with the BB frame start signal, and is continuously output for 1,779 clocks (approximately 49.4 microseconds).

<Configuration Example of Imaging System 11>

Figure 8:
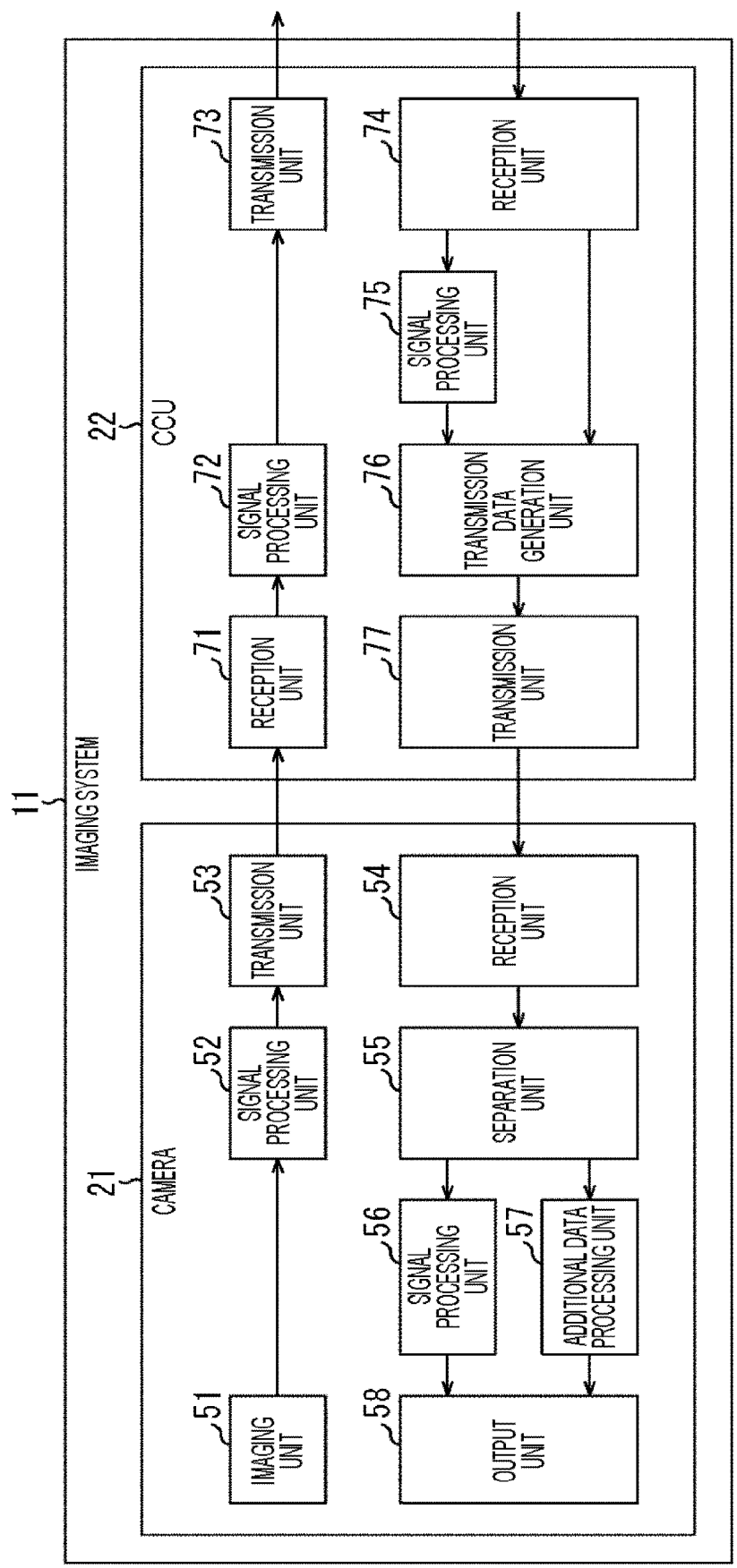
FIG. 8 is a block diagram illustrating a configuration example of functions of an imaging system of FIG. 1.

FIG. 8 illustrates a configuration example of functions of the camera 21 and the CCU 22 of the imaging system 11 of FIG. 1.

The camera 21 includes an imaging unit 51, a signal processing unit 52, a transmission unit 53, a reception unit 54, a separation unit 55, a signal processing unit 56, an additional data processing unit 57, and an output unit 58.

The CCU 22 includes a reception unit 71, a signal processing unit 72, a transmission unit 73, a reception unit 74, a signal processing unit 75, a transmission data generation unit 76, and a transmission unit 77.

The imaging unit 51 of the camera 21 images various types of video and supplies obtained video data to the signal processing unit 52.

The signal processing unit 52 performs various signal processing such as compression processing and format conversion of video data, generates transmission data including video data, and supplies the transmission data to the transmission unit 53.

The transmission unit 53 performs encoding of error correction of the transmission data (for example, forward error correction (FEC), shuffling, modulation, and so on), and thereafter transmits the transmission data to the CCU 22.

The reception unit 71 of the CCU 22 receives the transmission data from the camera 21, performs processing such as demodulation of the transmission data, deshuffling, and restoration of the error correction, and then supplies the transmission data to the signal processing unit 72.

The signal processing unit 72 performs various processing such as decompression processing of transmission data and format conversion, and restores video data from the transmission data. Furthermore, the signal processing unit 72 performs various signal processing on the video data after restoration as needed, and supplies the video data to the transmission unit 73.

The transmission unit 73 transmits the video data to the integrated system 12.

The reception unit 74 receives return video data, an additional data packet, and various control signals from the integrated system 12. The reception unit 74 supplies the return video data and the control signals to the signal processing unit 75, and supplies the additional data packet and the control signals to the transmission data generation unit 76.

The signal processing unit 75 performs various processing such as compression processing and format conversion on the return video data, and then divides the return video data into packets having a predetermined length (hereinafter referred to as a main data packet). The signal processing unit 75 supplies the main data packet to the transmission data generation unit 76.

The transmission data generation unit 76 generates transmission data by multiplexing the main data packet and the additional data packet, and supplies the transmission data to the transmission unit 77.

The transmission unit 77 performs processing such as encoding of error correction, shuffling, and modulation of the transmission data, and thereafter transmits the transmission data to the camera 21.

The reception unit 54 of the camera 21 receives the transmission data from the CCU 22 and performs processing such as demodulation of the transmission data, deshuffling, and restoration of error correction. Note that the reception unit 54 restores the error correction in BB frame units, and detects a transmission error in BB frame units, for example. The reception unit 54 supplies transmission data and a transmission error signal indicating the presence or absence of a transmission error to the separation unit 55. Furthermore, the reception unit 54 generates various control signals on the basis of the transmission data and supplies the control signals to the separation unit 55.

The separation unit 55 separates a main data packet and an additional data block included in the transmission data. The additional data block is data included in the additional data area of the BB frame. The separation unit 55 supplies the main data packet to the signal processing unit 56 and supplies the additional data block to the additional data processing unit 57.

The signal processing unit 56 restores the return video data from the main data packet, performs various data processing on the return video data as needed, and supplies the return video data to the output unit 58.

The additional data processing unit 57 restores additional data from the additional data block and supplies the additional data to the output unit 58.

The output unit 58 outputs the return video data and the additional data.

For example, the output unit 58 includes a monitor and displays return video based on the return video data for the camera operator or the like.

For example, the output unit 58 includes an audio output terminal and outputs sub-audio based on sub-audio data included in the additional data to, for example, earphones for the camera operator, or the like. The sub-audio includes, for example, a sound effect, an instruction voice to the camera operator, and the like.

For example, the output unit 58 includes a prompter and displays a prompt based on prompt data included in the additional data to the performers and the like.

<Configuration Example of Additional Data Processing Unit 57>

Figure 9:
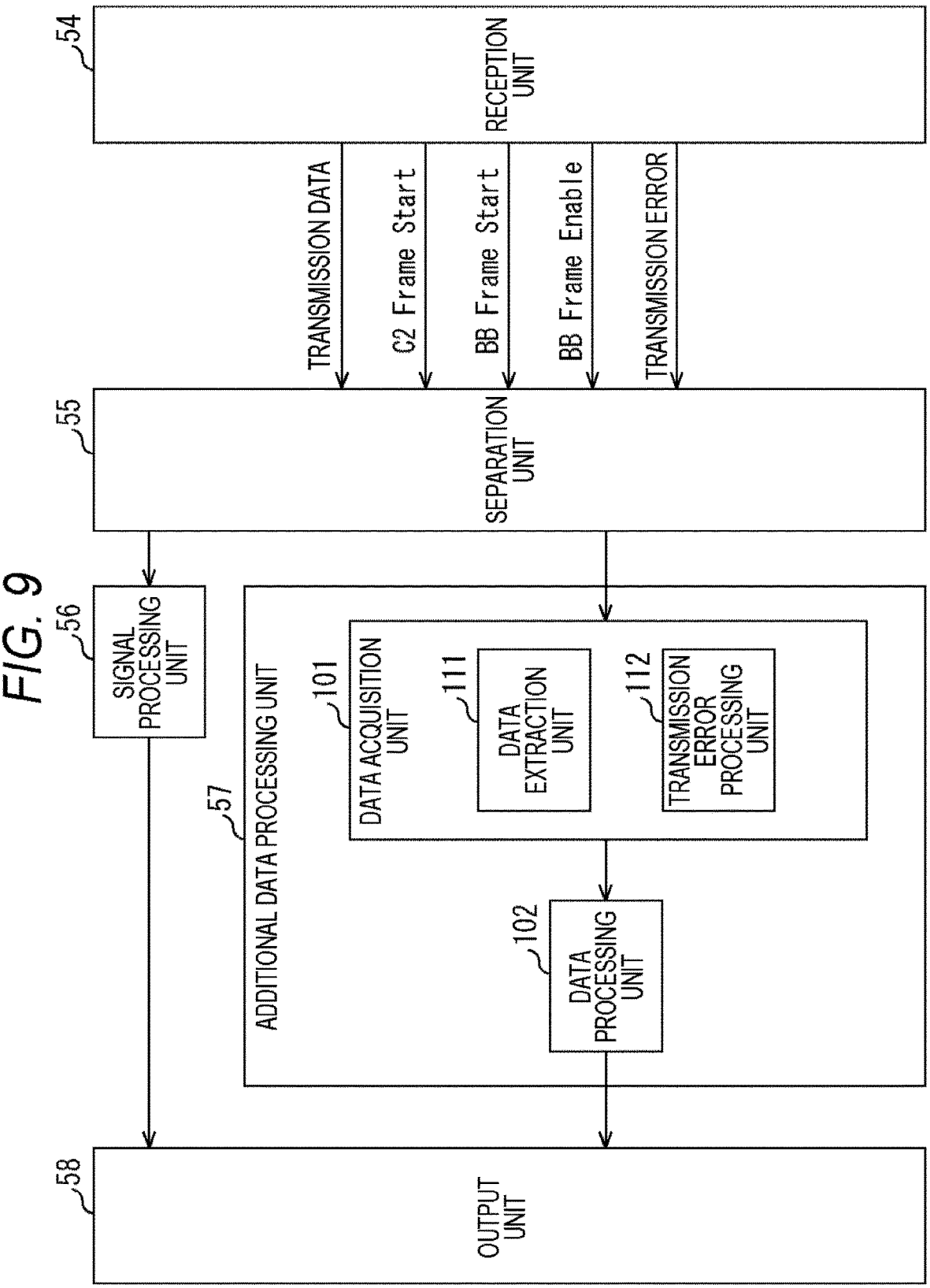
FIG. 9 is a block diagram illustrating a configuration example of functions of an additional data processing unit of FIG. 8.

FIG. 9 illustrates a configuration example of functions of the additional data processing unit 57 of the camera 21.

The additional data processing unit 57 includes a data acquisition unit 101 and a data processing unit 102.

The data acquisition unit 101 performs a process of acquiring additional data from the transmission data. The data acquisition unit 101 includes a data extraction unit 111 and a transmission error processing unit 112.

The data extraction unit 111 extracts an additional data packet from an additional data block. Furthermore, the data extraction unit 111 performs determination of validity of the additional data packet, identification of the type of data included in the additional data packet, and the like. The data extraction unit 111 supplies a valid additional data packet and information indicating the type of data included in the valid additional data packet to the data processing unit 102.

The transmission error processing unit 112 performs various processing when a transmission error occurs.

The data processing unit 102 restores additional data from the additional data packet, performs various data processing on the restored additional data as needed, and supplies the additional data to the output unit 58.

<Configuration Example of Transmission Data Generation Unit 76>

Figure 10:
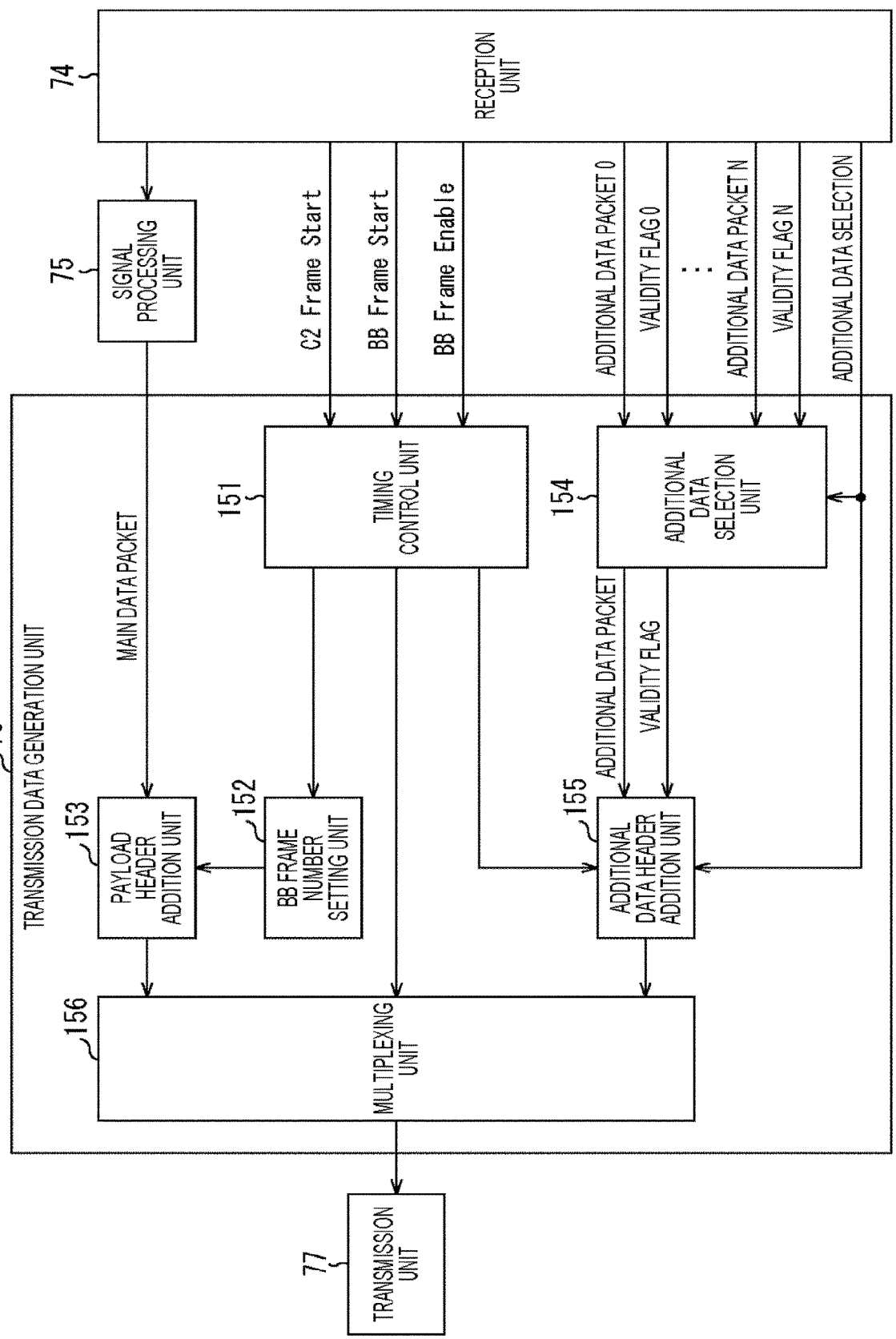
FIG. 10 is a block diagram illustrating a configuration example of functions of a transmission data generation unit of FIG. 8.

FIG. 10 illustrates a configuration example of functions of the transmission data generation unit 76 of the CCU 22. The transmission data generation unit 76 includes a timing control unit 151, a BB frame number setting unit 152, a payload header addition unit 153, an additional data selection unit 154, an additional data header addition unit 155, and a multiplexing unit 156.

The timing control unit 151 receives control signals such as the C2 frame start signal, the BB frame start signal, and the BB frame enable signal from the integrated system 12 via the reception unit 74. The timing control unit 151 controls the timing of processing of each unit of the transmission data generation unit 76 on the basis of the received control signal.

The BB frame number setting unit 152 assigns a BB frame number to each BB frame, and notifies the payload header addition unit 153 of the assigned BB frame number.

The payload header addition unit 153 generates a payload header on the basis of the BB frame number and the like. Then, the payload header addition unit 153 adds the payload header before the main data packet supplied from the signal processing unit 75, and supplies the payload header and the main data packet to the multiplexing unit 156.

The additional data selection unit 154 selects the additional data packet to be inserted in the BB frame from among an additional data packet 0 to an additional data packet N supplied from the integrated system 12 via the reception unit 74 on the basis of an additional data selection signal supplied from the integrated system 12 via the reception unit 74. The additional data selection unit 154 supplies the selected additional data packet to the additional data header addition unit 155. Furthermore, the additional data selection unit 154 selects a valid packet corresponding to the selected additional data packet from among a valid packet 0 to a valid packet N supplied from the integrated system 12 via the reception unit 74, and supplies the valid packet to the additional data header addition unit 155.

The additional data header addition unit 155 generates an additional data header on the basis of the additional data selection signal supplied from the integrated system 12 via the reception unit 74 and the validity flag supplied from the additional data selection unit 154. Then, the additional data header addition unit 155 adds the additional data header before the additional data packet supplied from the additional data selection unit 154, and supplies the additional data header and the additional data packet to the multiplexing unit 156.

The multiplexing unit 156 generates transmission data including the C2 frame by multiplexing a payload packet, the main data packet, the additional data header, the additional data packet, and so on, and supplies the transmission data to the transmission unit 77.

<Additional Data Insertion Process>

Next, an additional data insertion process executed by the CCU 22 will be described with reference to a flowchart of FIG. 11.

This process is a process of inserting additional data into transmission data, and is executed, for example, during transmission of the transmission data from the CCU 22 to the camera 21. In this case, the CCU 22 is the transmission device and the camera 21 is the reception device.

In step S1, the transmission data generation unit 76 sets a BB frame number. Specifically, the timing control unit 151 instructs the BB frame number setting unit 152 to set the BB frame number at a predetermined timing. The BB frame number setting unit 152 sets the BB frame number of the BB frame to be transmitted next, and notifies the payload header addition unit 153 of the set BB frame number.

In step S2, the transmission data generation unit 76 adds a payload header.

Specifically, the timing control unit 151 instructs the payload header addition unit 153 to add the payload header at a predetermined timing.

The payload header addition unit 153 generates the payload header (FIG. 4) including the BB frame number set by the BB frame number setting unit 152. The payload header addition unit 153 adds the payload header before a main data packet supplied from the signal processing unit 75. The payload header addition unit 153 supplies the payload header and the main data packet to the multiplexing unit 156.

In step S3, the additional data selection unit 154 selects an additional data packet. Specifically, the additional data selection unit 154 selects the additional data packet to be inserted next in the BB frame from among an additional data packet 0 to an additional data packet N supplied from the CCU 22 via the reception unit 74 on the basis of the additional data selection signal supplied from the CCU 22 via the reception unit 74. The additional data selection unit 154 supplies the selected additional data packet and the validity flag corresponding to the selected additional data packet to the additional data header addition unit 155.

In step S4, the additional data header addition unit 155 adds an additional data header. Specifically, the timing control unit 151 instructs the additional data header addition unit 155 to add the additional data header at a predetermined timing.

The additional data header addition unit 155 generates the additional data header (FIG. 6). At this time, the additional data header addition unit 155 sets the type of additional data indicated in the additional data selection signal supplied from the CCU 22 via the reception unit 74 to the data type of the additional data header. Furthermore, the additional data header addition unit 155 sets the validity flag supplied from the additional data selection unit 154 to the validity flag of the additional data header.

The additional data header addition unit 155 adds the additional data header before the additional data packet supplied from the additional data selection unit 154. The additional data header addition unit 155 supplies the additional data header and the additional data packet to the multiplexing unit 156.

In step S5, the transmission data generation unit 76 inserts the additional data packet. Specifically, the timing control unit 151 instructs the multiplexing unit 156 to insert the additional data packet at a predetermined timing.

The multiplexing unit 156 inserts the additional data header and the additional data packet at a predetermined position in the additional data area of the BB frame, and supplies them to the transmission unit 77.

In step S6, the multiplexing unit 156 performs a stuffing process. Specifically, the multiplexing unit 156 inserts stuffing data having a predetermined length after the additional data packet inserted in the process of step S5, and supplies them to the transmission unit 77.

In step S7, the multiplexing unit 156 determines whether or not the additional data area has a free space.

In a case where it is determined that the additional data area has a free space, the process returns to step S3.

Thereafter, in step S7, the processes of steps S3 to S7 are repeatedly executed until it is determined that there is no free space in the additional data area. Thus, a predetermined number of pairs of additional data headers and additional data packets are inserted at predetermined positions in the additional data area of the BB frame.

On the other hand, in a case where it is determined in step S7 that there is no free space in the additional data area, the process returns to step S1.

Thereafter, the processes in and after step S1 are executed, and additional data is inserted in the new BB frame.

<Additional Data Reception Process>

Figure 12:
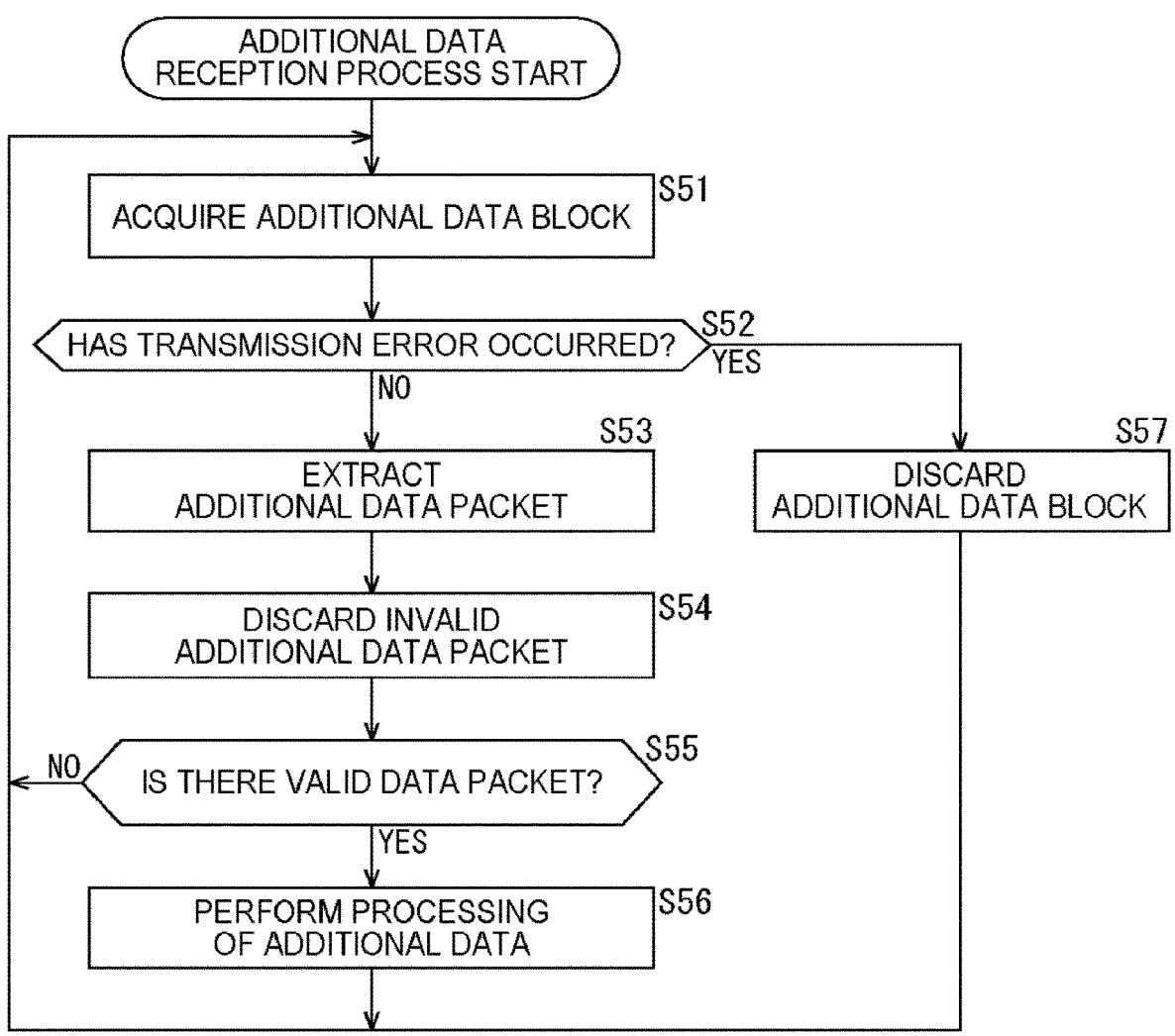
FIG. 12 is a flowchart for explaining a first embodiment of an additional data reception process.

Next, the additional data reception process executed by the camera 21 will be described with reference to a flowchart of FIG. 12.

Note that this process is executed when the camera 21 is receiving transmission data from the CCU 22. In this case, the CCU 21 is the transmission device and the camera 21 is the reception device.

In step S51, the camera 21 acquires an additional data block.

Specifically, the separation unit 55 detects a BB frame to be processed next (hereinafter, referred to as a target BB frame) in the transmission data supplied from the reception unit 54 on the basis of the control signal supplied from the reception unit 54. The separation unit 55 extracts a main data packet from the target BB frame and supplies the main data packet to the signal processing unit 56. Furthermore, the separation unit 55 extracts the additional data block from the additional data area in the target BB frame and supplies the additional data block to the data acquisition unit 101.

Moreover, the separation unit 55 supplies a transmission error signal supplied from the reception unit 54 to the data acquisition unit 101.

In step S52, the transmission error processing unit 112 determines whether or not a transmission error has occurred on the basis of the transmission error signal. In a case where it is determined that no transmission error has occurred, the process proceeds to step S53.

In step S53, the data extraction unit 111 extracts an additional data packet. As described above, the arrangement of the additional data header and the additional data packet in the additional data area is determined in advance. Thus, the data extraction unit 111 extracts the additional data header and the additional data packet from predetermined positions of the additional data block.

In step S54, the data extraction unit 111 discards any invalid additional data packet. Specifically, the data extraction unit 111 discards any extracted additional data packet in which the value of the validity flag of the corresponding additional data header is invalid among extracted additional data packets.

In step S55, the data extraction unit 111 determines whether or not there is a valid additional data packet. In a case where it is determined that there is a valid additional data packet, the process proceeds to step S56.

In step S56, the additional data processing unit 57 performs processing of additional data.

Specifically, the data extraction unit 111 identifies the type of additional data included in the valid additional data packet on the basis of the data type of the additional data header of the valid additional data packet. The data extraction unit 111 supplies the valid additional data packet and information indicating the type of the additional data packet to the data processing unit 102.

The data processing unit 102 restores additional data from the additional data packet, and performs various data processing on the restored additional data as needed. The data processing unit 102 supplies the additional data to the output unit 58.

The output unit 58 outputs the additional data. For example, the output unit 58 performs display of a prompt included in the additional data, output of sub-audio, and the like.

Thereafter, the process returns to step S51, and the processes in and after step S51 are executed.

On the other hand, in a case where it is determined in step S55 that there is no valid additional data packet, the process returns to step S51, and the processes in and after step S51 are executed.

Furthermore, in a case where it is determined in step S52 that a transmission error has occurred, the process proceeds to step S57.

In step S57, the transmission error processing unit 112 discards the additional data block.

Thereafter, the process returns to step S51, and the processes in and after step S51 are executed.

As described above, in the broadcasting system 1, the additional data packet is arranged at a predetermined position in the additional data area of each BB frame in the C2 frame and transmitted. Therefore, the information for extracting the additional data packet on the reception side (for example, position information of the additional data packet or the like) becomes unnecessary.

On the other hand, in order to arrange an integer number of additional data packets in the additional data area, it is necessary to provide a stuffing area, which shortens an effective data length and reduces transmission efficiency.

Therefore, for example, in a case where the additional data is prompt data, it takes time to acquire the additional data packet needed for decoding the prompt data, output of a codec decoder is delayed, and frame drops in a frame synchronizer increase. Consequently, the frame resolution of the prompter may decrease.

2. Second Embodiment

Next, a second embodiment of the present technology will be described with reference to FIGS. 13 to 24.

<Configuration Example of Broadcasting System 201>

Figure 13:
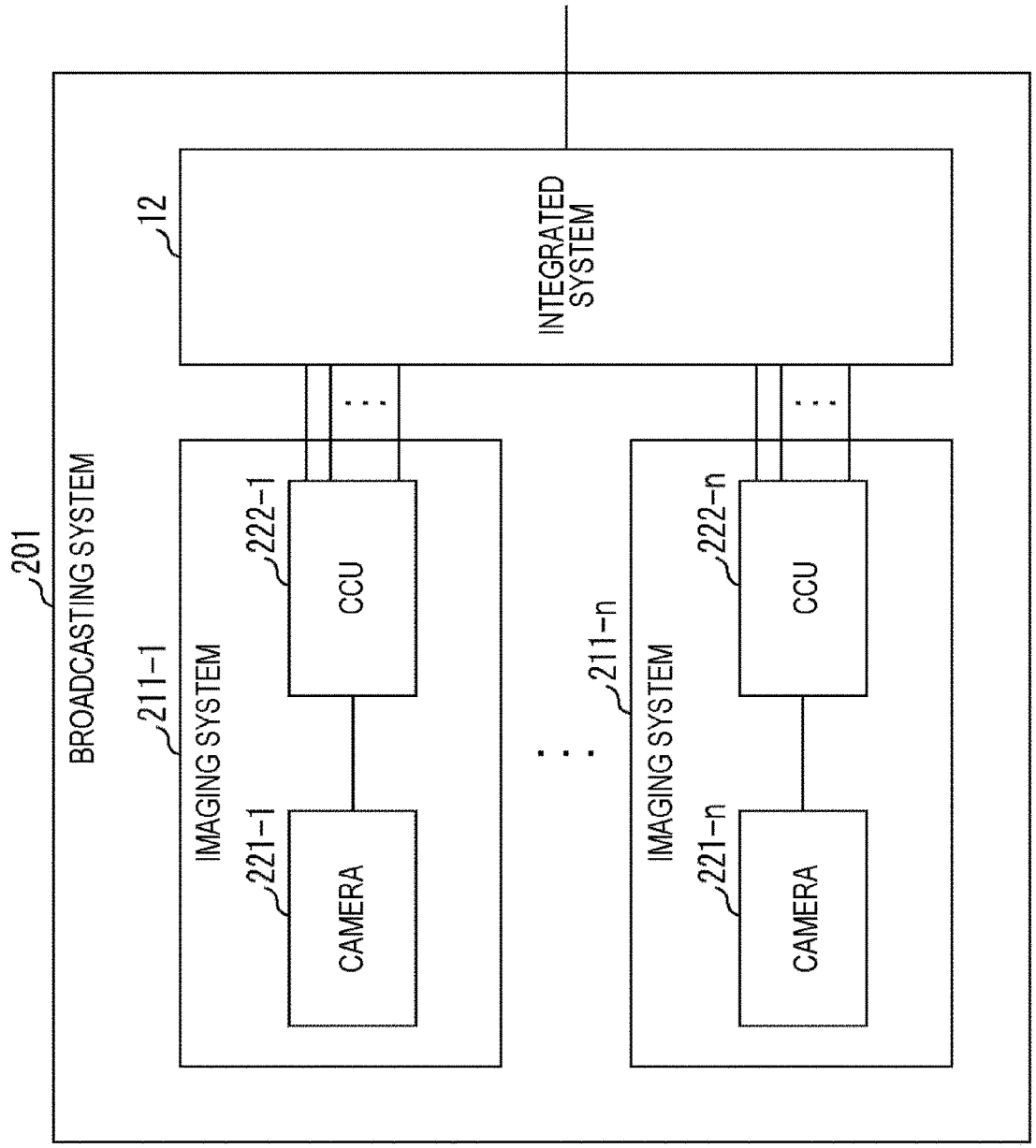
FIG. 13 is a block diagram illustrating a second embodiment of a broadcasting system to which the present technology is applied.

FIG. 13 is a block diagram illustrating a configuration example of a broadcasting system 201 to which the present technology is applied.

Note that in the drawings, parts corresponding to the broadcasting system 1 in FIG. 1 are designated by the same reference numerals, and descriptions thereof will be omitted as appropriate.

As compared with the broadcasting system 1, the broadcasting system 201 coincides in that it includes the integrated system 12, and differs in that it includes an imaging system 211-1 to an imaging system 211-n instead of the imaging system 11-1 to the imaging system 11-n.

As compared with the imaging system 11-i (i=1 to n), the imaging system 211-i differs in that it includes cameras 221-i and CCU 222-i instead of the cameras 21-i and CCU 22-i.

As compared with the cameras 21-i and CCU 22-i, the cameras 221-i and CCU 222-i differ in data transmission formats between them as described later.

Note that hereinafter, in a case where it is not necessary to individually distinguish the imaging system 211-1 to the imaging system 211-n, the camera 221-1 to the camera 221-n, and the CCU 222-1 to the CCU 222-n, they will be simply referred to as an imaging system 211, a camera 221, and a CCU 222, respectively.

<Example of Transmission Method Between Camera 221 and CCU 222>

Next, an example of a transmission method between the camera 221 and the CCU 222 will be described with reference to FIGS. 14 to 18.

Data transmission between the camera 221 and the CCU 222 is performed according to the standards specified in DVB-C2, for example, similarly to the data transmission between the camera 21 and the CCU 22 described above.

The format of the C2 frame used for data transmission between the camera 221 and the CCU 222 is similar to the format described above with reference to FIG. 2.

The format of the BB frame arranged in the C2 frame is similar to the format described above with reference to FIG. 3.

<Format Example of Payload Header>

Figure 14:
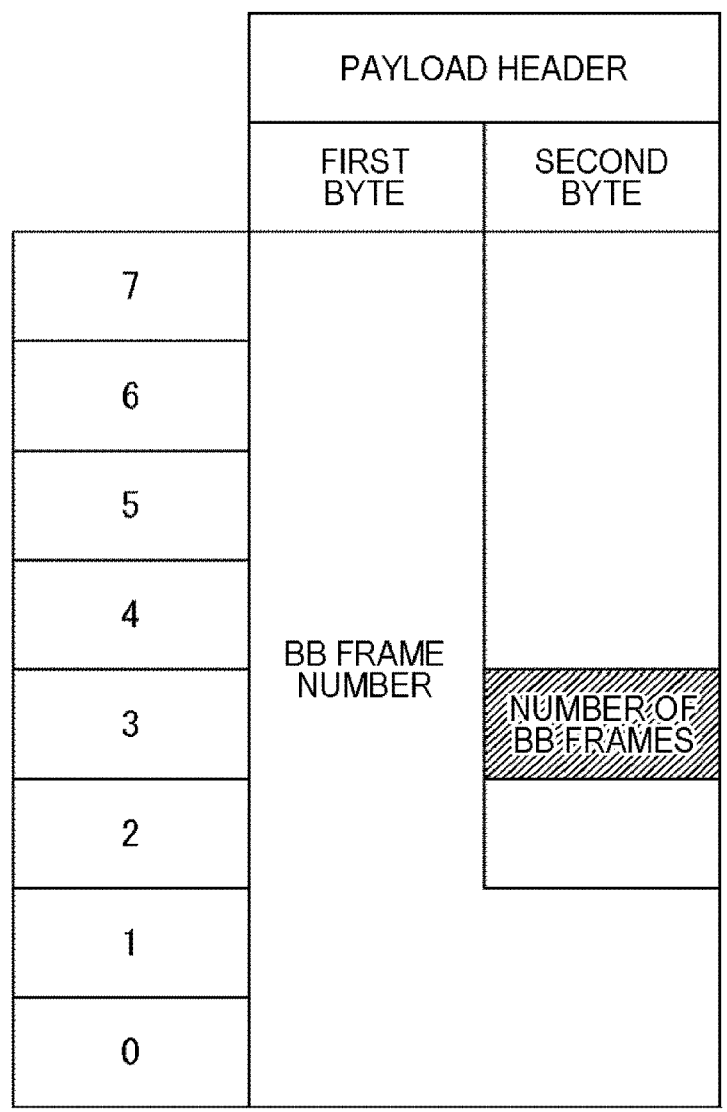
FIG. 14 is a diagram illustrating a second format example of a payload header.

FIG. 14 illustrates a format example of the payload header of the BB frame. Note that hereinafter, the least significant bit of each byte of the payload header is the zeroth bit, and the most significant bit is the seventh bit.

Similarly to the example of FIG. 4 described above, a 10-bit BB frame number is arranged from the zeroth bit of the first byte to the second bit of the second byte of the payload header.

On the other hand, unlike the example of FIG. 4 described above, the number of BB frames is arranged in the third bit of the second byte of the payload header. The number of BB frames indicates the number of BB frames in the C2 frame. For example, in a case where the number of BB frames in the C2 frame is 925, the number of BB frames is set to one, and in a case where the number of BB frames in the C2 frame is 924, it is set to zero.

The remaining area of the payload header is a free area.

<Format Example of Additional Data Area>

FIGS. 15 to 18 illustrate a format example of the additional data area of the BB frame.

In the imaging system 211, additional data packets are arranged in units of BB frame sequences including five BB frames. Specifically, 14 additional data packets different from the number of BB frames in the BB frame sequence (hereinafter referred to as the number of sequences) are arranged in a data area (hereinafter referred to as a sequence additional data area) in which additional data areas of the five BB frames in the BB frame sequence are combined.

Figure 15:
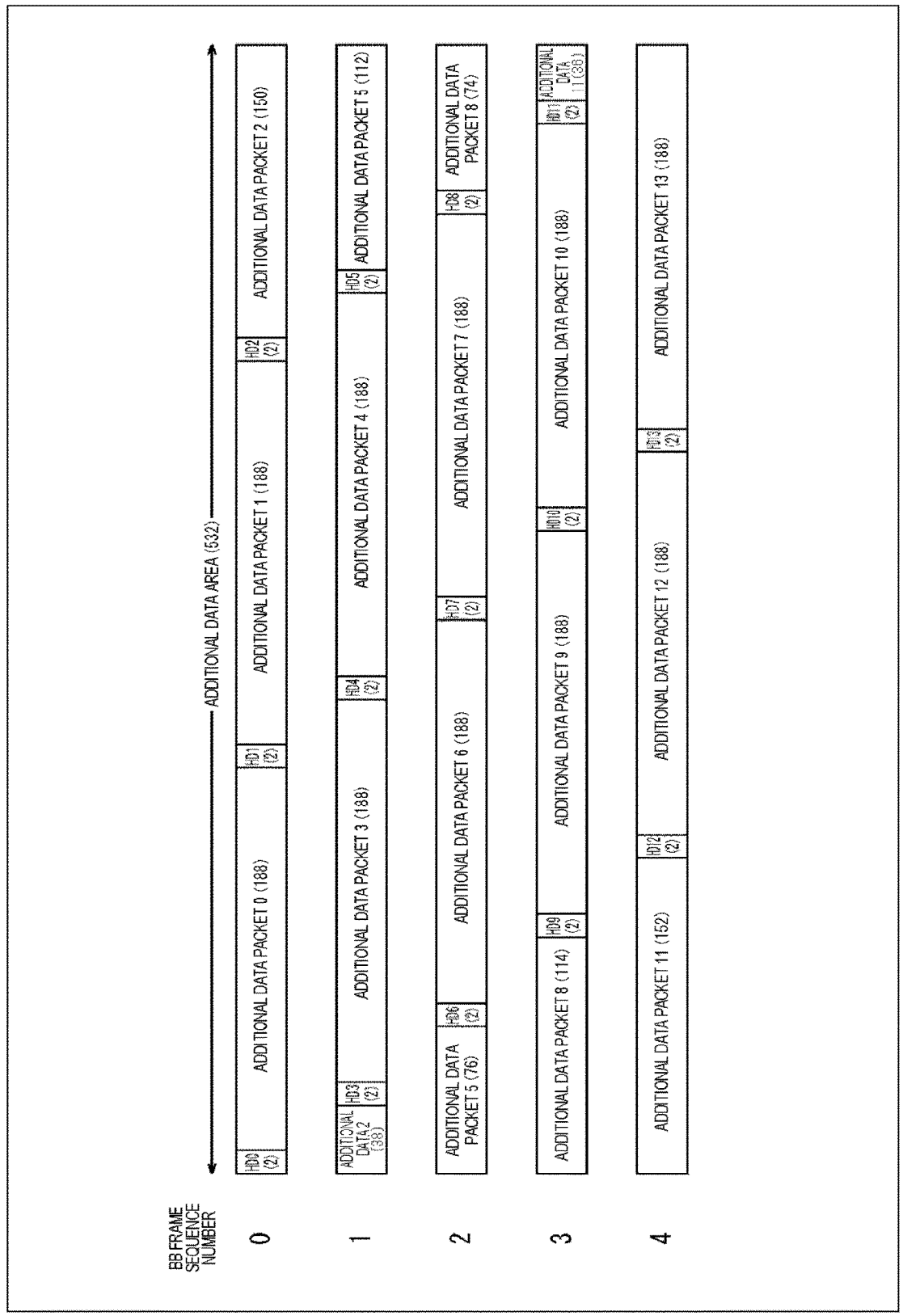
FIG. 15 is a diagram illustrating a format example of a normal sequence additional data area.

FIG. 15 illustrates a format example of (sequence additional data area of) a normal BB frame sequence. Note that the numbers in parentheses in the diagram indicate the number of bytes. FIG. 16 illustrates an example of a sequence table of the BB frame sequence illustrated in FIG. 15. The sequence table is a table illustrating the positions of the BB header, the payload header, the additional data header, and the additional data packet in the BB frame sequence.

Each BB frame in the BB frame sequence is assigned a BB frame sequence number indicating the order in the BB frame sequence. The BB frame sequence number of the BB frame with the BB frame number of 5n (n=0 to 184) is 0. The BB frame sequence number of the BB frame with the BB frame number of 5n+1 (n=0 to 184) is 1. The BB frame sequence number of the BB frame with the BB frame number of 5n+2 (n=0 to 184) is 2. The BB frame sequence number of the BB frame with the BB frame number of 5n+3 (n=0 to 184) is 3. The BB frame sequence number of the BB frame with the BB frame number of 5n+4 (n=0 to 184) is 4.

In the BB frame with the BB frame sequence number of 0, an additional data packet 0, an additional data packet 1, and a part of an additional data packet 2 are arranged. Specifically, the BB header is arranged from the zeroth to ninth bytes of the BB frame, and the payload header is arranged from the 10th to 11th bytes. An additional data header 0 is arranged from the 303rd to 304th bytes, and the additional data packet 0 is arranged from the 305th to 492nd bytes. An additional data header 1 is arranged from the 493rd to 494th bytes, and the additional data packet 1 is arranged from the 495th to 682nd bytes. An additional data header 2 is arranged from the 683rd to 684th bytes, and the part of the additional data packet 2 is arranged from the 685th to 834th bytes.

In the BB frame with the BB frame sequence number of 1, a part of the additional data packet 2, an additional data packet 3, an additional data packet 4, and a part of an additional data packet 5 are arranged. Specifically, the BB header is arranged from the zeroth to ninth bytes of the BB frame, and the payload header is arranged from the 10th to 11th bytes. A part of the additional data header 2 is arranged from the 303rd to 340th bytes. Therefore, the additional data packet 2 is divided and arranged in the BB frame with the BB frame sequence number of 0 and the BB frame with the BB frame sequence number of 1. An additional data header 3 is arranged from the 341st to 342nd bytes, and the additional data packet 3 is arranged from the 343rd to 530th bytes. An additional data header 4 is arranged from the 531st to 532nd bytes, and the additional data packet 4 is arranged from the 533rd to 720th bytes. An additional data header 5 is arranged from the 721st to 722nd bytes, and the part of the additional data packet 5 is arranged from the 723rd to 834th bytes.

In the BB frame with the BB frame sequence number of 2, a part of the additional data packet 5, an additional data packet 6, an additional data packet 7, and a part of an additional data packet 8 are arranged. Specifically, the BB header is arranged from the zeroth to ninth bytes of the BB frame, and the payload header is arranged from the 10th to 11th bytes. A part of the additional data header 5 is arranged from the 303rd to 378th bytes. Therefore, the additional data packet 5 is divided and arranged in the BB frame with the BB frame sequence number of 1 and the BB frame with the BB frame sequence number of 2. An additional data header 6 is arranged from the 379th to 380th bytes, and the additional data packet 6 is arranged from the 381st to 568th bytes. An additional data header 7 is arranged from the 569th to 570th bytes, and the additional data packet 7 is arranged from the 571st to 758th bytes. An additional data header 8 is arranged from the 759th to 760th bytes, and the part of the additional data packet 8 is arranged from the 761st to 834th bytes.

In the BB frame with the BB frame sequence number of 3, a part of the additional data packet 8, an additional data packet 9, an additional data packet 10, and a part of an additional data packet 11 are arranged. Specifically, the BB header is arranged from the zeroth to ninth bytes of the BB frame, and the payload header is arranged from the 10th to 11th bytes. A part of the additional data header 8 is arranged from the 303rd to 416th bytes. Therefore, the additional data packet 8 is divided and arranged in the BB frame with the BB frame sequence number of 2 and the BB frame with the BB frame sequence number of 3. An additional data header 9 is arranged from the 417th to 418th bytes, and the additional data packet 9 is arranged from the 419th to 606th bytes. An additional data header 10 is arranged from the 607th to 608th bytes, and the additional data packet 10 is arranged from the 609th to 796th bytes. An additional data header 11 is arranged from the 797th to 798th bytes, and the part of the additional data packet 11 is arranged from the 799th to 934th bytes.

In the BB frame with the BB frame sequence number of 4, a part of the additional data packet 11, an additional data packet 12, and an additional data packet 13 are arranged. Specifically, the BB header is arranged from the zeroth to ninth bytes of the BB frame, and the payload header is arranged from the 10th to 11th bytes. A part of the additional data header 11 is arranged from the 303rd to 454th bytes. Therefore, the additional data packet 11 is divided and arranged in the BB frame with the BB frame sequence number of 3 and the BB frame with the BB frame sequence number of 4. An additional data header 12 is arranged from the 455th to 456th bytes, and the additional data packet 12 is arranged from the 457th to 644th bytes. An additional data header 13 is arranged from the 645th to 646th bytes, and the additional data packet 13 is arranged from the 647th to 834th bytes.

As described above, in the imaging system 211, the additional data packets are arranged without any gaps without providing the stuffing area in the additional data area.

FIG. 17 illustrates an exception of a format of (sequence additional data area of) the BB frame sequence. Note that the numbers in parentheses in the diagram indicate the number of bytes. FIG. 16 illustrates an example of a sequence table of the BB frame sequence illustrated in FIG. 17.

The format of FIG. 17 is applied to the BB frame sequence at the end of a C2 frame with the number of BB frames of 924.

Specifically, this BB frame sequence includes four BB frames with the frame numbers of 920 to 923. The format of the BB frames with the BB frame sequence numbers of 0 to 2 is the same as the normal BB frame sequence illustrated in FIGS. 15 and 16. On the other hand, although the head to the 796th byte of the BB frame with the BB frame sequence number of 3 are the same as the normal BB frame sequence, the 797th to 934th bytes are a stuffing area.

Note that the format of the additional data header is similar to the format described above with reference to FIG. 6.

Furthermore, a control signal used for data transmission using the C2 frame is similar to the control signal described above with reference to FIG. 7.

<Configuration Example of Imaging System 211>

FIG. 19 illustrates a configuration example of functions of the camera 221 and the CCU 222 of the imaging system 211 of FIG. 13. Note that in the diagram, parts corresponding to the imaging system 11 in FIG. 8 are designated by the same reference numerals, and descriptions thereof will be omitted as appropriate.

As compared with the camera 21 of the imaging system 11, the camera 221 coincides in that it includes the imaging unit 51, the signal processing unit 52, the transmission unit 53, the reception unit 54, the signal processing unit 56, and the output unit 58, and differs in that it includes a separation unit 251 and an additional data processing unit 252 instead of the separation unit 55 and the additional data processing unit 57.

The separation unit 251 separates main data packets and additional data blocks included in the transmission data. The separation unit 251 supplies the main data packets to the signal processing unit 56, and supplies the additional data blocks to the additional data processing unit 252. Furthermore, the separation unit 251 extracts data of the payload packet in the BB frame of the transmission data and supplies the data to the additional data processing unit 252.

Since the format of the additional data area of the imaging system 211 is different from that of the imaging system 11, the additional data processing unit 252 differs in the method of acquiring the additional data packet as described later as compared with the additional data processing unit 57.

As compared with the CCU 22 of the imaging system 11, the CCU 222 coincides in that it includes the reception unit 71, the signal processing unit 72, the transmission unit 73, the reception unit 74, the signal processing unit 75, and the transmission unit 77, and differs in that it includes a transmission data generation unit 271 instead of the transmission data generation unit 76.

Since the format of the additional data area of the imaging system 211 is different from that of the imaging system 11, the transmission data generation unit 271 differs in the method of generating transmission data as described later as compared with the transmission data generation unit 76.

<Configuration Example of Additional Data Processing Unit 252>

FIG. 20 illustrates a configuration example of functions of the additional data processing unit 252 of the camera 21. Note that in the drawings, parts corresponding to the additional data processing unit 57 in FIG. 9 are designated by the same reference numerals, and descriptions thereof will be omitted as appropriate.

As compared with the additional data processing unit 57, the additional data processing unit 252 coincides in that it includes the data processing unit 102, and differs in that it includes a data acquisition unit 301 instead of the data acquisition unit 101.

The data acquisition unit 301 includes a data extraction unit 311, a transmission error processing unit 312, a BB frame number detection unit 313, and a BB frame sequence number setting unit 314.

The data extraction unit 311 extracts an additional data packet from an additional data block. Furthermore, the data extraction unit 311 performs determination of validity of the additional data packet, identification of the type of data included in the additional data packet, and the like. The data extraction unit 311 supplies a valid additional data packet and information indicating the type of data included in the additional data packet to the data processing unit 102.

The transmission error processing unit 312 performs various processing when a transmission error occurs.

The BB frame number detection unit 313 detects the BB frame number of each BB frame on the basis of data in the payload header.

The BB frame sequence number setting unit 314 assigns a BB frame sequence number to each BB frame on the basis of the BB frame number of each BB frame.

<Configuration Example of Transmission Data Generation Unit 271>

Figure 21:
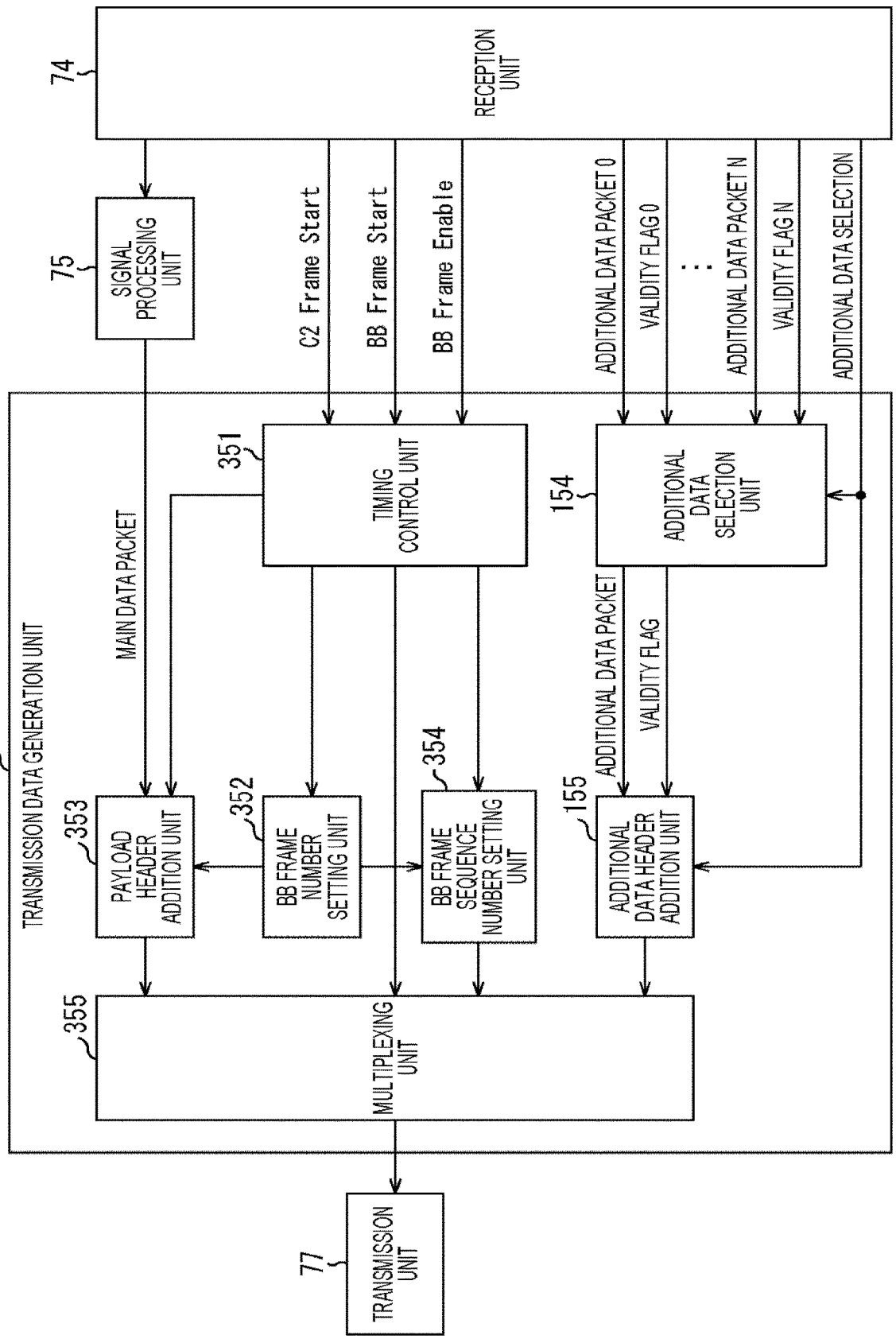
FIG. 21 is a block diagram illustrating a configuration example of functions of a transmission data generation unit of FIG. 19.

FIG. 21 illustrates a configuration example of functions of the transmission data generation unit 271 of the CCU 222. Note that in the diagram, parts corresponding to the transmission data generation unit 76 in FIG. 10 are designated by the same reference numerals, and descriptions thereof will be omitted as appropriate.

As compared with the transmission data generation unit 76, the transmission data generation unit 271 coincides in that it includes the additional data selection unit 154 and the additional data header addition unit 155. Furthermore, as compared with the transmission data generation unit 76, the transmission data generation unit 271 differs in that it includes a timing control unit 351, a BB frame number setting unit 352, a payload header addition unit 353, and a multiplexing unit 355 instead of the timing control unit 151, the BB frame number setting unit 152, the payload header addition unit 153, and the multiplexing unit 156, and further in that a BB frame sequence number setting unit 354 is added.

The timing control unit 351 receives control signals such as the C2 frame start signal, the BB frame start signal, and the BB frame enable signal from the integrated system 12 via the reception unit 74. The timing control unit 351 controls the timing of processing of each unit of the transmission data generation unit 271 on the basis of the received control signals.

The BB frame number setting unit 352 assigns a BB frame number to each BB frame, and notifies the payload header addition unit 353 and the BB frame sequence number setting unit 354 of the assigned BB frame number.

The payload header addition unit 353 generates a payload header on the basis of the BB frame number and the like. Then, the payload header addition unit 353 adds the payload header before the main data packet supplied from the signal processing unit 75, and supplies the payload header and the main data packets to the multiplexing unit 355.

The BB frame sequence number setting unit 354 assigns a BB frame sequence number to each BB frame on the basis of the BB frame number of each BB frame. The BB frame sequence number setting unit 354 notifies the multiplexing unit 355 of the assigned BB frame sequence number.

The multiplexing unit 355 generates transmission data including the C2 frame by multiplexing a payload packet, the main data packet, the additional data header, the additional data packet, and so on, and supplies the transmission data to the transmission unit 77.

<Additional Data Insertion Process>

Figure 22:
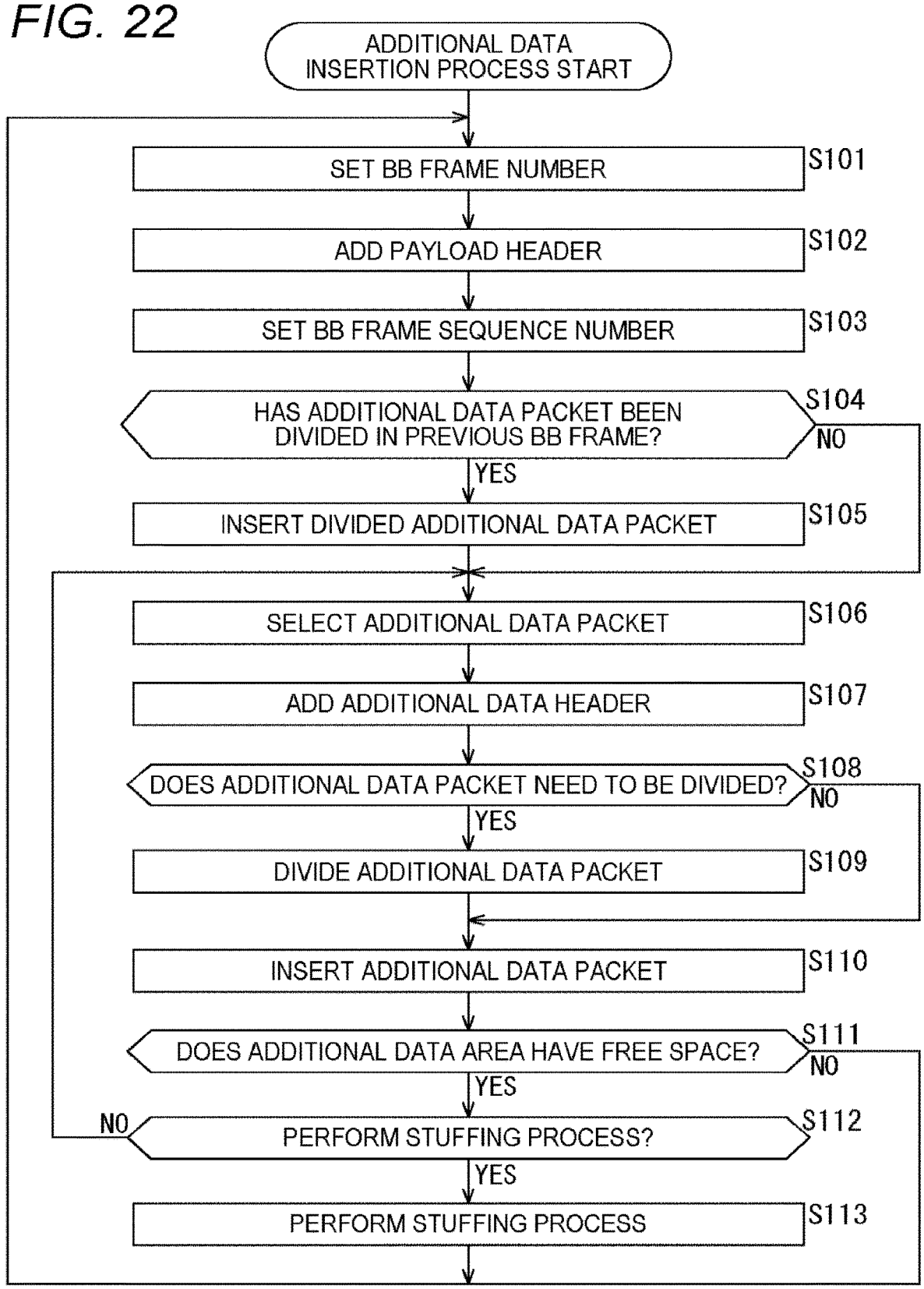
FIG. 22 is a flowchart for explaining a second embodiment of an additional data insertion process.

Next, an additional data insertion process executed by the CCU 222 will be described with reference to a flowchart of FIG. 22.

This process is a process of inserting additional data into transmission data, and is executed, for example, during transmission of the transmission data from the CCU 222 to the camera 221. In this case, the CCU 21 is the transmission device and the camera 21 is the reception device.

In step S101, the transmission data generation unit 271 sets a BB frame number. Specifically, the timing control unit 351 instructs the BB frame number setting unit 352 to set the BB frame number at a predetermined timing. The BB frame number setting unit 352 sets the BB frame number of the BB frame to be transmitted next, and notifies the payload header addition unit 353 and the BB frame sequence number setting unit 354 of the set BB frame number.

In step S102, the transmission data generation unit 271 adds a payload header.

Specifically, the timing control unit 351 instructs the payload header addition unit 353 to add the payload header at a predetermined timing.

The payload header addition unit 353 generates the payload header (FIG. 14) in which the BB frame number set by the BB frame number setting unit 352 and the number of frames are set. The payload header addition unit 353 adds the payload header before a main data packet supplied from the signal processing unit 75. The payload header addition unit 353 supplies the payload header and the main data packet to the multiplexing unit 355.

In step S103, the transmission data generation unit 271 sets a BB frame sequence number. Specifically, the timing control unit 351 instructs the BB frame sequence number setting unit 354 to set the BB frame sequence number at a predetermined timing. The BB frame sequence number setting unit 354 assigns the BB frame sequence number to the BB frame on the basis of the BB frame number of the BB frame to be transmitted next.

FIG. 23 is a table illustrating correspondence between the BB frame number and the BB frame sequence number.

The BB frame number and the BB frame sequence number are in one-to-one relationship. Specifically, in the C2 frame with the number of BB frames of 925, the BB frame sequence number is the remainder obtained by dividing the BB frame number by five. Also in the C2 frame with the number of BB frames of 924, the BB frame sequence number is basically the remainder obtained by dividing the BB frame number by five. However, this C2 frame differs from the C2 frame with the number of BB frames of 925 in that the BB frame with the BB frame number of 924 does not exist.

The BB frame sequence number setting unit 354 notifies the multiplexing unit 355 of the BB frame sequence number.

In step S104, the multiplexing unit 355 determines whether or not an additional data packet has been divided in the previous BB frame. In a case where it is determined that the additional data packet has been divided in the previous BB frame, the process proceeds to step S105. As can be seen from FIG. 15, in a case where the BB frame sequence number of the BB frame to be transmitted next is 1 to 4, it is determined that the additional data packet has been divided in the previous BB frame.

In step S105, the multiplexing unit 355 inserts the divided additional data packet. That is, the multiplexing unit 355 inserts the rest of the additional data packet divided in the previous BB frame at the head of the additional data area of the BB frame to be transmitted next, and supplies them to the transmission unit 77.

By this process, for example, as illustrated in FIG. 15, in the BB frame having the BB frame sequence number of 1, a second half portion of the additional data packet 2 is inserted at the head of the additional data area. In the BB frame with the BB frame sequence number of 2, a second half portion of the additional data packet 5 is inserted at the head of the additional data area. In the BB frame with the BB frame sequence number of 3, a second half portion of the additional data packet 8 is inserted at the head of the additional data area. In the BB frame with the BB frame sequence number of 4, a second half portion of the additional data packet 11 is inserted at the head of the additional data area.

Thereafter, the process proceeds to step S106.

On the other hand, in a case where it is determined in step S104 that the additional data packet is not divided in the previous BB frame, the process of step S105 is skipped and the process proceeds to step S106.

As can be seen from FIG. 15, in a case where the BB frame sequence number of the BB frame to be transmitted next is 0, it is determined that the additional data packet has not been divided in the previous BB frame.

Figure 11:
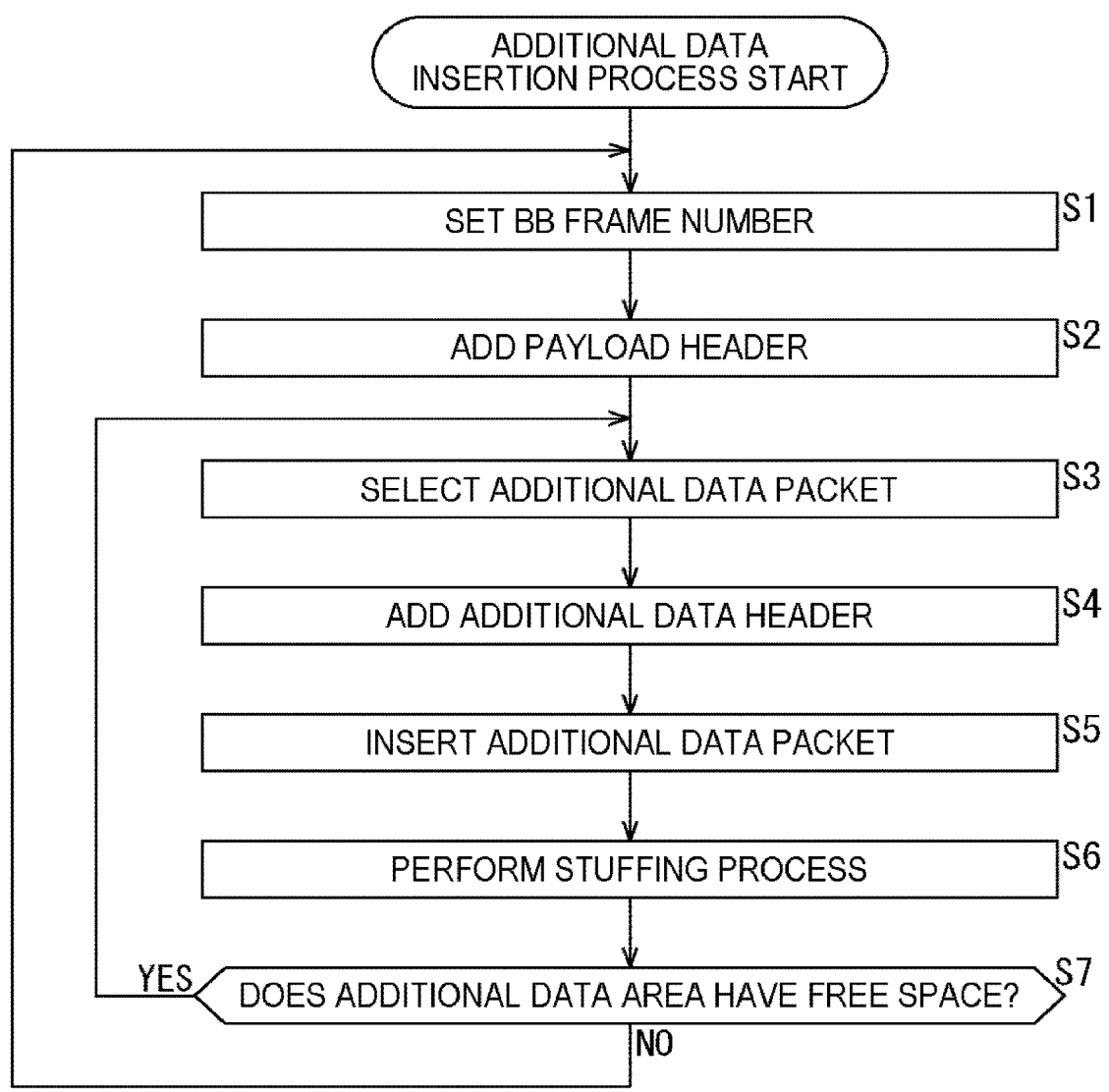
FIG. 11 is a flowchart for explaining a first embodiment of an additional data insertion process.

In step S106, an additional data packet is selected as in step S3 of FIG. 11.

In step S107, an additional data header is added before the additional data packet as in the process of step S4 of FIG. 11, and the additional data header and the additional data packet are supplied from the additional data header addition unit 155 to the multiplexing unit 355.

In step S108, the multiplexing unit 355 determines whether or not the additional data packet needs to be divided. In a case where the rest of the additional data area of the BB frame is shorter than the total length of adding the additional data header and the additional data packet, the multiplexing unit 355 determines that the additional data packet needs to be divided, and the process proceeds to step S109.

As can be seen from FIG. 15, in a case where the BB frame sequence number of the BB frame is any of 0 to 3, it is determined that the additional data packet needs to be divided when one of the additional data packet 2, the additional data packet 5, the additional data packet 8, or the additional data packet 11 is inserted.

In step S109, the multiplexing unit 355 divides the additional data packet. Specifically, the multiplexing unit 355 divides the additional data packet into lengths that can be inserted into the remaining area of the additional data area of the BB frame.

Thereafter, the process proceeds to step S110.

On the other hand, in step S108, in a case where the free space of the additional data area of the BB frame is equal to or longer than the total length of the additional data header and the additional data packet being added, the multiplexing unit 355 determines that the division of the additional data packet is not necessary, and the process of step S109 is skipped and the process proceeds to step S110.

In step S110, the multiplexing unit 355 inserts the additional data packet. Specifically, the timing control unit 351 instructs the multiplexing unit 355 to insert the additional data packet at a predetermined timing.

The multiplexing unit 355 determines a position for inserting the additional data header and the additional data packet on the basis of, for example, the BB frame sequence number and the sequence table of FIG. 16 or FIG. 18. The multiplexing unit 355 inserts the additional data header and the additional data packet at the obtained position in the additional data area of the BB frame, and supplies them to the transmission unit 77.

In step S111, the multiplexing unit 355 determines whether or not the additional data area has a free space. In a case where it is determined that the additional data area has a free space, the process proceeds to step S112.

In step S112, the multiplexing unit 355 determines whether or not to perform a stuffing process. In a case where it is determined not to perform the stuffing process, the process returns to step S106.

Thereafter, the process returns to step S106, and the processes of steps S106 to S112 are repeatedly executed until it is determined in step S111 that there is no free space in the additional data area or it is determined in step S112 to perform the stuffing process.

On the other hand, in a case where it is determined in step S112 to perform the stuffing process, the process proceeds to step S113.

For example, as can be seen from FIG. 17, in the BB frame with the BB frame sequence number of 3 in the last BB frame sequence of the C2 frame with the number of BB frames of 924, after the additional data packet 10 is inserted, it is determined to perform the stuffing process.

In step S113, the multiplexing unit 355 performs the stuffing process. Specifically, the multiplexing unit 355 inserts stuffing data into the remaining area of the additional data area after inserting the additional data packet in the process of step S110, and supplies them to the transmission unit 77.

Thus, for example, the stuffing data is inserted at the end of the BB frame with the BB frame sequence number of 3 in the last BB frame sequence of the C2 frame with the number of BB frames of 924.

Thereafter, the process returns to step S101, and the processes in and after step S101 are executed. That is, additional data is inserted in a new BB frame.

On the other hand, in a case where it is determined in step S111 that there is no free space in the additional data area, the process returns to step S101, and the processes in and after step S101 are executed. That is, additional data is inserted in a new BB frame.

<Additional Data Reception Process>

Figure 24:
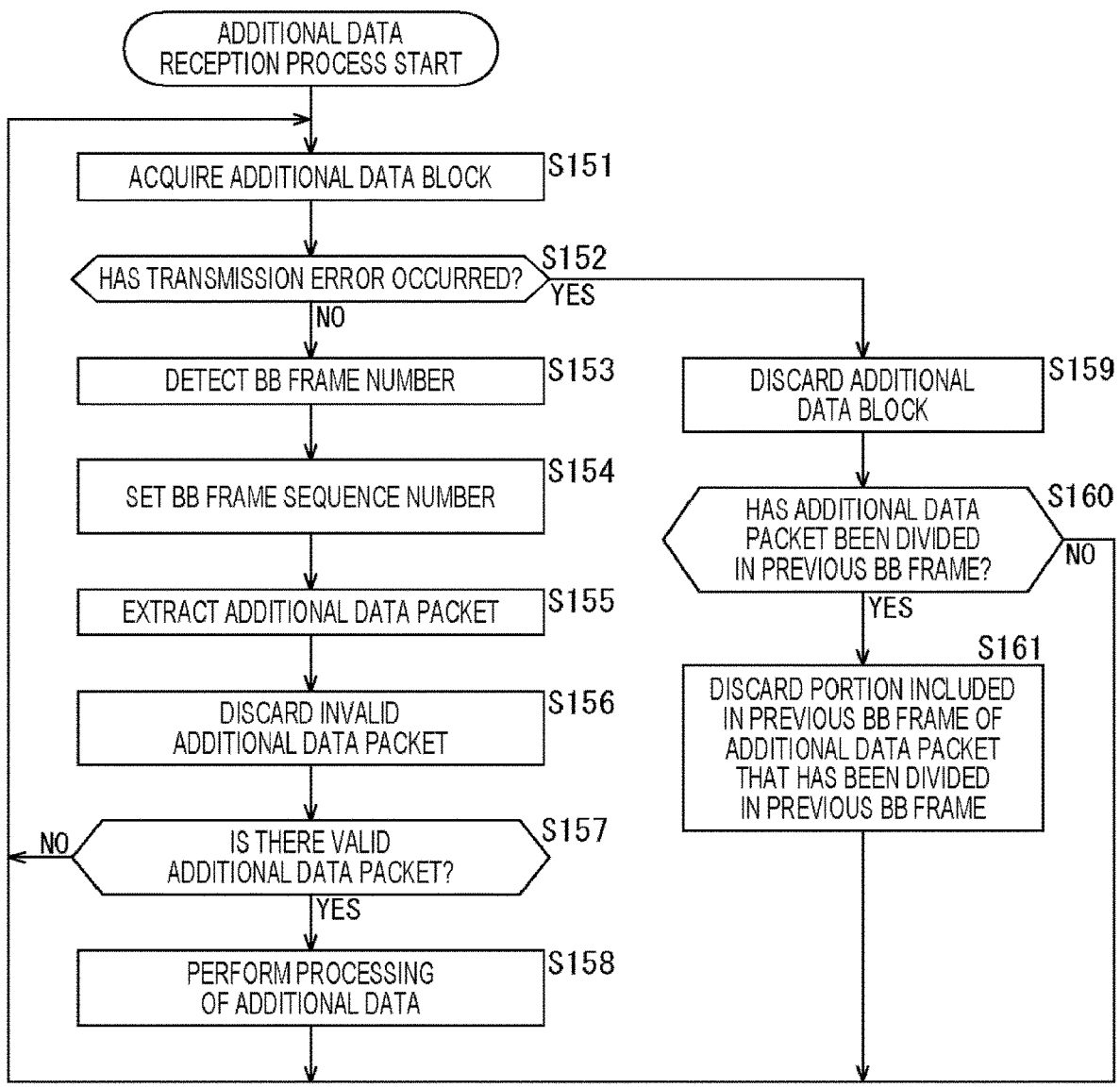
FIG. 24 is a flowchart for explaining a second embodiment of an additional data reception process.

Next, the additional data reception process executed by the camera 221 will be described with reference to the flowchart of FIG. 24.

Note that this process is executed when the camera 221 is receiving transmission data from the CCU 222. In this case, the CCU 21 is the transmission device and the camera 21 is the reception device.

In step S151, the camera 221 acquires an additional data block.

Specifically, the separation unit 251 detects a BB frame to be processed next (hereinafter, referred to as a target BB frame) in transmission data supplied from the reception unit 54 on the basis of a control signal supplied from the reception unit 54. The separation unit 251 extracts a main data packet from the target BB frame and supplies the main data packet to the signal processing unit 56. Furthermore, the separation unit 251 extracts the additional data block from the additional data area in the target BB frame and supplies the additional data block to the data acquisition unit 301. Moreover, the separation unit 251 supplies a transmission error signal supplied from the reception unit 54 to the data acquisition unit 301. Furthermore, the separation unit 251 extracts data of the payload packet in the target BB frame and supplies the data to the data acquisition unit 301.

In step S152, the transmission error processing unit 312 determines whether or not a transmission error has occurred on the basis of the transmission error signal. In a case where it is determined that no transmission error has occurred, the process proceeds to step S153.

In step S153, the BB frame number detection unit 313 detects the BB frame number. That is, the BB frame number detection unit 313 detects the BB frame number of the target BB frame on the basis of the payload header.

In step S154, the BB frame sequence number setting unit 314 sets the BB frame sequence number. That is, the BB frame sequence number setting unit 314 assigns the BB frame sequence number to the target BB frame on the basis of the BB frame number of the target BB frame.

In step S155, the data extraction unit 311 extracts an additional data packet. Specifically, the data extraction unit 311 detects the number of BB frames of the C2 frame including the target BB frame on the basis of the payload header. Furthermore, the data extraction unit 311 identifies an arrangement of data in the additional data area of the target BB frame on the basis of the BB frame sequence number, the number of BB frames, and the sequence table. Then, the data extraction unit 311 extracts the additional data header and the additional data packet from the additional data block on the basis of the identified arrangement of data.

In step S156, the data acquisition unit 301 discards any invalid additional data packet. Specifically, the data extraction unit 311 discards any extracted additional data packet in which the value of the validity flag of the corresponding additional data header is invalid among extracted additional data packets.

Furthermore, in a case where a transmission error has occurred in the previous BB frame, if the target BB frame includes the additional data packet divided in the previous BB frame, the transmission error processing unit 312 discards the additional data packet thereof.

For example, in a case where a transmission error has occurred in the BB frame with the BB frame sequence number of 0, a second half portion of the additional data packet 2 at the head of the additional data area of the next BB frame is discarded. For example, in a case where a transmission error has occurred in the BB frame with the BB frame sequence number of 1, a second half portion of the additional data packet 5 at the head of the additional data area of the next BB frame is discarded. For example, in a case where a transmission error has occurred in the BB frame with the BB frame sequence number of 2, a second half portion of the additional data packet 8 at the head of the additional data area of the next BB frame is discarded. For example, in a case where a transmission error has occurred in the BB frame with the BB frame sequence number of 3, a second half portion of the additional data packet 11 at the head of the additional data area of the next BB frame is discarded.

In step S157, the data extraction unit 311 determines whether or not there is a valid additional data packet. In a case where it is determined that there is a valid additional data packet, the process proceeds to step S158.

In step S158 the additional data processing unit 252 performs processing on additional data.

Specifically, the data extraction unit 311 identifies the type of additional data included in the valid additional data packet on the basis of the data type of the additional data header of the valid additional data packet. The data extraction unit 311 supplies the valid additional data packet and information indicating the type of the additional data packet to the data processing unit 102.

The data processing unit 102 restores additional data from the additional data packet, and performs various data processing on the restored additional data as needed. The data processing unit 102 supplies the additional data to the output unit 58.

The output unit 58 outputs the additional data. For example, the output unit 58 performs display of a prompt included in the additional data, output of sub-audio, and the like.

Thereafter, the process returns to step S151, and the processes in and after step S151 are executed.

On the other hand, in a case where it is determined in step S157 that there is no valid additional data packet, the process returns to step S151, and the processes in and after step S151 are executed.

Furthermore, in a case where it is determined in step S152 that a transmission error has occurred, the process proceeds to step S159.

In step S159, the transmission error processing unit 312 discards the additional data block.

In step S160, the transmission error processing unit 312 determines whether or not the additional data packet has been divided in the previous BB frame. In a case where it is determined that the additional data packet has been divided in the previous BB frame, the process proceeds to step S161.

For example, in a case where the BB frame sequence number of the target BB frame is any one of 1 to 4, it is determined that the additional data packet has been divided in the previous BB frame.

In step S161, the transmission error processing unit 312 discards a portion included in the previous BB frame of the additional data packet that has been divided in the previous BB frame.

For example, in a case where a transmission error occurs in the BB frame with the BB frame sequence number of 1, a first half portion of the additional data packet 2 at the end of the additional data area of the previous BB frame is discarded. For example, in a case where a transmission error occurs in the BB frame with the BB frame sequence number of 2, a first half portion of the additional data packet 5 at the end of the additional data area of the previous BB frame is discarded. For example, in a case where a transmission error occurs in the BB frame with the BB frame sequence number of 3, a first half portion of the additional data packet 8 at the end of the additional data area of the previous BB frame is discarded. For example, in a case where a transmission error occurs in the BB frame with the BB frame sequence number of 4, a first half portion of the additional data packet 11 of the previous BB frame is discarded.

Thereafter, the process returns to step S151, and the processes in and after step S151 are executed.

On the other hand, in step S160, in a case where it is determined that the additional data packet is not divided in the previous BB frame, the process returns to step S151, and the processes in and after step S151 are executed.

As described above, in the broadcasting system 201, the additional data packets are arranged in the sequence additional data area without any gaps from the front without providing the stuffing area, and the stuffing amount is minimized. Furthermore, even if transmission is performed without adding the position information of the additional data packet, the number of the additional data packet, and the like, on the reception side, the position of the additional data packet is detected only on the basis of the BB frame number, and the additional data packet is extracted. Thus, the effective data area for additional data can be increased, and transmission efficiency of additional data is improved.

Furthermore, for example, in Patent Document 1 described above, since the header information includes information regarding each packet in the main frame, in a case where a transmission error occurs in the header information, it becomes necessary to discard all the packets in the main frame.

On the other hand, in the broadcasting system 201, even if a transmission error occurs, only the additional data packet in the BB frame in which the transmission error has occurred and the divided additional data packets included in the previous and subsequent BB frames are discarded. Therefore, the influence of the transmission error is reduced, and the reliability of transmission of additional data is improved.

<<3. Method of Setting Number of Sequences of BB Frame Sequence>>

Next, an example of a method of setting the number of sequences of a BB frame sequence will be described with reference to FIGS. 25 to 34.

Figure 25:
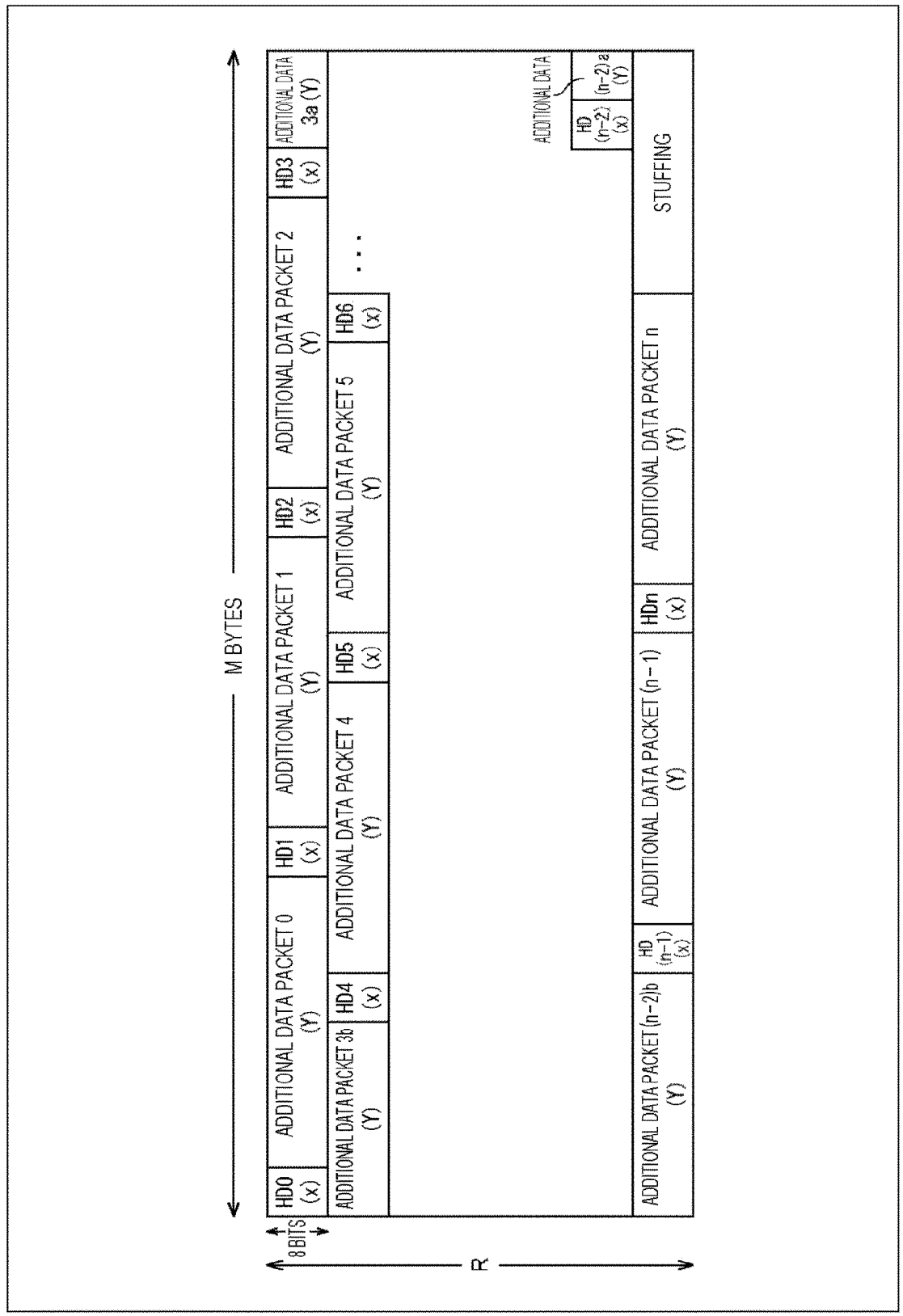
FIG. 25 is a diagram illustrating a format example of a general sequence additional data area.

FIG. 25 is a generalized diagram of the sequence additional data area of the BB frame sequence.

The sequence additional data area includes R M-byte additional data areas included in the BB frame sequence including R BB frames. Then, n pairs of an X-byte additional data header and a Y-byte additional data packet are arranged without any gaps from the head of the sequence additional data area. That is, pairs of an additional data header and an additional data packet are arranged up to a predetermined position of the sequence additional data area without providing any stuffing area. Furthermore, the remaining area at the end of the sequence additional data area is regarded as a stuffing area. That is, the stuffing area is arranged after the predetermined position of the sequence additional data area.

FIG. 26 illustrates the relationship between the number of sequences and the stuffing amount in a case where the additional data area is 532 bytes, the additional data header is 2 bytes, and the additional data packet is 188 bytes, as in the second embodiment.

For example, in a case where the number of sequences is set to one, the number of additional data packets in the BB frame sequence is two (=532 bytes (2 bytes+188 bytes)). In this case, the stuffing amount is 152 bytes (=532 bytes−(2 bytes+188 bytes)×2), and the stuffing amount per BB frame is 152 bytes.

In a case where the number of sequences is set to two, the number of additional data packets in the BB frame sequence is five (=532 bytes×2÷(2 bytes+188 bytes)). In this case, the stuffing amount is 114 bytes (=532 bytes×2−(2 bytes+188 bytes)×5), and the stuffing amount per BB frame is 57 bytes.

In a case where the number of sequences is set to three, the number of additional data packets in the BB frame sequence is eight (=532 bytes×3 (2 bytes+188 bytes)). In this case, the stuffing amount is 76 bytes (=532 bytes×3−(2 bytes+188 bytes)×8), and the stuffing amount per BB frame is approximately 25.3 bytes.

In a case where the number of sequences is set to four, the number of additional data packets in the BB frame sequence is 11 (=532 bytes×4 (2 bytes+188 bytes)). In this case, the stuffing amount is 38 bytes (=532 bytes×4−(2 bytes+188 bytes)×11), and the stuffing amount per BB frame is 9.5 bytes.

In a case where the number of sequences is set to five, the number of additional data packets in the BB frame sequence is 14 (=532 bytes×5÷(2 bytes+188 bytes)). In this case, the stuffing amount is zero bytes (=532 bytes×5−(2 bytes+188 bytes)×14), and the stuffing amount per BB frame is zero bytes.

Hereinafter, in a case where the number of sequences is a multiple of five, the stuffing amount will be zero bytes, and in a case where the number of sequences is not a multiple of five, the stuffing amount will not be zero bytes.

Here, the smaller the stuffing amount per BB frame, the more the transmission efficiency of additional data is improved. Therefore, if the number of sequences is set to a multiple of five, the transmission efficiency of additional data is maximized.

Furthermore, as the number of sequences becomes smaller, the amount of data in the sequence table described above with reference to FIGS. 16 and 18 becomes smaller. Thus, the circuits on the transmission side and the reception side can be miniaturized, and the power consumption can be reduced.

Therefore, in this example, it is desirable to set the number of sequences to five, as in the example described above.

FIG. 27 illustrates the relationship between the number of sequences and the stuffing amount in a case where the additional data area is 504 bytes, the additional data header is two bytes, and the additional data packet is 128 bytes.

For example, in a case where the number of sequences is set to one, the number of additional data packets in the BB frame sequence is three (=504 bytes÷(2 bytes+128 bytes)). In this case, the stuffing amount is 114 bytes (=504 bytes−(2 bytes+128 bytes)×3), and the stuffing amount per BB frame is 114 bytes.

In a case where the number of sequences is set to two, the number of additional data packets in the BB frame sequence is seven (=504 bytes×2÷(2 bytes+128 bytes)). In this case, the stuffing amount is 98 bytes (=504 bytes×2−(2 bytes+128 bytes)×7), and the stuffing amount per BB frame is 49 bytes.

In a case where the number of sequences is set to three, the number of additional data packets in the BB frame sequence is 11 (=504 bytes×3÷(2 bytes+128 bytes)). In this case, the stuffing amount is 82 bytes (=504 bytes×3−(2 bytes+128 bytes)×11), and the stuffing amount per BB frame is approximately 27.3 bytes.

In a case where the number of sequences is set to four, the number of additional data packets in the BB frame sequence is 15 (=504 bytes×4÷(2 bytes+128 bytes)). In this case, the stuffing amount is 66 bytes (=504 bytes×4−(2 bytes+128 bytes)×15), and the stuffing amount per BB frame is 16.5 bytes.

In a case where the number of sequences is set to five, the number of additional data packets in the BB frame sequence is 19 (=504 bytes×5÷(2 bytes+128 bytes)). In this case, the stuffing amount is 50 bytes (=504 bytes×5−(2 bytes+128 bytes)×19), and the stuffing amount per BB frame is 10 bytes.

In a case where the number of sequences is set to six, the number of additional data packets in the BB frame sequence is 23 (=504 bytes×6÷(2 bytes+128 bytes)). In this case, the stuffing amount is 34 bytes (=504 bytes×6−(2 bytes+128 bytes)×23 and the stuffing amount per BB frame is approximately 5.7 bytes.

In a case where the number of sequences is set to seven, the number of additional data packets in the BB frame sequence is 27 (=504 bytes×7÷(2 bytes+128 bytes)). In this case, the stuffing amount is 18 bytes (=504 bytes×7−(2 bytes+128 bytes)×27), and the stuffing amount per BB frame is approximately 2.6 bytes.

In a case where the number of sequences is set to eight, the number of additional data packets in the BB frame sequence is 31 (=504 bytes×8÷(2 bytes+128 bytes)). In this case, the stuffing amount is two bytes (=504 bytes×8−(2 bytes+128 bytes)×31), and the stuffing amount per BB frame is approximately 0.3 bytes.

Hereinafter, every time the number of sequences becomes a multiple of eight, the stuffing amount per BB frame becomes the minimum of 0.3.

Therefore, in this case, it is desirable to set the number of sequences to eight.

FIGS. 28 to 31 illustrate an example of the sequence table in a case where the number of sequences is set to eight. FIGS. 28 and 29 illustrate an example of the sequence table in a normal case.

Although detailed description is omitted, in a normal case, the additional data packet 0 to the additional data packet 2 and a part of the additional data packet 3 are arranged in the BB frame with the BB frame sequence number of 0.

In the BB frame with the BB frame sequence number of 1, a part of the additional data packet 3, an additional data packet 4 to an additional data packet 6, and a part of an additional data packet 7 are arranged.

In the BB frame with the BB frame sequence number of 2, a part of the additional data packet 7, an additional data packet 8 to an additional data packet 10, and a part of an additional data packet 11 are arranged.

In the BB frame with the BB frame sequence number of 3, a part of the additional data packet 11, an additional data packet 12 to an additional data packet 14, and a part of an additional data packet 15 are arranged.

In the BB frame with the BB frame sequence number of 4, a part of the additional data packet 15, an additional data packet 16 to an additional data packet 18, and a part of an additional data packet 19 are arranged.

In the BB frame with the BB frame sequence number of 5, a part of the additional data packet 19, an additional data packet 20 to an additional data packet 22, and a part of an additional data packet 23 are arranged.

In the BB frame with the BB frame sequence number of 6, a part of the additional data packet 23, an additional data packet 24 to an additional data packet 26, and a part of an additional data packet 27 are arranged.

In the BB frame with the BB frame sequence number of 7, a part of the additional data packet 27 and an additional data packet 28 to an additional data packet 30 are arranged. Furthermore, a two-byte stuffing area is arranged at the end.

FIG. 30 illustrates an example of the sequence table of the BB frame sequence at the end of the C2 frame with the number of BB frames of 925.

In this case, the arrangement of the BB frames with the BB frame sequence numbers of 0 to 3 is similar to that in the normal case.

On the other hand, in the BB frame with the BB frame sequence number of 4, a part of an additional data packet 15 and an additional data packet 16 to an additional data packet 18 are arranged, and a stuffing area of 50 bytes is arranged at the end.

Then, only this BB frame sequence has the number of sequences of five.

FIG. 31 illustrates an example of the sequence table of the BB frame sequence at the end of the C2 frame with the number of BB frames of 924.

In this case, the arrangement of the BB frames with the BB frame sequence numbers of 0 to 2 is similar to that in the normal case.

On the other hand, in the BB frame with the BB frame sequence number of 3, a part of an additional data packet 11 and an additional data packet 12 to an additional data packet 14 are arranged, and a stuffing area of 66 bytes is arranged at the end.

Then, only this BB frame sequence has the number of sequences of four.

Note that in DVB-C2, shuffling processes of time interleaving (TI) and frequency interleaving (FI) are performed on the transmission side in order to improve error tolerance during transmission. Accordingly, the number of sequences may be set in consideration of not only the stuffing amount per BB frame but also the shuffling process.

Figure 32:
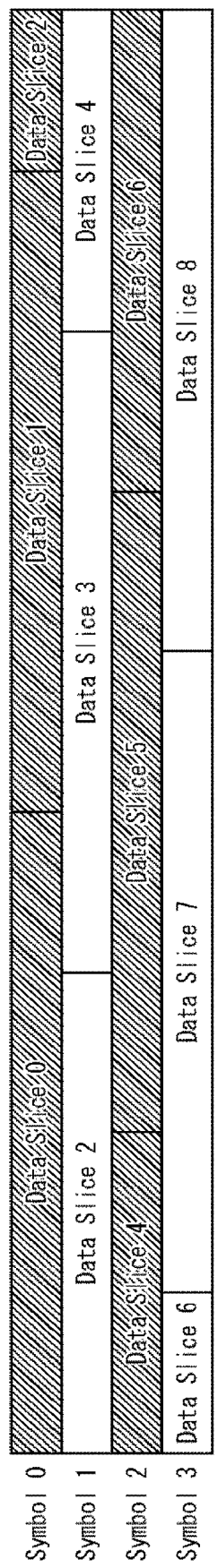
FIG. 32 is a diagram for explaining a shuffling process.

Here, an outline of the shuffling process will be described with reference to FIGS. 32 to 34.

For example, by performing adding the FEC, Bit-Interleaver, Demux bit to cells, Map cell to constellations, and the like on a 1,779-byte BB frame, a stream called a 1620-word (one word equals to 10 bits) data slice is generated. Then, by adding a pilot signal into approximately 2.25 data slices, a 3408-word symbol is generated, as illustrated in FIG. 32. In the example of FIG. 32, four symbols are generated from approximately eight (more accurately, approximately 8.26 as described later) data slices.

As illustrated in FIG. 33, in a case of KDS,min=50332 specified in 9.4.1.1 Start and end OFDM carrier of DATA Slice of ETSI EN 302 769 (Digital Video Broadcasting (DVB); Frame Structure channel coding and modulation for a second generation digital transmission system for cable system (DVB-C2), the length of symbol 0 and symbol 1 is 3345 words, and the length of symbol 2 and symbol 3 is 3344 words. Then, by inserting the pilot signal at a predetermined position of the symbols 0 to 3, the length of the symbols 0 to 3 becomes 3408 words. A time interleaving (TI) frame is generated from these four symbols.

Then, within this TI frame, shuffling is performed so that adjacent data in the same data slice are not adjacent to each other.

Figure 34:
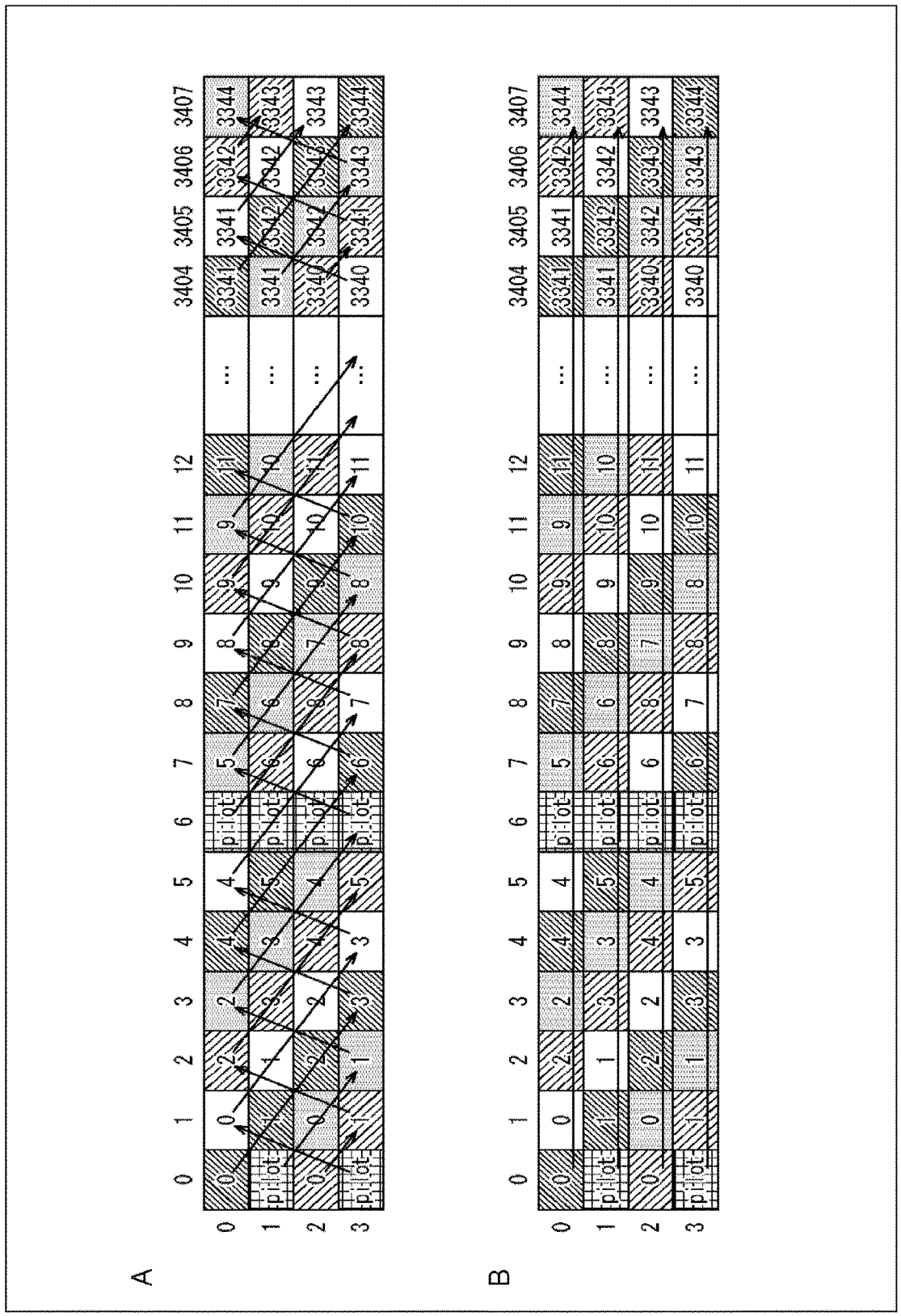
FIG. 34 is a diagram for explaining the shuffling process.

For example, as illustrated in A of FIG. 34, the TI frame is written to the memory area of 3408 columns×4 rows. Specifically, the data of each symbol is written to the memory area while shifting the columns and rows one by one in word units.

For example, the data of the zeroth word of symbol 0 is written at the position of (0, 0), the data of the first word is written at the position of (1, 1), the data of the second word is written at the position of (2, 2), and the data of the third word is written at the position of (3, 3). The data of the fifth word of symbol 0 is written at the position of (5, 0), the data of the sixth word is written at the position of (6, 1), the data of the seventh word is written at the position of (7, 2), and the data of the eighth word is written at the position of (8, 3). Similarly, the data of other symbols are written to the memory area while shifting the columns and rows in word units.

Then, as illustrated in B of FIG. 34, the TI frame written in the memory area is read out. Specifically, each data of the TI frame is read according to a row direction of the memory area. Thus, adjacent data within the same symbol will be arranged about one symbol apart.

Thereafter, by a frequency interleaving process, the data is shuffled within the symbols in the TI frame.

Thus, the data in each BB frame is arranged in a distributed manner, and resistance to burst error in transmission paths is improved.

Here, since the pilot signal in the TI frame is 254 words, the length excluding the pilot signal of the TI frame is 13,378 words. Since the length of the BB frame is 1,620 words, the number of BB frames in the TI frame is approximately 8.26. Therefore, if the number of sequences of the BB frame sequence is eight or less, there is a high possibility that, in a case where a transmission path error occurs, it is restored with FEC.

Therefore, by selecting the number of sequences that minimizes the stuffing amount per BB frame within the range of eight or less, the transmission efficiency of additional data can be improved while increasing the resistance to burst error and improving the reliability of transmission of additional data.

Note that, for example, the number of sequences and the sequence table are set in the integrated system 12. Then, the integrated system 12 transmits frame sequence information including the set number of sequences and sequence table to the CCU 222. The timing control unit 351 of the CCU 222 receives the frame sequence information via the reception unit 74, and supplies the received frame sequence information to the BB frame sequence number setting unit 354 and the multiplexing unit 355.

The BB frame sequence number setting unit 354 assigns a BB frame sequence number to the BB frame on the basis of the set number of sequences and the BB frame number of the BB frame. The multiplexing unit 355 inserts an additional data header and an additional data packet on the basis of the assigned BB frame sequence number and the set sequence table. Furthermore, the multiplexing unit 355 transmits the frame sequence information to the camera 221 via the transmission unit 77.

The data acquisition unit 301 of the camera 221 receives the frame sequence information via the reception unit 54 and the separation unit 251. The BB frame sequence number setting unit 314 of the data acquisition unit 301 assigns a BB frame sequence number to the BB frame (target BB frame) to be processed on the basis of the set number of sequences. The data extraction unit 311 of the data acquisition unit 301 extracts the additional data header and the additional data packet on the basis of the assigned BB frame sequence number and the set sequence table.

Note that the number of sequences and the sequence table may be set not by the integrated system 12 but by, for example, the timing control unit 351 of the CCU 222.

Furthermore, for example, the data acquisition unit 301 of the camera 221 may set the number of sequences and the sequence table by itself without acquiring the frame sequence information from the CCU 222. However, in this case, before the data acquisition unit 301 assigns the BB frame sequence number and extracts data, it is necessary to check whether or not the number of sequences and the sequence table set in the integrated system 12 or the timing control unit 351 and the number of sequences and the sequence table set in the data acquisition unit 301 match.

Moreover, for example, the number of sequences and the sequence table may be set in advance by another device that is not illustrated, and the frame sequence information including the set number of sequences and sequence table may be stored in the data acquisition unit 301 of the camera 221 and the timing control unit 351, the BB frame sequence number setting unit 354, and the multiplexing unit 355 of the CCU 222.

«4. Modification Example»

Hereinafter, a modification example of the above-described embodiment of the present technology will be described.

The present technology is not limited to the transmission method described above, and can be applied to various transmission methods in which, for example, the main frame includes a plurality of subframes and each subframe includes an additional data area having a predetermined length. For example, the present technology can be applied to serial digital interface (SDI) transmission, Internet Protocol (IP) transmission, and the like. Furthermore, the transmission method may be either wired or wireless.

Furthermore, for example, the additional data area may be divided into a plurality of areas within the subframe.

Moreover, for example, the additional data area packet may be longer than the additional data area. In this case, the additional data area packet is always arranged by dividing into a plurality of additional data areas.

Furthermore, for example, the additional data area packets are not required to all have the same length.

For example, the length of an additional data area packet may be different for each type of additional data. However, it is assumed that the arrangement of additional data packets with respective lengths is fixed in the sequence additional data area.

Moreover, for example, in a case where the number of subframes in the main frame is constant, it is not always necessary to include the information indicating the number of subframes in the payload header, unlike the number of BB frames in FIG. 14, for example.

Furthermore, the additional data packet at the end of the sequence additional data area may be lengthened without providing the stuffing area at the end of the sequence additional data area.

Figure 35:
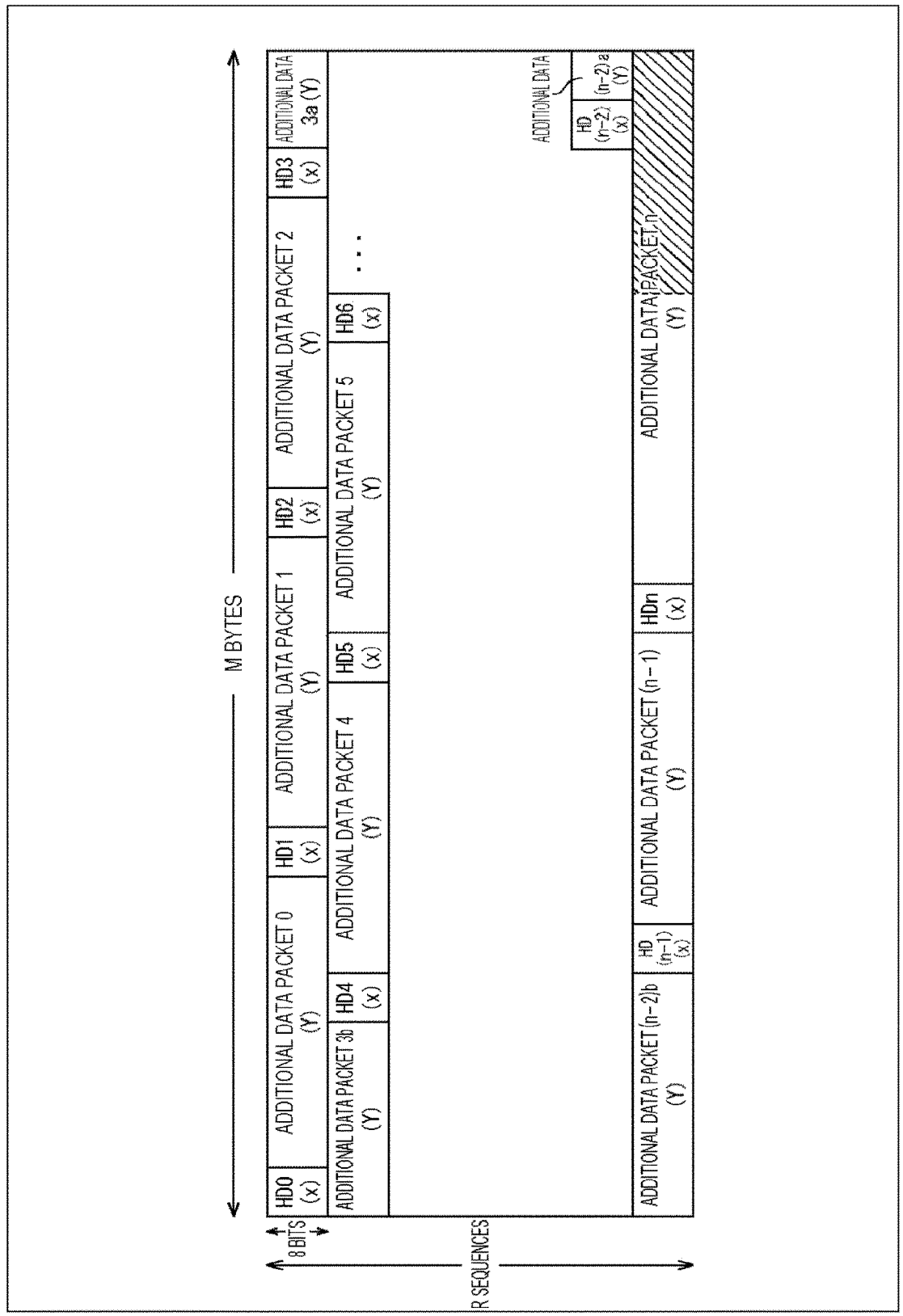
FIG. 35 is a diagram illustrating a modification example of a sequence additional data area.

For example, FIG. 35 illustrates a modification example of the sequence additional data area described above with reference to FIG. 24. In this example, the length of the additional data packet at the end of the sequence additional data area is set so that the sequence additional data area does not remain. That is, the area that is the stuffing area in the example of FIG. 24 is added to an additional data packet n at the end of the sequence additional data area, and the length of the additional data packet n is longer than those of other additional data packets. Thus, the additional data area can be used more efficiently.

Moreover, the types of main data and additional data (subdata) are not limited to the above-mentioned examples, and any kind of data can be used. For example, camera lens data and the like can be used as additional data.

«5. Application example»

The technique according to the present disclosure can be applied to, for example, various systems and devices in which data is transmitted between a transmission device (transmission unit) and a reception device (reception unit), besides the above-described imaging system.

<Configuration Example of Medical System 401>

Figure 36:
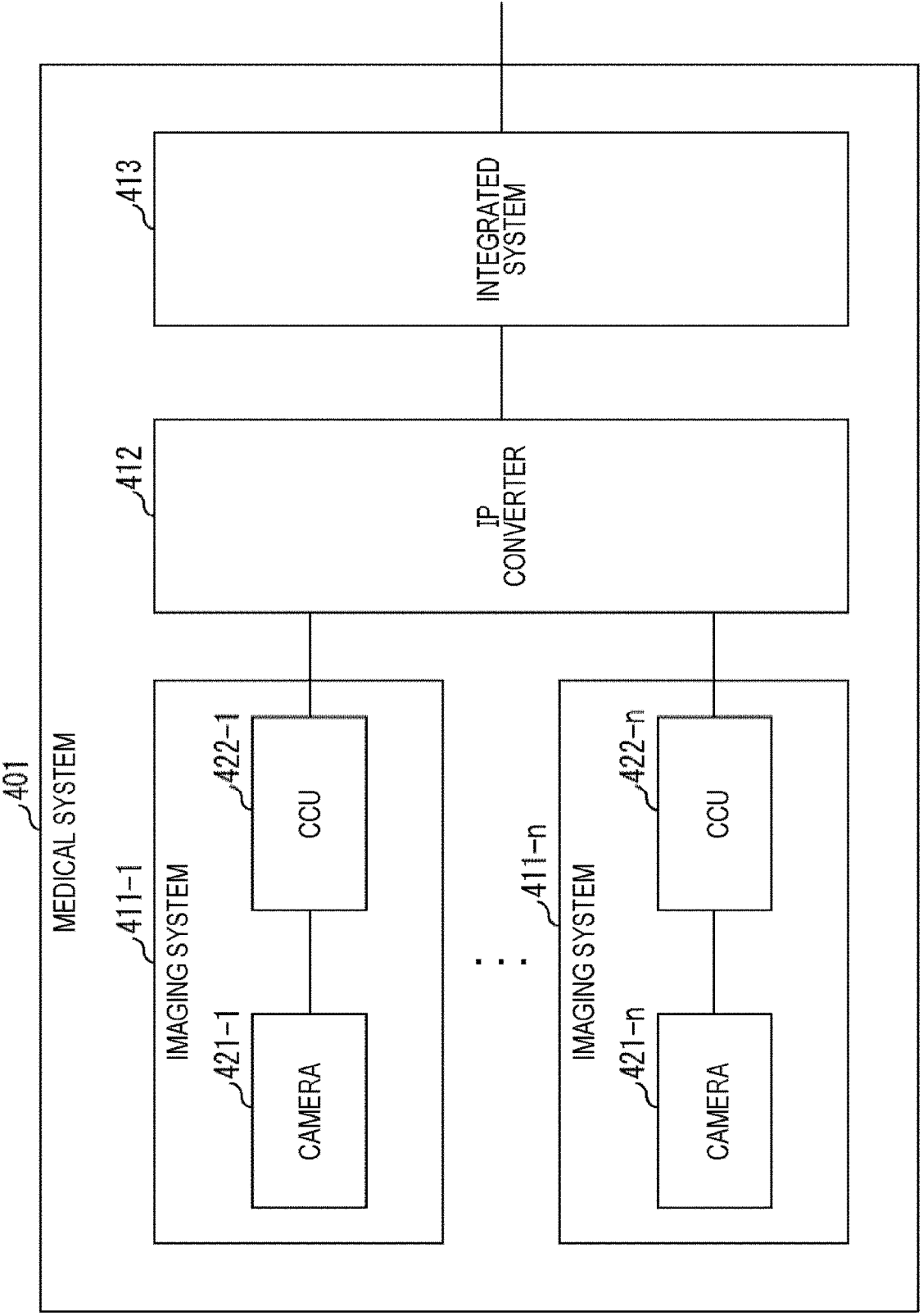
FIG. 36 is a block diagram illustrating an embodiment of a medical system to which the present technology is applied.

FIG. 36 is a block diagram illustrating a configuration example of a medical system 401 to which the present technology is applied.

The medical system 401 is a system provided in an operating room of a hospital or the like and used for monitoring or the like of a medical site. The medical system 401 includes imaging systems 411-1 to 411-*n*, an IP (Internet Protocol) converter 412, and an integrated system 413.

The imaging system 411-1 to the imaging system 411-*n* are systems that image video individually. The imaging system 411-*i* (i=1 to n) includes a camera 421-*i* and a CCU (camera control unit) 422-*i*.

The camera 421-*i* includes an endoscope camera, an operative field camera, an operating room camera, and the like. The camera 421-*i* performs imaging and supplies obtained video data to the CCU 422-*i*. Note that the video data may or may not include audio data acquired together with the video.

The CCU 422-*i* performs controlling of the camera 421-*i*, signal processing on video data supplied from the camera 421-*i*, and relaying of various data between the camera 421-*i* and the IP converter 412, and the like.

Note that hereinafter, in a case where it is not necessary to individually distinguish the imaging system 411-1 to the imaging system 411-*n*, the camera 421-1 to the camera 421-*n*, and the CCU 422-1 to the CCU 422-*n*, they will be simply referred to as an imaging system 411, a camera 421, and a CCU 422, respectively.

The IP converter 412 converts the video data supplied from the CCU 422 into, for example, transmission data based on the IP transmission format. At this time, the IP converter 412 inserts additional data into the transmission data by the method described above. The IP converter 412 supplies the transmission data to the integrated system 413 or transmits the transmission data to an external device via the integrated system 413.

Note that the additional data is, for example, text-converted data of voices such as conversations during surgery collected by the camera 421. Thus, for example, when editing a surgical video as a teaching material or for presentation at an academic conference, it is possible to perform efficient editing using text data.

Note that the conversion of voice into text may be performed by the IP converter 412 or the integrated system 413, or by a voice analysis device or the like that is not illustrated.

The integrated system 413 performs recording and output of video data supplied from each CCU 422, display of video based on the video data, switching of the video, editing of the video, and the like via the IP converter 412. Furthermore, the integrated system 413 controls each camera 421 via the IP converter 412 and each CCU 422.

<Configuration Example of Operating Room System 5100>

Figure 37:
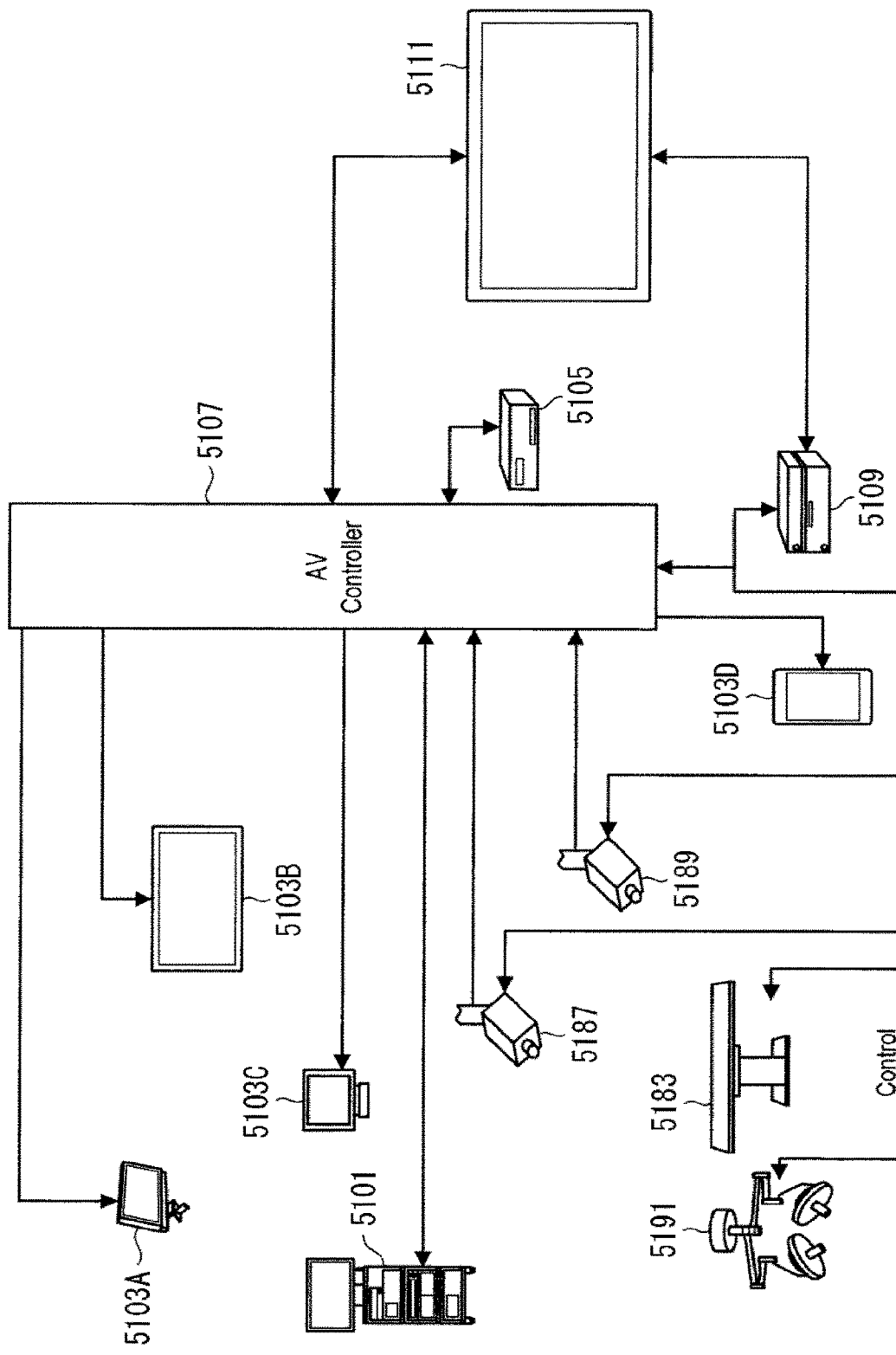
FIG. 37 is a diagram schematically illustrating an overall configuration of an operating room system.
Figure 38:
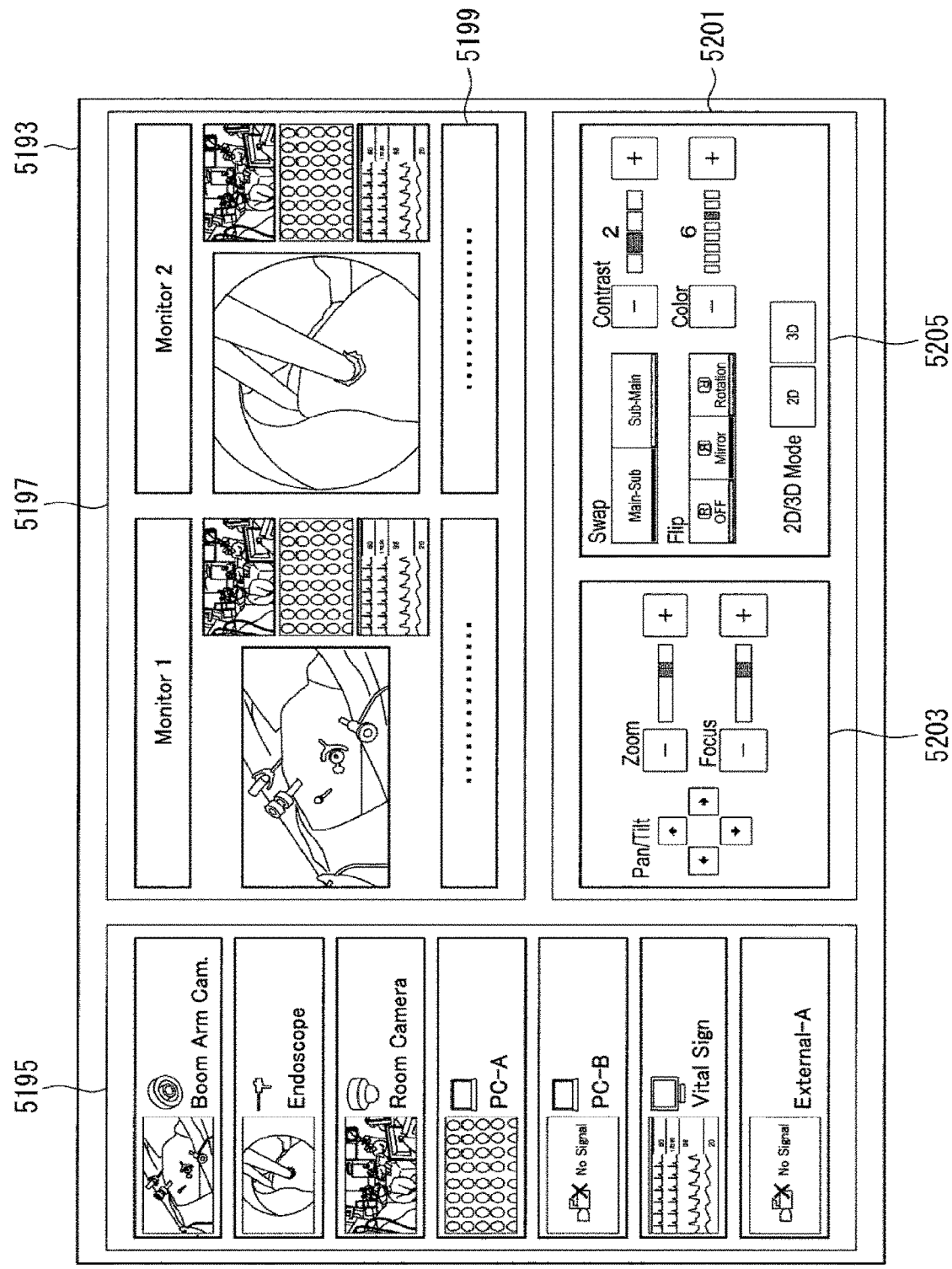
FIG. 38 is a diagram illustrating a display example of an operation screen on a centralized operation panel.
Figure 39:
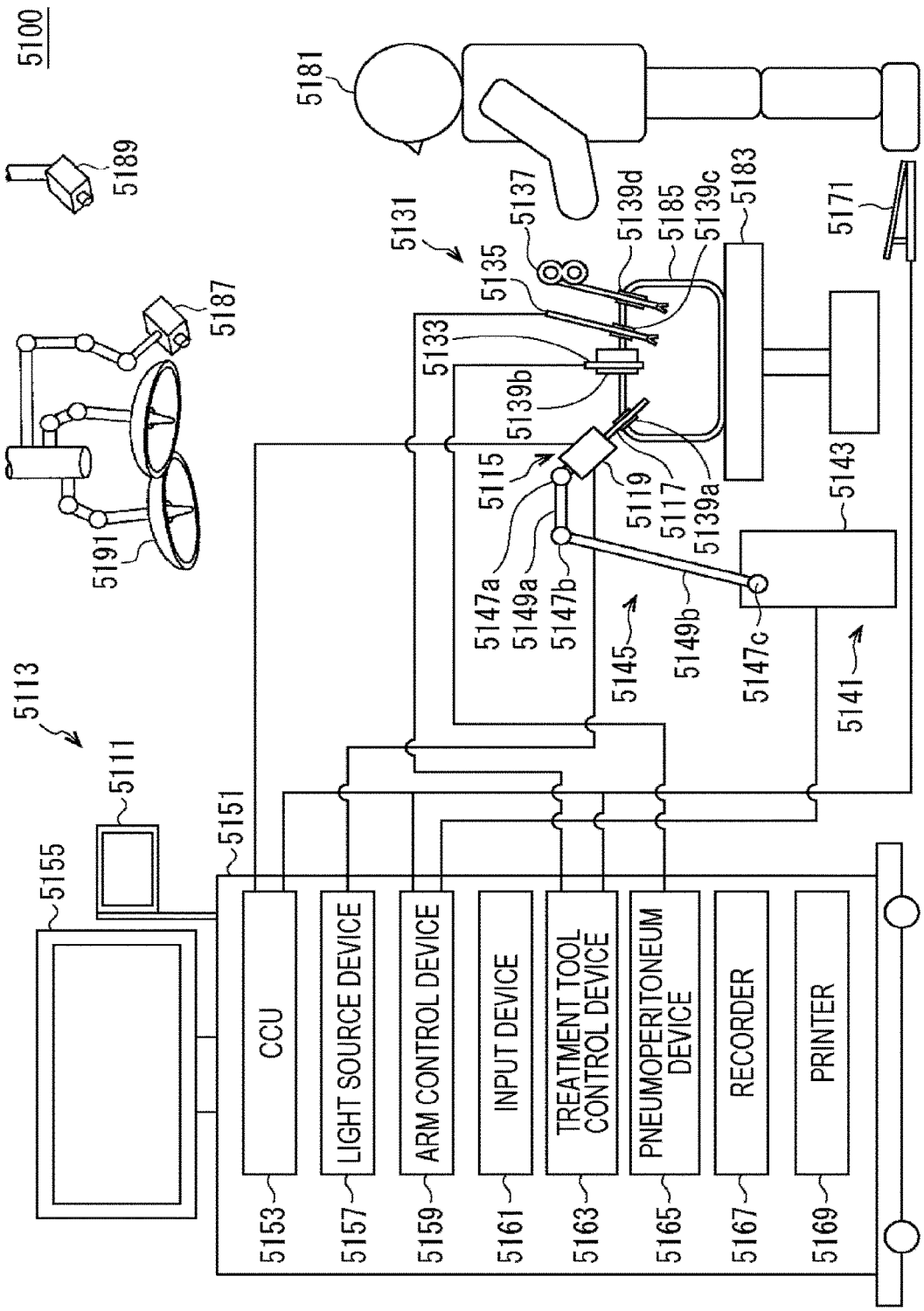
FIG. 39 is a diagram illustrating an example of a situation of surgery to which an operating room system is applied.

FIGS. 37 to 39 illustrate a configuration example of an operating room system 5100 embodying the medical system 401 of FIG. 36.

FIG. 37 is a diagram schematically illustrating an overall configuration of the operating room system 5100 to which the technology according to the present disclosure can be applied. Referring to FIG. 37, the operating room system 5100 is configured by connecting a group of devices installed in the operating room in a cooperative manner with each other via an audiovisual controller (AV Controller) 5107 and an operating room control device 5109.

Various devices can be installed in the operating room. FIG. 37 illustrates, as an example, a device group 5101 of various devices for endoscopic surgery, a ceiling camera 5187 that is provided on the ceiling of the operating room and images around the hands of the operator, an operating room camera 5189 that is provided on the ceiling of the operating room and images the situation of the entire operating room, a plurality of display devices 5103A to 5103D, a recorder 5105, a patient bed 5183, and an illumination 5191.

Here, among these devices, the device group 5101 belongs to an endoscopic surgery system 5113 described later, and includes an endoscope, a display device for displaying an image captured by the endoscope, and the like. Each device belonging to the endoscopic surgery system 5113 is also called a medical device. On the other hand, the display devices 5103A to 5103D, the recorder 5105, the patient bed 5183, and the illumination 5191 are devices provided separately from the endoscopic surgery system 5113, for example, in the operating room. Each of these devices that does not belong to the endoscopic surgery system 5113 is also called a non-medical device. The audiovisual controller 5107 and/or the operating room control device 5109 controls operations of these medical devices and non-medical devices in cooperation with each other.

The audiovisual controller 5107 comprehensively controls processing related to image display in medical devices and non-medical devices. Specifically, among the devices included in the operating room system 5100, the device group 5101, the ceiling camera 5187, and the operating room camera 5189 can be devices (hereinafter, also referred to as source devices) that have a function of transmitting information to be displayed during surgery (hereinafter, also referred to as display information). Further, the display devices 5103A to 5103D may be devices (hereinafter, also referred to as output destination devices) that output the display information. Furthermore, the recorder 5105 may be a device corresponding to both the source device and the output destination device. The audiovisual controller 5107 has a function to control operations of the source devices and the output destination devices, acquire display information from the source devices, and transmit the display information to the output destination devices for display or recording. Note that the displayed information includes various images captured during surgery, various information related to surgery (for example, physical information of a patient, information regarding past test results and surgical procedures, and the like), and the like.

Specifically, to the audiovisual controller 5107, information can be transmitted regarding an image of a surgical site in the body cavity of a patient imaged by the endoscope as the display information from the device group 5101. Further, the ceiling camera 5187 may transmit information regarding an image around the hands of the operator imaged by the ceiling camera 5187 as the display information. Furthermore, the operating room camera 5189 may transmit, as the display information, information regarding an image showing a situation of the entire operating room imaged by the operating room camera 5189. Note that in a case where the operating room system 5100 has another device having an imaging function, the audiovisual controller 5107 may also acquire information regarding an image captured by the other device from the other device as the display information.

Alternatively, for example, in the recorder 5105, information regarding these previously captured images is recorded by the audiovisual controller 5107. The audiovisual controller 5107 can acquire information regarding the images captured in the past from the recorder 5105 as the display information. Note that in the recorder 5105, various information related to surgery may also be recorded in advance.

The audiovisual controller 5107 displays the acquired display information (that is, an image captured during surgery and various types of information regarding the surgery) on at least one of the display devices 5103A to 5103D that are output destination devices. In the illustrated example, the display device 5103A is a display device installed by suspending from the ceiling of the operating room, the display device 5103B is a display device installed on a wall surface of the operating room, the display device 5103C is a display device installed on a desk in the operating room, and the display device 5103D is a mobile device having a display function (for example, a tablet personal computer (PC)).

Furthermore, although not illustrated in FIG. 37, the operating room system 5100 may include a device outside the operating room. The device outside the operating room may be, for example, a server connected to a network constructed inside or outside the hospital, a PC used by a medical staff, a projector installed in a conference room of a hospital, or the like. In a case where such an external device is located outside the hospital, the audiovisual controller 5107 can also display the display information on a display device of another hospital via a video conference system or the like for distance medicine.

The operating room control device 5109 comprehensively controls processing other than processing related to image display in non-medical devices. For example, the operating room control device 5109 controls driving of the patient bed 5183, the ceiling camera 5187, the operating room camera 5189, and the illumination 5191.

The operating room system 5100 is provided with a centralized operation panel 5111, and the user can give an instruction on image display to the audiovisual controller 5107, or can give an instruction on operation of non-medical devices to the operating room control device 5109, via the centralized operation panel 5111. The centralized operation panel 5111 is formed by providing a touch panel on a display surface of the display device.

FIG. 38 is a diagram illustrating a display example of an operation screen on the centralized operation panel 5111. FIG. 38 illustrates, as an example, an operation screen corresponding to a case where the operating room system 5100 is provided with two display devices as output destination devices. Referring to FIG. 38, an operation screen 5193 is provided with a source selection area 5195, a preview area 5197, and a control area 5201.

In the source selection area 5195, a source device provided in the operating room system 5100 and a thumbnail screen representing display information possessed by the source device are linked and displayed. The user can select display information to be displayed on the display device from any of source devices displayed in the source selection area 5195.

In the preview area 5197, previews of the screens displayed on the two display devices (monitor 1 and monitor 2), which are output destination devices, are displayed. In the illustrated example, four images are displayed as PinP on one display device. The four images correspond to display information transmitted from the source device selected in the source selection area 5195. Among the four images, one is displayed relatively large as a main image and the remaining three are displayed relatively small as sub-images. The user can swap the main image and the sub images by appropriately selecting areas in which the four images are displayed. Furthermore, a status display area 5199 is provided below the area where the four images are displayed, and the status related to the surgery (for example, the elapsed time of surgery, physical information of the patient, or the like) can be appropriately displayed in this area.

The control area 5201 includes a source operation area 5203 in which graphical user interface (GUI) components for operating the source devices are displayed, and an output destination operation area 5205 in which GUI components for operating the output destination devices are displayed. In the illustrated example, the source operation area 5203 is provided with GUI components for performing various operations (pan, tilt, and zoom) on the camera in the source device having an imaging function. The user can operate an action of the camera in the source device by appropriately selecting these GUI components. Note that although not illustrated, in a case where the source device selected in the source selection area 5195 is a recorder (that is, in a case where an image recorded in the past on the recorder is displayed in the preview area 5197), the source operation area 5203 may be provided with GUI components for performing operations such as playing, stopping, rewinding, and fast-forwarding of the image.

Furthermore, the output destination operation area 5205 is provided with GUI components for performing various operations (swap, flip, color adjustment, contrast adjustment, switching between 2D display and 3D display) for display on the display device that is the output destination device. The user can operate the display on the display device by appropriately selecting these GUI components.

Note that the operation screen displayed on the centralized operation panel 5111 is not limited to the illustrated example, and the user may be allowed to perform, via the centralized operation panel 5111, an operational input to each device that can be controlled by the audiovisual controller 5107 and the operating room control device 5109 provided in the operating room system 5100.

FIG. 39 is a diagram illustrating an example of a situation of surgery to which the operating room system described above is applied. The ceiling camera 5187 and the operating room camera 5189 are provided on the ceiling of the operating room, and can image around the hands of the operator (surgeon) 5181 performing a procedure on the affected part of the patient 5185 on the patient bed 5183 and the situation of the entire operating room. The ceiling camera 5187 and the operating room camera 5189 may be provided with a magnification adjustment function, a focal length adjustment function, an imaging direction adjustment function, and the like. The illumination 5191 is installed on the ceiling of the operating room and illuminates at least around the hands of the operator 5181. The illumination 5191 may be capable of appropriately adjusting the amount of irradiation light, the wavelength (color) of the irradiation light, the irradiation direction of the light, and the like.

The endoscopic surgery system 5113, the patient bed 5183, the ceiling camera 5187, the operating room camera 5189, and the illumination 5191 are connected in a cooperative manner with each other via the audiovisual controller 5107 and the operating room control device 5109 (not illustrated in FIG. 39) as illustrated in FIG. 37. The centralized operation panel 5111 is provided in the operating room, and as described above, the user can appropriately operate these devices existing in the operating room through the centralized operation panel 5111.

Hereinafter, a configuration of the endoscopic surgery system 5113 will be described in detail. As illustrated in the diagram, the endoscopic surgery system 5113 includes an endoscope 5115, other surgical tools 5131, a support arm device 5141 that supports the endoscope 5115, and a cart 5151 on which various devices for endoscopic surgery are mounted.

In endoscopic surgery, instead of cutting the abdominal wall to open the abdomen, a plurality of tubular opening devices called trocars 5139$a$ to 5139$d$ is introduced through the abdominal wall. Then, a lens barrel 5117 of the endoscope 5115 and other surgical tools 5131 are inserted into the body cavity of the patient 5185 through the trocars 5139$a$ to 5139$d$. In the illustrated example, a pneumoperitoneum tube 5133, an energy treatment device 5135, and forceps 5137 are inserted into the body cavity of the patient 5185 as the other surgical tools 5131. Furthermore, the energy treatment device 5135 is a treatment tool that performs incision and peeling of tissue, sealing of blood vessels, or the like by high-frequency current or ultrasonic vibration. However, the illustrated surgical tools 5131 are merely examples, and various surgical tools generally used in endoscopic surgery, such as tweezers and a retractor, may be used as the surgical tools 5131.

An image of the surgical site in the body cavity of the patient 5185 taken by the endoscope 5115 is displayed on a display device 5155. The operator 5181 performs a procedure such as excising the affected site using the energy treatment device 5135 and the forceps 5137, for example, while viewing in real-time the image of the surgical site displayed on the display device 5155. Note that although illustration is omitted, the pneumoperitoneum tube 5133, the energy treatment device 5135, and the forceps 5137 are supported by the operator 5181 or an assistant during surgery or the like.

(Support Arm Device)

The support arm device 5141 includes an arm 5145 extending from a base unit 5143. In the illustrated example, the arm 5145 includes joints 5147*a*, 5147*b*, and 5147*c* and links 5149*a* and 5149*b*, and is driven by control from an arm control device 5159. The arm 5145 supports the endoscope 5115, and the position and posture of the endoscope 5115 are controlled. Thus, stable fixation of the position of the endoscope 5115 can be achieved.

(Endoscope)

The endoscope 5115 includes a lens barrel 5117 having a region with a predetermined length from a distal end to be inserted into the body cavity of the patient 5185, and a camera head 5119 connected to a base end of the lens barrel 5117. In the illustrated example, the endoscope 5115 configured as what is called a rigid endoscope having a rigid lens barrel 5117 is illustrated, but the endoscope 5115 may be configured as what is called a flexible mirror having a flexible lens barrel 5117.

An opening in which an objective lens is fitted is provided in the distal end of the lens barrel 5117. A light source device 5157 is connected to the endoscope 5115, and light generated by the light source device 5157 is guided to the distal end of the lens barrel by a light guide extending inside the lens barrel 5117, and is emitted toward an observation target in the body cavity of the patient 5185 through the objective lens. Note that the endoscope 5115 may be a forward-viewing endoscope, an oblique-viewing endoscope, or a side-viewing endoscope.

An optical system and an image sensor are provided inside the camera head 5119, and reflected light (observation light) from the observation target is focused on the image sensor by the optical system. The observation light is photoelectrically converted by the image sensor, and an electrical signal corresponding to the observation light, that is, an image signal corresponding to an observation image is generated. The image signal is transmitted as RAW data to a camera control unit (CCU) 5153. Note that the camera head 5119 is equipped with a function of adjusting magnification and focal length by appropriately driving the optical system.

Note that the camera head 5119 may be provided with a plurality of image sensors in order to support stereoscopic viewing (3D display) or the like, for example. In this case, a plurality of relay optical systems is provided inside the lens barrel 5117 in order to guide the observation light to each of the plurality of image sensors.

(Various Devices Mounted on Cart)

The CCU 5153 includes a central processing unit (CPU), a graphics processing unit (GPU), and the like, and integrally controls operations of the endoscope 5115 and the display device 5155. Specifically, the CCU 5153 subjects an image signal received from the camera head 5119 to various image processing such as development processing (demosaic processing) for example for displaying an image based on the image signal. The CCU 5153 provides the display device 5155 with the image signal subjected to the image processing. Furthermore, the audiovisual controller 5107 illustrated in FIG. 37 is connected to the CCU 5153. The CCU 5153 also provides the image signal subjected to the image processing to the audiovisual controller 5107. Furthermore, the CCU 5153 also transmits a control signal to the camera head 5119 to control driving thereof. The control signal may include information regarding imaging conditions such as magnification and focal length. The information regarding the imaging condition may be input via an input device 5161 or may be input via the centralized operation panel 5111 described above.

By control from the CCU 5153, the display device 5155 displays an image based on the image signal subjected to the image processing by the CCU 5153. In a case where the endoscope 5115 is compatible with, for example, high-resolution imaging such as 4K (3840 horizontal pixels×2160 vertical pixels) or 8K (7680 horizontal pixels×4320 vertical pixels), and/or 3D display, a display device capable of high-resolution display and/or capable of 3D display in a respectively compatible manner can be used as the display device 5155. In a case where it is compatible with high-resolution imaging such as 4K or 8K, more immersive feeling can be obtained by using a display having a size of 55 inches or more as the display device 5155. Furthermore, a plurality of display devices 5155 having different resolutions and sizes may be provided depending on the application.

The light source device 5157 includes, for example, a light source such as a light emitting diode (LED), and supplies the endoscope 5115 with irradiation light at the time of imaging the surgical site.

The arm control device 5159 includes a processor such as a CPU, for example, and operates according to a predetermined program so as to control driving of the arm 5145 of the support arm device 5141 according to a predetermined control method.

The input device 5161 is an input interface for the endoscopic surgery system 5113. The user can input various information and instructions to the endoscopic surgery system 5113 via the input device 5161. For example, the user inputs various information regarding the surgery, such as physical information of the patient and information regarding a surgical procedure, through the input device 5161. Furthermore, for example, the user inputs, via the input device 5161, an instruction to drive the arm 5145, an instruction to change imaging conditions (type of irradiation light, magnification, focal length, and so on) by the endoscope 5115, an instruction to drive the energy treatment device 5135, or the like.

The type of the input device 5161 is not limited, and the input device 5161 may be various known input devices. As the input device 5161, for example, a mouse, a keyboard, a touch panel, a switch, a foot switch 5171, and/or a lever or the like can be applied. In a case where a touch panel is used as the input device 5161, the touch panel may be provided on the display surface of the display device 5155.

Alternatively, for example, the input device 5161 is a device worn by the user, such as a glasses-type wearable device or a head mounted display (HMD), and various inputs are performed according to a gesture or line of sight of the user detected by these devices. Furthermore, the input device 5161 includes a camera capable of detecting a movement of the user, and various inputs are performed according to a gesture or line of sight of the user detected from the image captured by the camera. Moreover, the input device 5161 includes a microphone capable of collecting voice of the user, and various inputs are performed by voice through the microphone. Thus, by the input device 5161 configured to be capable of inputting various kinds of information in a contactless manner, particularly a user (for example, an operator 5181) who belongs to a clean area can operate devices belonging to an unclean area in a contactless manner. Furthermore, the user can operate the devices without taking his or her hand off the surgical tool that he or she is holding, and thus the convenience for the user is improved.

A treatment tool control device 5163 controls driving of the energy treatment device 5135 for cauterization of tissue, incision, sealing of blood vessel, or the like. A pneumoperitoneum device 5165 delivers gas into the body cavity through the pneumoperitoneum tube 5133 in order to inflate the body cavity of the patient 5185 for the purpose of securing the field of view by the endoscope 5115 and the working space of the operator. A recorder 5167 is a device capable of recording various information regarding surgery. A printer 5169 is a device capable of printing various information regarding surgery in various formats such as text, image, or graph.

Hereinafter, a particularly characteristic configuration of the endoscopic surgery system 5113 will be described in more detail.

(Support Arm Device)

The support arm device 5141 includes a base unit 5143, which is a base, and an arm 5145 extending from the base unit 5143. In the illustrated example, the arm 5145 includes a plurality of joints 5147a, 5147b, and 5147c and a plurality of links 5149a and 5149b connected by the joint 5147b, but in FIG. 39, for simplicity, the configuration of the arm 5145 is illustrated in a simplified manner. In practice, the shapes, numbers, and arrangement of the joints 5147a to 5147c and the links 5149a and 5149b, and directions of rotation axes of the joints 5147a to 5147c and the like are appropriately set so that the arm 5145 has a desired degree of freedom. For example, preferably, the arm 5145 may have six or more degrees of freedom. Thus, the endoscope 5115 can be freely moved within a movable range of the arm 5145, and hence it is possible to insert the lens barrel 5117 of the endoscope 5115 into the body cavity of the patient 5185 from a desired direction.

The joints 5147a to 5147c are provided with actuators, and the joints 5147a to 5147c may be rotatable about a predetermined rotation axis by driving the actuators. By controlling driving of the actuators by the arm control device 5159, the rotation angles of the respective joints 5147a to 5147c are controlled and driving of the arm 5145 is controlled. Thus, control of the position and posture of the endoscope 5115 can be achieved. At this time, the arm control device 5159 can control driving of the arm 5145 by various known control methods such as force control or position control.

For example, by the operator 5181 performing an appropriate operation input via the input device 5161 (including the foot switch 5171), driving of the arm 5145 may be appropriately controlled by the arm control device 5159 in accordance with the operation input, and the position and posture of the endoscope 5115 may be controlled. By this control, the endoscope 5115 at a distal end of the arm 5145 can be moved from any position to any position and then fixedly supported at the position after the movement. Note that the arm 5145 may be operated by what is called a master slave method. In this case, the arm 5145 can be remotely operated by the user via the input device 5161 installed at a place away from the operating room.

Furthermore, in a case where the force control is applied, the arm control device 5159 may perform what is called power assist control to receive an external force from the user and drive the actuators of the respective joints 5147a to 5147c so that the arm 5145 moves smoothly according to the external force. Thus, when the user moves the arm 5145 while directly touching the arm 5145, the arm 5145 can be moved with a relatively light force. Therefore, the endoscope 5115 can be moved more intuitively and with a simpler operation, and convenience for the user can be improved.

Here, generally in endoscopic surgery, a doctor called a scopist supports the endoscope 5115. On the other hand, by using the support arm device 5141, it is possible to more reliably fix the position of the endoscope 5115 without manual labor. Thus, an image of the surgical site can be stably obtained, and it is possible to perform the operation smoothly.

Note that the arm control device 5159 does not necessarily have to be provided on the cart 5151. Furthermore, the arm control device 5159 does not necessarily have to be one device. For example, the arm control device 5159 may be provided in each of the joints 5147a to 5147c of the arm 5145 of the support arm device 5141, and the plurality of arm control devices 5159 may cooperate with each other to implement driving control of the arm 5145.

(Light Source Device)

The light source device 5157 supplies the endoscope 5115 with irradiation light for imaging a surgical site. The light source device 5157 includes, for example, an LED, a laser light source, or a white light source including a combination thereof. At this time, in a case where a white light source is formed by a combination of RGB laser light sources, the output intensity and output timing of each color (each wavelength) can be controlled with high accuracy, and thus white balance of a captured image can be adjusted in the light source device 5157. Furthermore, in this case, it is possible to irradiate the observation target with the laser light from each of the RGB laser light sources in a time-division manner, and control driving of the image sensor of the camera head 5119 in synchronization with the irradiation timing, to thereby capture an image corresponding to each of RGB in a time-division manner. According to this method, a color image can be obtained without providing a color filter on the image sensor.

Furthermore, driving of the light source device 5157 may be controlled so as to change the intensity of output light at every predetermined time interval. By controlling driving of the image sensor of the camera head 5119 in synchronization with timing of changing the intensity of the light to acquire images in a time-division manner and synthesizing the images, images with high dynamic ranges without what is called blackout and overexposure can be generated.

Furthermore, the light source device 5157 may be capable of supplying light in a predetermined wavelength band corresponding to special light observation. In the special light observation, for example, what is called narrow band light observation (narrow band imaging) is performed by utilizing the wavelength dependence of light absorption in body tissue and emitting light in a narrower band as compared with irradiation light in normal observation (that is, white light), to thereby image a predetermined tissue such as blood vessels on a surface layer of a mucous membrane with high contrast. Alternatively, in the special light observation, fluorescence observation in which an image is obtained by fluorescence generated by emitting excitation light may be performed. In the fluorescence observation, it is possible to perform irradiating a body tissue with excitation light to observe fluorescence from the body tissue (autofluorescence observation), or locally injecting a reagent such as indocyanine green (ICC) into a body tissue and irradiating the body tissue with excitation light corresponding to the fluorescence wavelength of the reagent to obtain a fluorescence image, or the like. The light source device 5157 may be capable of supplying narrowband light and/or excitation light compatible with such special light observation.

(Camera Head and CCU)

Figure 40:
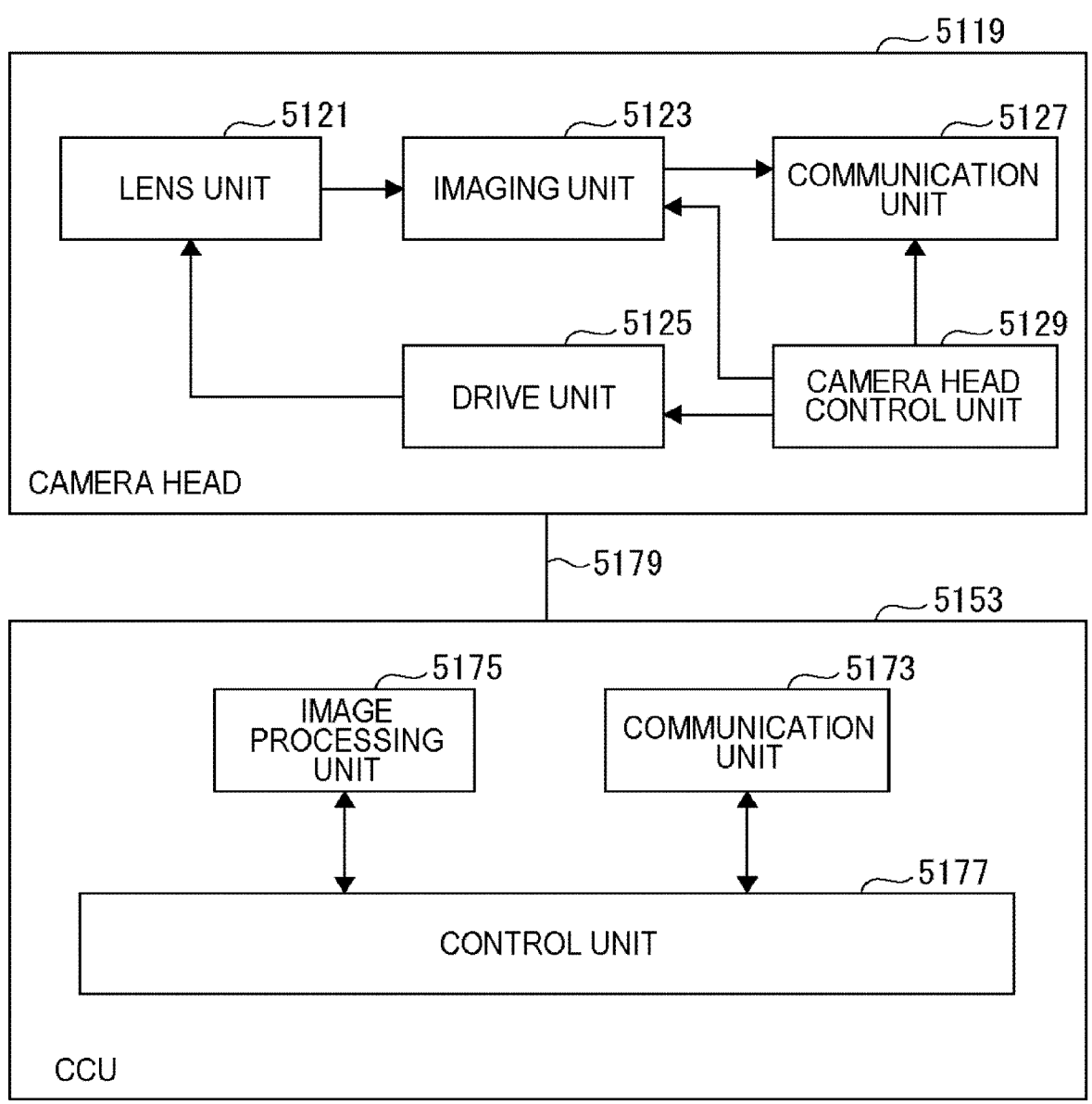
FIG. 40 is a block diagram illustrating an example of a functional configuration of a camera head and a CCU illustrated in FIG. 39.

Functions of the camera head 5119 and the CCU 5153 of the endoscope 5115 will be described in more detail with reference to FIG. 40. FIG. 40 is a block diagram illustrating an example of functional configurations of the camera head 5119 and the CCU 5153 illustrated in FIG. 39.

Referring to FIG. 40, the camera head 5119 has a lens unit 5121, an imaging unit 5123, a drive unit 5125, a communication unit 5127, and a camera head control unit 5129 as functions thereof. Furthermore, the CCU 5153 has a communication unit 5173, an image processing unit 5175, and a control unit 5177 as functions thereof. The camera head 5119 and the CCU 5153 are connected in a bidirectionally communicable manner by a transmission cable 5179.

First, a functional configuration of the camera head 5119 will be described. The lens unit 5121 is an optical system provided at a connection portion with the lens barrel 5117. The observation light taken in from the distal end of the lens barrel 5117 is guided to the camera head 5119 and incident on the lens unit 5121. The lens unit 5121 is configured by combining a plurality of lenses including a zoom lens and a focus lens. The lens unit 5121 has optical characteristics that are adjusted so that the observation light is condensed on a light receiving surface of the image sensor of the imaging unit 5123. Furthermore, the zoom lens and the focus lens are configured so that their positions on the optical axis can be moved in order to adjust the magnification and focus of the captured image.

The imaging unit 5123 includes an image sensor and is arranged in a subsequent stage of the lens unit 5121. The observation light that has passed through the lens unit 5121 is condensed on the light receiving surface of the image sensor, and an image signal corresponding to an observation image is generated by photoelectric conversion. The image signal generated by the imaging unit 5123 is provided to the communication unit 5127.

As the image sensor forming the imaging unit 5123, for example, a complementary metal oxide semiconductor (CMOS) type image sensor, which has a Bayer array and is capable of color imaging, is used. Note that as the image sensor, for example, an image sensor capable of capturing a high-resolution image of 4K or higher may be used. By obtaining the image of a surgical site with high resolution, the operator 5181 can grasp the situation of the surgical site in more detail, and can proceed with the operation more smoothly.

Furthermore, the image sensor forming the imaging unit 5123 includes a pair of image sensors for acquiring respective image signals for the right eye and the left eye corresponding to 3D display. Performing the 3D display enables the operator 5181 to more accurately grasp the depth of living tissue at a surgical site. Note that in a case where the imaging unit 5123 includes a multi-plate type, multiple systems of lens units 5121 are provided corresponding to the respective image sensors.

Furthermore, the imaging unit 5123 does not necessarily have to be provided in the camera head 5119. For example, the imaging unit 5123 may be provided inside the lens barrel 5117 immediately after the objective lens.

The drive unit 5125 includes an actuator, and moves the zoom lens and the focus lens of the lens unit 5121 by a predetermined distance along the optical axis under the control of the camera head control unit 5129. Thus, the magnification and focus of the image captured by the imaging unit 5123 can be adjusted as appropriate.

The communication unit 5127 includes a communication device for transmitting and receiving various information to and from the CCU 5153. The communication unit 5127 transmits an image signal obtained from the imaging unit 5123 as RAW data to the CCU 5153 via the transmission cable 5179. At this time, it is preferable that the image signal is transmitted by optical communication in order to display the captured image of the surgical site with low latency. At a time of surgery, the operator 5181 performs the surgery while observing the condition of the affected area with the captured image, and thus for safer and more reliable surgery, it is demanded to display the moving image of the surgical site in real time as much as possible. In a case where optical communication is performed, the communication unit 5127 is provided with a photoelectric conversion module that converts an electrical signal into an optical signal. The image signal is converted into an optical signal by the photoelectric conversion module and then transmitted to the CCU 5153 via the transmission cable 5179.

Furthermore, the communication unit 5127 receives a control signal for controlling driving of the camera head 5119 from the CCU 5153. The control signal includes, for example, information regarding imaging conditions such as information specifying the frame rate of the captured image, information specifying the exposure value at the time of imaging, and/or information specifying the magnification and focus of the captured image. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electrical signal, and the control signal is supplied to the camera head control unit 5129 after being converted into an electrical signal by the photoelectric conversion module.

Note that the imaging conditions such as the frame rate, exposure value, magnification, and focus described above are automatically set by the control unit 5177 of the CCU 5153 on the basis of the acquired image signal. That is, the endoscope 5115 is equipped with what is called an auto exposure (AE) function, an auto focus (AF) function, and an auto white balance (AWB) function.

The camera head control unit 5129 controls driving of the camera head 5119 on the basis of the control signal from the CCU 5153 received via the communication unit 5127. For example, the camera head control unit 5129 controls driving of the image sensor of the imaging unit 5123 on the basis of the information specifying the frame rate of the captured image and/or the information specifying the exposure at the time of imaging.

Furthermore, for example, the camera head control unit 5129 appropriately moves the zoom lens and the focus lens of the lens unit 5121 via the drive unit 5125 on the basis of the information specifying the magnification and focus of the captured image. The camera head control unit 5129 may further include a function of storing information for identifying the lens barrel 5117 and the camera head 5119.

Note that by arranging components such as the lens unit 5121 and the imaging unit 5123 in a highly airtight and waterproof sealed structure, the camera head 5119 can be made resistant to autoclave sterilization.

Next, the functional configuration of the CCU 5153 will be described. The communication unit 5173 includes a communication device for transmitting and receiving various information to and from the camera head 5119. The communication unit 5173 receives an image signal transmitted from the camera head 5119 via the transmission cable 5179. At this time, as described above, the image signal can be preferably transmitted by optical communication. In this case, the communication unit 5173 is provided with a photoelectric conversion module that converts an optical signal into an electrical signal, corresponding to the optical communication. The communication unit 5173 provides the image signal converted into the electrical signal to the image processing unit 5175.

Furthermore, the communication unit 5173 transmits to the camera head 5119 a control signal for controlling driving of the camera head 5119. The control signal may also be transmitted by optical communication.

The image processing unit 5175 subjects the image signal that is RAW data transmitted from the camera head 5119 to various image processing. The image processing includes, for example, various known signal processing such as development processing, image quality enhancement processing (band enhancement processing, super-resolution processing, noise reduction (NR) processing, and/or camera shake correction processing, and the like), and/or enlargement processing (electronic zoom processing) and the like. Furthermore, the image processing unit 5175 also performs detection processing on the image signal for performing AE, AF, and AWB.

The image processing unit 5175 includes a processor such as a CPU or a GPU, and the image processing and the detection processing described above can be performed by the processor operating according to a predetermined program. Note that in a case where the image processing unit 5175 includes a plurality of GPUs, the image processing unit 5175 appropriately divides information related to the image signal and performs image processing in parallel by the plurality of GPUs.

The control unit 5177 performs various control related to imaging of a surgical site by the endoscope 5115 and display of a captured image thereof. For example, the control unit 5177 generates a control signal for controlling driving of the camera head 5119. At this time, in a case where imaging conditions are input by the user, the control unit 5177 generates a control signal on the basis of the input by the user. Alternatively, in a case where the endoscope 5115 is equipped with the AE function, the AF function, and the AWB function, the control unit 5177 appropriately calculates an optimum exposure value, focal length, and white balance according to a result of detection processing by the image processing unit 5175, so as to generate a control signal.

Furthermore, the control unit 5177 causes the display device 5155 to display the image of the surgical site on the basis of the image signal subjected to the image processing by the image processing unit 5175. At this time, the control unit 5177 recognizes various objects in the surgical site image using various image recognition techniques. For example, the control unit 5177 can detect the shapes of edges, colors, and the like of an object included in the surgical site image, to thereby recognize a surgical tool such as forceps, a specific biological part, bleeding, mist when using the energy treatment device 5135, or the like. When causing the display device 5155 to display the image of the surgical site, the control unit 5177 uses a recognition result thereof to superimpose various surgical support information on the image of the surgical site. By the surgery support information superimposed and presented to the operator 5181, it is possible to proceed with the surgery more safely and reliably.

The transmission cable 5179 that connects the camera head 5119 and the CCU 5153 is an electrical signal cable compatible with electrical signal communication, an optical fiber compatible with optical communication, or a composite cable thereof.

Here, although the communication is performed by wire using the transmission cable 5179 in the illustrated example, the communication between the camera head 5119 and the CCU 5153 may be performed wirelessly. In a case where the communication between the two is performed wirelessly, it is not necessary to lay the transmission cable 5179 in the operating room, and thus situations in which the transmission cable 5179 hinders movement of the medical staff in the operating room can be eliminated.

The example of the operating room system 5100 to which the technology according to the present disclosure can be applied has been described above. Note that although the case where the medical system to which the operating room system 5100 is applied is the endoscopic surgery system 5113 has been described here as an example, the configuration of the operating room system 5100 is not limited to such an example. For example, the operating room system 5100 may be applied to a flexible endoscope system for examination or a microsurgery system instead of the endoscopic surgery system 5113.

In the configuration of the operating room system 5100 as described above, the endoscope 5115, the ceiling camera 5187, and the operating room camera 5189 and the like correspond to, for example, the camera 421 of FIG. 36. The CCU 5153 and the like correspond to, for example, the CCU 422 in FIG. 36. The audiovisual controller 5107 corresponds to, for example, a part of the CCU 422 of FIG. 36, the IP converter 412, and the integrated system 413.

Then, for example, voices of conversations during surgery picked up by the ceiling camera 5187 or the operating room camera 5189 are converted into text by the audiovisual controller 5107 or a voice analysis device that is not illustrated. Then, using the present technology, text-converted data is inserted into the transmission data including video data and recorded on the recorder 5105, or voice text is displayed on the display devices 5102A to 5103D together with video.

«6. Others»

<Configuration Example of Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

FIG. 41 is a block diagram illustrating a configuration example of hardware of a computer that executes the above-described series of processes by a program.

In the computer, a central processing unit (CPU) 10001, a read only memory (ROM) 10002, and a random access memory (RAM) 10003 are interconnected via a bus 10004.

An input-output interface 10005 is further connected to the bus 10004. An input unit 10006, an output unit 10007, a storage unit 10008, a communication unit 10009, and a drive 10010 are connected to the input-output interface 10005.

The input unit 10006 includes a keyboard, a mouse, a microphone, and the like. The output unit 10007 includes a display, a speaker, and the like. The storage unit 10008 includes a hard disk, a nonvolatile memory, and the like. The communication unit 10009 includes, for example, a network interface and the like. The drive 10010 drives a removable medium 10011 such as a magnetic disk, an optical disk, a magneto-optical disk, or a semiconductor memory.

In the computer configured as described above, for example, the CPU 10001 loads the program stored in the storage unit 10008 into the RAM 10003 via the input-output interface 10005 and the bus 10004 and executes the program, to thereby perform the above-described series of processes.

The program executed by the computer (CPU 10001) can be provided by being recorded on, for example, a removable medium 10011 as a package medium or the like. Furthermore, the program can be provided via a wired or wireless transmission medium such as a local area network, the Internet, or digital satellite broadcasting.

In the computer, the program can be installed in the storage unit 10008 via the input-output interface 10005 by mounting the removable medium 10011 to the drive 10010. Furthermore, the program can be received by the communication unit 10009 via a wired or wireless transmission medium and installed in the storage unit 10008. In addition, the program can be installed in the ROM 10002 or the storage unit 10008 in advance.

Note that the program executed by the computer may be a program for processing in time series in the order described in the present description, or a program for processing in parallel or at a necessary timing such as when a call is made.

Note that in the present description, a system means a set of a plurality of components (devices, modules (parts), and the like), and it does not matter whether or not all the components are in the same housing. Therefore, both of a plurality of devices housed in separate housings and connected via a network and a single device in which a plurality of modules is housed in one housing are systems.

Note that the embodiments of the present technology are not limited to the above-described embodiments, and various modifications are possible without departing from the gist of the present technology.

For example, the present technology can employ a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

<Example of Combinations of Configurations> present technology can also employ the following configurations.

(1)

A transmission device including:

a frame sequence number setting unit that, on the basis of a frame number indicating an order of a subframe in a main frame, assigns to the subframe a frame sequence number indicating an order of the subframe in a frame sequence including a plurality of the subframes; and a multiplexing unit that arranges a data packet at a predetermined position in the subframe on the basis of the frame sequence number.

(2)

The transmission device according to (1) above, in which the multiplexing unit arranges the data packet without providing a stuffing area up to a predetermined position of a second data area in which respective predetermined first data areas in the subframes included in the frame sequence are combined.

(3)

The transmission device according to (2) above, in which the multiplexing unit arranges a stuffing area after the predetermined position of the second data area.

(4)

The transmission device according to (3) above, in which a number of sequences, which is a number of the subframes in the frame sequence, is set on the basis of a stuffing amount per the subframe in the frame sequence.

(5)

The transmission device according to (4) above, in which the number of sequences is set to be equal to or less than the number of the subframes included in a frame that is a unit of performing a shuffling process.

(6)

The transmission device according to (2) above, in which a length of the data packet at an end of the second data area is set so that the second data area does not remain.

(7)

The transmission device according to any one of (1) to (6) above, in which the multiplexing unit divides and arranges at least a part of the data packets into a plurality of the subframes.

(8)

The transmission device according to any one of (1) to (7) above, in which the multiplexing unit arranges a number of the data packets in the frame sequence, the number being different from a number of the subframes in the frame sequence.

(9)

The transmission device according to any one of (1) to (8) above, further including a first header addition unit that arranges a header including the frame number in the subframe.

(10)

The transmission device according to any one of (1) to (9) above, further including a second header addition unit that adds a header including at least one of a type of the data packet or information indicating validity of the data packet to the data packet.

(11)

The transmission device according to any one of (1) to (10) above, in which the data packet includes subdata to be added to main data.

(12)

The transmission device according to (11) above, in which the subdata includes data related to text.

(13)

The transmission device according to any one of (1) to (12) above, further including a transmission unit that transmits transmission data including the main frame.

(14)

A reception device including:

a frame number detection unit that detects a frame number indicating an order of a subframe in a main frame, a frame sequence number setting unit that, on the basis of the frame number, assigns to the subframe a frame sequence number indicating an order of the subframe in a frame sequence including a plurality of the subframes, and a data extraction unit that extracts a data packet from the subframe on the basis of the frame sequence number.

(15)

The reception device according to (14) above, in which at least a part of the data packet is divided and arranged in a plurality of the subframes.

(16)

The reception device according to (15) above, further including a transmission error processing unit that, in a case where a transmission error occurs in the subframe, discards the data packet included in the subframe in which the transmission error has occurred, and the data packet that is divided between the subframe in which the transmission error has occurred and another of the subframes and is arranged in the another subframe.

(17)

The reception device according to any one of (14) to (16) above, in which a header including the frame number is arranged in the subframe.

(18)

The reception device according to any one of (14) to (17) above, further including a reception unit that receives transmission data including the main frame.

(19)

A transmission system including:

a transmission device; and a reception device, in which the transmission device includes:

a first frame sequence number setting unit that, on the basis of a frame number indicating an order of a subframe in a main frame, assigns to the subframe a frame sequence number indicating an order of the subframe in a frame sequence including a plurality of the subframes;

a multiplexing unit that arranges a data packet at a predetermined position in the subframe on the basis of the frame sequence number; and a transmission unit that transmits transmission data including the main frame, and the reception device includes:

a reception unit that receives the transmission data;

a frame number detection unit that detects the frame number of the subframe in the main frame;

a second frame sequence number setting unit that, on the basis of the frame number, assigns to the subframe the frame sequence number; and a data extraction unit that extracts the data packet from the subframe on the basis of the frame sequence number.

(20)

A transmission method including:

causing a transmission device to, on the basis of a frame number indicating an order of a subframe in a main frame, assign to the subframe a frame sequence number indicating an order of the subframe in a frame sequence including a plurality of the subframes, arrange a data packet at a predetermined position in the subframe on the basis of the frame sequence number, and transmit transmission data including the main frame; and causing a reception device to receive the transmission data, detect the frame number of the subframe in the main frame, assign to the subframe the frame sequence number on the basis of the frame number, and extract the data packet from the subframe on the basis of the frame sequence number.

Note that the effects described in the present description are merely examples and are not limited, and other effects may be provided.

RERENCE SIGNS LIST

1 Broadcasting system
11-1 to 11-$n$ Imaging system
12 Integrated system
21-1 to 21-$n$ Camera
22-1 to 22-$n$ CCU
54 Reception unit
55 Separation unit
56 Signal processing unit
57 Additional data processing unit
58 Output unit
74 Reception unit
75 Signal processing unit
76 Transmission data generation unit
77 Transmission unit
101 Data acquisition unit
102 Data processing unit
111 Data extraction unit
112 Transmission error processing unit
151 Timing control unit
152 BB frame number setting unit
153 Payload header addition unit
154 Additional data selection unit
155 Additional data header addition unit
156 Multiplexing unit
201 Broadcasting system
211-1 to 211-$n$ Imaging system
21-1 to 221-$n$ Camera
222-1 to 222-$n$ CCU
251 Separation unit
252 Additional data processing unit
271 Transmission data generation unit
301 Data acquisition unit
311 Data extraction unit
312 Transmission error processing unit
313 BB frame number detection unit
314 BB frame sequence number setting unit
351 Timing control unit
352 BB frame number setting unit
353 Payload header addition unit
354 BB frame sequence number setting unit
401 Medical system
411-1 to 411-$n$ Imaging system
412 IP converter 413 Integrated system
421-1 to 421-n Camera
422-1 to 422-n CCU

The invention claimed is:

1. A transmission device comprising:
    processing circuitry configured to
        on a basis of a frame number indicating an order of a subframe in a main frame, assign to the subframe a frame sequence number indicating an order of the subframe in a frame sequence including a plurality of the subframes,
        arrange a data packet at a predetermined position in the subframe on a basis of the frame sequence number without providing a stuffing area up to a predetermined position of a second data area in which respective predetermined first data areas in the subframes included in the frame sequence are combined, and
        arrange a stuffing area after the predetermined position of the second data area.

2. The transmission device according to claim 1, wherein a number of sequences, which is a number of the subframes in the frame sequence, is set on a basis of a stuffing amount per the subframe in the frame sequence.

3. The transmission device according to claim 2, wherein the number of sequences is set to be equal to or less than the number of the subframes included in a frame that is a unit of performing a shuffling process.

4. The transmission device according to claim 1, wherein a length of the data packet at an end of the second data area is set so that the second data area does not remain.

5. The transmission device according to claim 1, wherein the processing circuitry is configured to divide and arrange at least a part of the data packets into a plurality of the subframes.

6. The transmission device according to claim 1, wherein the processing circuitry is configured to arrange a number of the data packets in the frame sequence, the number being different from a number of the subframes in the frame sequence.

7. The transmission device according to claim 1, wherein the processing circuitry is configured to arrange a header including the frame number in the subframe.

8. The transmission device according to claim 1, wherein the processing circuitry is configured to add a header including at least one of a type of the data packet or information indicating validity of the data packet to the data packet.

9. The transmission device according to claim 1, wherein the data packet includes subdata to be added to main data.

10. The transmission device according to claim 9, wherein the subdata includes data related to text.

11. The transmission device according to claim 1, wherein the processing circuitry is configured to transmit transmission data including the main frame.

12. A reception device comprising:
    processing circuitry configured to
        detect a frame number indicating an order of a subframe in a main frame,
        on a basis of the frame number, assign to the subframe a frame sequence number indicating an order of the subframe in a frame sequence including a plurality of the subframes, and
        extract a data packet from the subframe on a basis of the frame sequence number, the data packet being arranged at a predetermined position in the subframe without being provided a stuffing area up to a predetermined position of a second data area in which respective predetermined first data areas in the subframes included in the frame sequence are combined, and a stuffing area being arranged after the predetermined position of the second data area.

13. The reception device according to claim 12, wherein at least a part of the data packet is divided and arranged in a plurality of the subframes.

14. The reception device according to claim 13,
    wherein the processing circuitry is configured to, in a case where a transmission error occurs in the subframe, discard the data packet included in the subframe in which the transmission error has occurred, and the data packet that is divided between the subframe in which the transmission error has occurred and another of the subframes and is arranged in the another subframe.

15. The reception device according to claim 12, wherein a header including the frame number is arranged in the subframe.

16. The reception device according to claim 12,
    wherein the processing circuitry is configured to receive transmission data including the main frame.

17. A transmission system comprising:
    a transmission device; and
    a reception device,
    wherein the transmission device includes transmission processing circuitry configured to:
        on a basis of a frame number indicating an order of a subframe in a main frame, assign to the subframe a frame sequence number indicating an order of the subframe in a frame sequence including a plurality of the subframes,
        arrange a data packet at a predetermined position in the subframe on a basis of the frame sequence number without providing a stuffinu area up to a predetermined position of a second data area in which respective predetermined first data areas in the subframes included in the frame sequence are combined,
        arrange a stuffing area after the predetermined position of the second data area, and
        transmit transmission data including the main frame, and
    the reception device includes reception processing circuitry configured to:
        receive the transmission data,
        detect the frame number of the subframe in the main frame,
        on a basis of the frame number, assign to the subframe the frame sequence number, and
        extract the data packet from the subframe on a basis of the frame sequence number.

18. A transmission method comprising:
    causing a transmission device to,
        on a basis of a frame number indicating an order of a subframe in a main frame, assign to the subframe a frame sequence number indicating an order of the subframe in a frame sequence including a plurality of the subframes,
        arrange a data packet at a predetermined position in the subframe on a basis of the frame sequence number without providing a stuffing area up to a predetermined position of a second data area in which respective predetermined first data areas in the subframes included in the frame sequence are combined,
        arrange a stuffing area after the predetermined position of the second data area, and transmit transmission data including the main frame; and causing a reception device to
receive the transmission data,
detect the frame number of the subframe in the main frame,
assign to the subframe the frame sequence number on a basis of the frame number, and
extract the data packet from the subframe on a basis of the frame sequence number.

* * * * *